US012705148B1

(12) United States Patent
Yan et al.

(10) Patent No.: US 12,705,148 B1
(45) Date of Patent: Aug. 11, 2026

(54) FAULT-TOLERANT HASHING CONTROL ARCHITECTURE

(71) Applicant: Block, Inc., Oakland, CA (US)

(72) Inventors: Haipeng Yan, Aurora (CA); Afshin Rezayee, Richmond Hill (CA); Vikram Suresh, Portland, OR (US); Malcolm Smith, Toronto (CA)

(73) Assignee: Block, Inc., Oakland, CA (US)

( * ) Notice: Subject to any disclaimer, the term of this patent is extended or adjusted under 35 U.S.C. 154(b) by 20 days.

(21) Appl. No.: 18/620,153

(22) Filed: Mar. 28, 2024

(51) Int. Cl.
*G06F 11/20* (2006.01)
*G06F 13/40* (2006.01)
*G06F 13/42* (2006.01)

(52) U.S. Cl.
CPC ........ *G06F 11/203* (2013.01); *G06F 11/2092* (2013.01); *G06F 13/4247* (2013.01)

(58) Field of Classification Search
CPC ............... G06F 11/203; G06F 11/2092; G06F 11/2002; G06F 11/2007; G06F 11/2028; G06F 13/4247; G06F 11/181
See application file for complete search history.

(56) References Cited

U.S. PATENT DOCUMENTS

2014/0310555 A1* 10/2014 Schulz ................ G06F 11/2002 714/4.2
2020/0145227 A1* 5/2020 Pachler .............. G06Q 20/0658
2021/0027223 A1* 1/2021 Koide .................... G06Q 10/04
2023/0281527 A1* 9/2023 Cella ...................... G06V 20/17 705/7.17

* cited by examiner

*Primary Examiner* — Philip Guyton
*Assistant Examiner* — Sean Kevin McNamara
(74) *Attorney, Agent, or Firm* — Polsinelli PC

(57) ABSTRACT

Systems and methods are disclosed for fault-tolerant hash control. In some examples, a hashing system receives a dataset. The controller apportions hashing calculations across hashing chips to calculate at least one hash digest based on the dataset. The hashing chips include at least a first hashing chip, a second hashing chip, and a third hashing chip. A first connector couples the first hashing chip to the second hashing chip. A second connector couples the second hashing chip to the third hashing chip. A backup connector couples the first hashing chip to the third hashing chip, bypassing the second hashing chip. The first hashing chip sends a communication to the third hashing chip along the backup connector that bypasses the second hashing chip in response to a determination that the second hashing chip is nonresponsive.

20 Claims, 16 Drawing Sheets

FIG. 4
400
Hashing Chip 410A
Main Signal Input 405A
Backup Signal Input 415A
MUX 420A
Switch Logic 425A
Logic 430A
Main Signal Output 435A
Backup Signal Output 440A
Hashing Chip 410B
Main Signal Input 405B
Backup Signal Input 415B
MUX 420B
Switch Logic 425B
Logic 430B
Main Signal Output 435B
Backup Signal Output 440B
445A
445B
445C
455A
455B
455C
455D
Backup Data 450A
Backup Data 450B
Backup Data 450B
Backup Data 450C
Backup Data 450C
Backup Data 450D

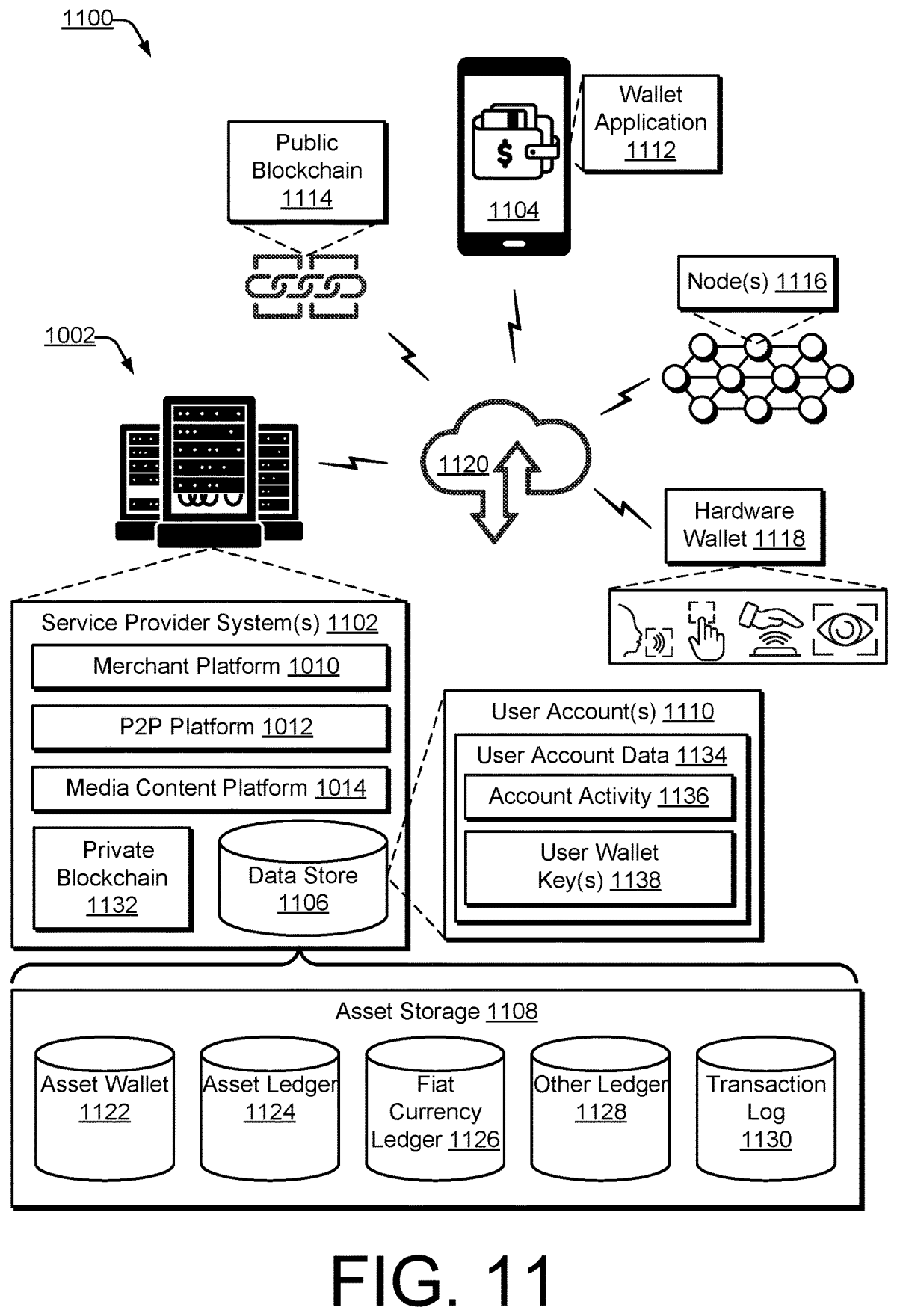

1100

Public Blockchain 1114

1104

Wallet Application 1112

Node(s) 1116

1002

1120

Hardware Wallet 1118

Service Provider System(s) 1102

Merchant Platform 1010

P2P Platform 1012

Media Content Platform 1014

Private Blockchain 1132

Data Store 1106

User Account(s) 1110

User Account Data 1134

Account Activity 1136

User Wallet Key(s) 1138

Asset Storage 1108

Asset Wallet 1122

Asset Ledger 1124

Fiat Currency Ledger 1126

Other Ledger 1128

Transaction Log 1130

FIG. 11

FAULT-TOLERANT HASHING CONTROL ARCHITECTURE

TECHNICAL FIELD

Application specific integrated circuits (ASICs) are integrated circuits that are customized for a particular use, rather than general use. Mining of cryptocurrencies such as Bitcoin often involves hash operations, for instance under a Proof of Work (PoW) consensus mechanism, that may be performed using ASICs.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Moreover, multiple instances of the same part are designated by a common prefix, in some cases separated from the instance number by a dash and/or parentheses. The drawings are not to scale.

FIG. 11 is a block diagram illustrating an example environment including a service provider system which may be associated with the server(s) of FIG. 10, in accordance with some examples.

DETAILED DESCRIPTION

Figure 1A:
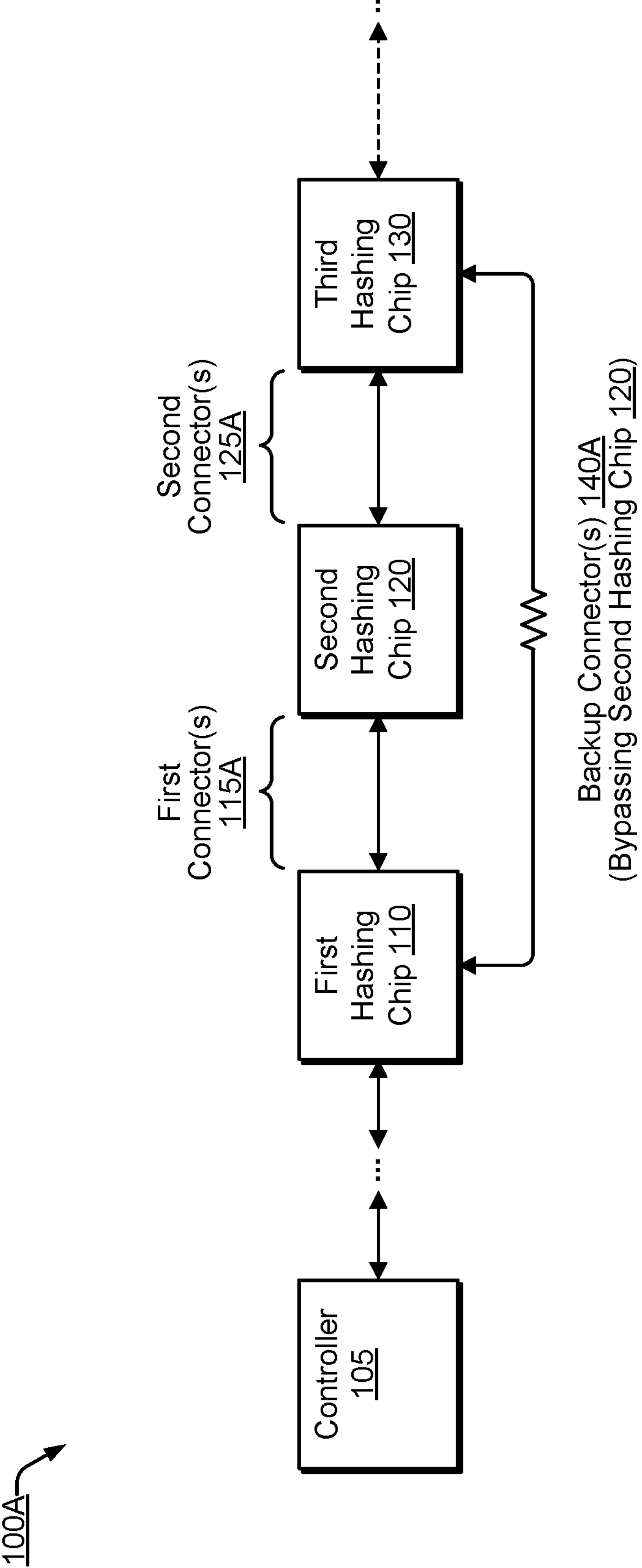
FIG. 1A is a block diagram illustrating a hashing management architecture that includes at least three hashing chips and backup connector(s) to bypass the second hashing chip, in accordance with some examples.

ASICs can be used in cryptocurrency mining, such as the mining of Bitcoin. In some examples, mining ASICs are single-die integrated circuits (ICs) comprising a hash core, arranged to perform processing for solving mining algorithms, and control logic arranged to control the hash core. However, in other examples ASICs may be multi-die integrated circuits including core logic and multiple hash cores. In some examples, a larger system, such as a hashboard, may include multiple hashing chips, each of which may be, or may include, a mining ASIC.

A hashboard is a circuit board, such as a printed circuit board (PCB), that hosts an array of hashing chips (e.g., mining ASICs). The hashing chips perform the complex computations, such as hashing calculations, that drive distributed ledger processes, such as cryptocurrency mining processes. For example, the hashing chips can hash a dataset (e.g., associated with a block of a blockchain ledger) that includes an interchangeable nonce value (e.g., in the header of the block) multiple times, each time with the nonce value set to a different value, to produce multiple hashes, until one of the hashes is within a target range associated with at least one threshold (e.g., below the threshold, above the threshold, between two thresholds, etc.). The threshold may be associated with a mining difficulty setting. In some cases, producing a hash that falls within the target range provides a reward (e.g., an amount of a cryptocurrency or another asset) and allows an associated block to be appended to the distributed ledger. In some examples, the hash algorithm may be a secure hash algorithm (SHA), such as SHA-256.

In some examples, a hashboard system can include hashing chips that are connected together in a daisy chain, with no connectivity between hashing chips outside of the daisy chain, therefore providing limited fault tolerance to the hashboard system. Similarly to string lights that are wired in series, if one of the hashing chips in this type of hashboard system fails (e.g., becomes unresponsive and/or provides incorrect responses), this can cause every hashing chip downstream from the failed hashing chip along the daisy chain to no longer be reachable and/or usable by the hashboard system.

Systems and methods are disclosed for improved hashing management systems, including hashboard system, that provide improved fault tolerance via backup passthrough connection pathways that allow a hashing chip on the hashboard to be skipped if the hashing chip has become nonresponsive, has become unresponsive, provides improper or incorrect responses, or some combination thereof. For instance, if a daisy chain includes a first hashing chip that is connected to a second hashing chip that is connected to a third hashing chip, then the improved hashboard system can include a backup passthrough connection pathway between the first hashing chip and the third hashing chip. Thus, if the second hashing chip becomes unresponsive, the first hashing chip can use the backup passthrough connection pathway to skip over the second hashing chip and communicate directly with the third hashing chip.

The improved hashing management systems and methods disclosed herein provide improved fault-tolerance in hashing management. For instance, in some examples, a hash control system includes a controller that receives at least one dataset. The hash control system includes a plurality of hashing chips that are coupled to one another and to the controller. The controller apportions hashing calculations across the plurality of hashing chips to calculate at least one hash digest based on the at least one dataset. The plurality of hashing chips include at least a first hashing chip, a second hashing chip, and a third hashing chip. The first hashing chip is coupled to the second hashing chip using at least a first connector. The second hashing chip is coupled to the third hashing chip using at least a second connector. The first hashing chip is coupled to the third hashing chip using at least a backup connector that bypasses the second hashing chip. The first hashing chip sends a communication to the third hashing chip along the backup connector that bypasses the second hashing chip in response to a determination (e.g., by the controller) that the second hashing chip is nonresponsive (e.g., for at least a threshold amount of time).

By including the backup connector that bypasses the second hashing chip, the hashing system is more fault-tolerant than a hashing system that lacks the backup connector. For instance, in some examples, the plurality of hashing chips can be connected to one another in a daisy chain, with the first hashing chip connected to the second hashing chip using the first connector as part of the daisy chain, and with the second hashing chip connected to the third hashing chip using the second connector as part of the daisy chain. If the second hashing chip becomes nonresponsive, for instance due to a fault in the hardware and/or the software of the second hashing chip (and/or of the first connector and/or the second connector), communications along the daisy chain can fail to be communicated. For instance, if the second hashing chip is nonresponsive, communications can fail to pass between the first hashing chip and the third hashing chip. The backup connector provides fault tolerance to allow the hashing system to continue to function even if the second hashing chip becomes nonresponsive, for instance by passing communication(s) between the first hashing chip and the third hashing chip along the backup connector, bypassing the second hashing chip that is nonresponsive. This improvement in fault tolerance through implementation of the backup connector that bypasses the second hashing chip can improve flexibility of the hashing system, allowing the hashing system to continue to function even in challenging conditions in which certain hashing chips or connectors may fail, for instance under more extreme temperature conditions, movement conditions, and the like.

This improvement in fault tolerance through implementation of the backup connector that bypasses the second hashing chip can also improve efficiency of the hashing system. In some cases, the second hashing chip may be temporarily nonresponsive, for instance due to a heavy processing workload by the second hashing chip, an error in the second hashing chip that is eventually resolved, a power spike or surge that causes a temporary fault in the second hashing chip, a power cycle of the second hashing chip, or a combination thereof. In hashing systems that lack the backup connector, a period of temporary non-responsiveness in the second hashing chip (or any one of the hashing chips) can cause the hashing system as a whole to stop functioning during the period of temporary non-responsiveness in the second hashing chip. A hashing system with the backup connector provides improved efficiency by allowing the hashing system as a whole to continue functioning, even during periods of temporary non-responsiveness of one or more hashing chips.

Various aspects of the application will be described with respect to the figures. FIG. 1A is a block diagram illustrating a hashing management architecture 100A that includes at least three hashing chips and backup connector(s) 140A to bypass the second hashing chip 120. The at least three hashing chips of the hashing management architecture 100A include a first hashing chip 110, the second hashing chip 120, and a third hashing chip 130. The hashing chips (e.g., the first hashing chip 110, the second hashing chip 120, the third hashing chip 130, and/or one or more additional hashing chips of the hashing management architecture 100A) can perform various hashing calculations to calculate one or more hash digest(s) of one or more dataset(s). In some examples, the hashing chips can be referred to as hash dies, hash chips, hash application-specific integrated circuit (ASICs), hash field programmable gate arrays (FPGAs), hash processors, hashing chips, hashing dies, hashing ASICs, hashing FPGAs, hashing processors, mining dies, mining chips, mining ASICs, mining FPGAs, mining processors, ASIC hashers, ASIC miners, FPGA hashers, FPGA miners, chips, dies, ASICs, FPGAs, or a combination thereof. Hash digests may be referred to as hashes.

The hashing management architecture 100A also includes a controller 105 that apportions hashing calculations across the hashing chips (e.g., across the first hashing chip 110, the second hashing chip 120, the third hashing chip 130, and/or one or more additional hashing chips of the hashing management architecture 100A) to calculate at least one hash digest based on the at least one dataset. For instance, in some examples, the hashing management architecture 100A is used to generate hash digest(s) in association with a distributed ledger, for instance for mining calculation(s) and/or calculation(s) related to a consensus mechanism and/or consensus algorithm.

The consensus mechanism and/or consensus algorithm can include, for example, proof of work (PoW), proof of stake (POS), delegated proof of stake (dPoS), proof of history (PoH), proof of elapsed time (PoET), proof of capacity (PoC), proof of activity (PoA), proof of burn (PoB), proof of authority (PoA), proof of weight (PoWeight), proof of importance (PoI), practical Byzantine fault tolerance (pBFT), or a combination thereof. Many mining calculation(s), consensus mechanisms, and/or consensus algorithms rely on hashing calculations. For instance, in some examples, mining calculation(s), consensus mechanisms, and/or consensus algorithms involve selecting nonce value(s) to be included in the contents of a dataset to be hashed (e.g., contents of at least one block of a distributed ledger, for instance including header(s) and/or payload(s)) so that the resulting hash digest(s) compare to one or more specified threshold values in specified ways to meet a specified criteria. For instance, in some examples, the mining calculation(s), consensus mechanisms, and/or consensus algorithms involve selecting nonce value(s) to be included in the contents of a dataset to be hashed so that the resulting hash digest(s) are less than a target value (threshold value), are greater than a target value (threshold value), are equal to a target value (threshold value), are different from (not equal to) a target value (threshold value), are within a range (e.g., between two threshold values), are outside of a range (e.g., less than a lower threshold value or greater than a higher threshold value), or a combination thereof. In some examples, mining calculation(s), consensus mechanisms, and/or consensus algorithms involve hashing the dataset with a number of different nonce values to produce a number of different hash digests to ultimately find a nonce value that produces a hash digest that meets the specified criteria (e.g., compares to the one or more specified threshold values in the specified way(s)). In some examples, the threshold value(s) can be set based on a difficulty value or difficulty rate associated with the distributed ledger and/or block in question. For instance, in an illustrative example, the nonce values can be selected to try to find a hash digest that is less than a threshold value to satisfy the specified condition. In this illustrative example, the threshold value can be decreased if the difficulty value is increased (e.g., so that fewer possible values for the hash digest satisfy the specified condition), and the threshold value can be increased if the difficulty value is decreased (e.g., so that more possible values for the hash digest satisfy the specified condition).

In some examples, the controller 105 apportions hashing calculations associated with hashing a single dataset across multiple hashing chips (e.g., across the first hashing chip 110, the second hashing chip 120, the third hashing chip 130, and/or one or more additional hashing chips of the hashing management architecture 100A) by selecting at least a first set of one or more hashing chip(s) (e.g., the first hashing chip 110) to calculate hash digests for combinations of the dataset with selected nonce values from a first set of one or more nonce values (e.g., to try nonce values within a first range), by selecting at least a second set of one or more hashing chip(s) (e.g., the second hashing chip 120) to calculate hash digests for combinations of the dataset with selected nonce values from a second set of one or more nonce values (e.g., to try nonce values within a second range), by selecting at least a third set of one or more hashing chip(s) (e.g., the third hashing chip 130) to calculate hash digests for combinations of the dataset with selected nonce values from a third set of one or more nonce values (e.g., to try nonce values within a third range), and so forth. In some examples, the controller 105 apportions hashing calculations associated with hashing a multiple datasets (e.g., a first dataset and a second dataset) across multiple hashing chips (e.g., across the first hashing chip 110, the second hashing chip 120, the third hashing chip 130, and/or one or more additional hashing chips of the hashing management architecture 100A) by selecting a first set of one or more hashing chips (e.g., the first hashing chip 110) to calculate a hash digest for the first dataset (e.g., with the number of hashing chips used being based on a first difficulty value associated with the first dataset), by selecting a second set of one or more hashing chips (e.g., the second hashing chip 120 and the third hashing chip 130) to calculate a hash digest for the second dataset (e.g., with the number of hashing chips used being based on a second difficulty value associated with the second dataset), and so forth. In some examples, the controller 105 can assign more hashing chips to perform hash calculations for datasets with higher difficulty values, and/or can assign fewer hashing chips to perform hash calculations for datasets with lower difficulty values.

In some examples, the controller 105 can instruct different hashing chips to generate hashes for different ranges or sets of nonces, so that the mining computations can be parallelized across hashing chips, increasing efficiency of mining computations. In some examples, the controller 105 can instruct different hashing chips to generate hashes for different datasets altogether (e.g., associated with different transaction(s) and/or different blocks), so that the mining computations can be parallelized across the different hashing chips, increasing efficiency of mining computations. In some examples, the controller 105 can apportion different mining and/or hashing calculations across the different hashing chips based on characteristics (e.g., measured temperature) of the different hashing chips, for instance instructing some hashing chips (e.g., those at a lower temperature or that are more powerful) to perform more mining and/or hashing calculations (and/or more difficult mining and/or hashing calculations) while instructing other hashing chips (e.g., those at a higher temperature or that are less powerful) to perform fewer mining and/or hashing calculations (and/or less difficult mining and/or hashing calculations).

The hashing management architecture 100A includes various connectors between the illustrated components. In some examples, the first hashing chip 110 is coupled to (in some examples, directly connected to) the second hashing chip 120 using the first connector(s) 115A. In some examples, the second hashing chip 120 is coupled to (in some examples, directly connected to) the third hashing chip 130 using the second connector(s) 125A. In some examples, the hashing chips (e.g., the first hashing chip 110, the second hashing chip 120, the third hashing chip 130, and/or one or more additional hashing chips of the hashing management architecture 100A) are coupled to one another in a daisy chain (e.g., daisy chain arrangement and/or daisy chain configuration), for instance using the first connector(s) 115A, the second connector(s) 125A, and/or one or more other connector(s).

In some examples, the controller 105 is coupled to (in some examples, directly connected to) the first hashing chip 110 using connector(s), intermediate component(s), or combinations thereof. In some examples, intermediate component(s) are included between the controller 105 and the first hashing chip 110. For instance, in some examples, intermediate component(s) between the controller 105 and the first hashing chip 110 can include additional hashing chips. In some examples, the hashing management architecture 100A can include one or more additional hashing chips after (e.g., to the right of) the third hashing chip 130, such as a fourth hashing chip, a fifth hashing chip, and so forth. In such examples, the dashed arrow to the right of the third hashing chip 130 can represent connector(s) that couple (in some examples, directly connect) the third hashing chip 130 to at least one hashing chip (e.g., a fourth hashing chip) of the one or more additional hashing chips. In some examples, at least a subset of the hashing chips of the hashing management architecture 100A can be coupled in a daisy chain as previously discussed. In some examples, the third hashing chip 130 is the last hashing chip of the chain of hashing chips, in which case the dashed arrow to the right of the third hashing chip 130 can be omitted, or can represent connector(s) that couple back to the controller 105 (e.g., as in the dual loop paths of the hashing management architecture 500 of FIG. 5). In some examples, the last hashing chip of the chain of hashing chips of the hashing management architecture 100A can be coupled back to the controller 105 via connector(s) (e.g., as in the dual loop paths of the hashing management architecture 500 of FIG. 5), regardless of whether the last hashing chip in the chain is the third hashing chip 130 or an additional hashing chip (e.g., fourth hashing chip, fifth hashing chip, or an even later hashing chip).

As noted previously, in some examples, the hashing chips (e.g., the first hashing chip 110, the second hashing chip 120, the third hashing chip 130, and/or one or more additional hashing chips of the hashing management architecture 100A) are coupled to one another in a daisy chain, using the first connector(s) 115A, the second connector(s) 125A, and/or other connector(s). In some examples, to send data, such as instructions, to the hashing chips (e.g., to apportion hashing calculations among the hashing chips), the controller 105 can send the data (e.g., the instruction) to the hashing chips through the daisy chain. For instance, to send instructions to the third hashing chip 130, the controller 105 can send the instructions through intermediate connector(s) and/or component(s) between the controller 105 and the first hashing chip 110, through the first hashing chip 110, through the first connector(s) 115A, through the second hashing chip 120, through the second connector(s) 125A, and ultimately to the third hashing chip 130. In some examples, to receive data, such as calculated hash digest(s), from the hashing chips, the controller 105 can receive the data (e.g., the hash digest(s)) from the hashing chips through the daisy chain. For instance, to receive data (e.g., hash digest(s)) from the third hashing chip 130, the data (e.g., hash digest(s)) can travel from the third hashing chip 130, through the second connector(s) 125A, through the second hashing chip 120, through the first connector(s) 115A, through the first hashing chip 110, through intermediate connector(s) and/or component(s) between the controller 105 and the first hashing chip 110, and ultimately to the controller 105. In some examples, transmission (TX) data and reception (RX) data are XORed on the data line(s) (e.g., the first connector(s) 115A, the second connector(s) 125A, and/or other connector(s) of the hashing management architecture 100A).

In some examples, a hashing chip can become temporarily or permanently non-responsive, or can provide improper (e.g., glitchy) responses, for instance due to a hardware issue (e.g., chip damage, power surge, and/or environmental conditions), a software issue, a faulty connection (e.g., with loose connector(s) and/or signal interference), a clock issue (e.g., desynched receiving and/or desynched transmission and/or double edge sampling), data corruption, a communication protocol issue, a glitch, a bug, a misinterpreted communication, a lack of bandwidth, a lack of computational resource(s), a full queue (e.g., buffer, cache) of communications to be conveyed, or a combination thereof. In situations where a hashing chip becomes temporarily or permanently non-responsive, or provides improper (e.g., glitchy) responses, communications may fail to be transmitted through that hashing chip to other hashing chips and/or to the controller 105. For instance, if the second hashing chip 120 becomes temporarily or permanently non-responsive, and/or provides improper (e.g., glitchy) responses (e.g., due to a failure in the second hashing chip 120 itself, in the first connector(s) 115A, and/or in the second connector(s) 115B), then communication(s) sent from the controller 105 (e.g., instructions apportioning hashing calculations among the hashing chips) can fail to reach the third hashing chip 130 and/or any other hashing chips beyond the second hashing chip 120. Similarly, if the second hashing chip 120 becomes temporarily or permanently non-responsive, and/or provides improper (e.g., glitchy) responses, then communication(s) (e.g., with calculated hash digest(s)) sent from hashing chip(s) to the controller 105 through the second hashing chip 120 (e.g., from the third hashing chip 130 and/or any other hashing chips beyond the second hashing chip 120) can fail to reach the controller 105, the first hashing chip 110 and/or any other component(s) (e.g., other hashing chip(s)) between the controller 105 and the second hashing chip 120.

To improve fault tolerance, the hashing management architecture 100A includes one or more backup connector(s) 140A that couple (in some examples, directly connect) the first hashing chip 110 to the third hashing chip 130, bypassing the second hashing chip 120. In some examples, for instance, if the controller 105 has not received any data (e.g., any calculated hash digest(s)) from any hashing chips beyond the first hashing chip 110 for over a predetermined threshold amount of time, or if the controller 105 receives improper data (e.g., unreadable data, garbage data, random data, and/or improperly-formatted data) from any hashing chips beyond the first hashing chip 110 for over the predetermined threshold amount of time, second hashing chip 120 is experiencing an issue that is causing the second hashing chip 120 to be non-responsive (e.g., permanently or temporarily) and/or to provide improper response(s). The controller 105 can instruct the first hashing chip 110 and/or the third hashing chip 130 to use the backup connector(s) 140A instead of or in addition to the first connector(s) 115A and/or the second connector(s) 125A. In some examples, the first hashing chip 110 and/or the third hashing chip 130 can always use the backup connector(s) 140A to convey the same data (e.g., instructions from the controller 105 and/or hash digests from the hashing chips) that the first hashing chip 110 and/or the third hashing chip 130 convey using the first connector(s) 115A and/or the second connector(s) 125A. The first hashing chip 110 and/or the third hashing chip 130 can prioritize use of data conveyed over the first connector(s) 115A and/or the second connector(s) 125A while the data conveyed over the first connector(s) 115A and/or the second connector(s) 125A matches the data conveyed over the backup connector(s) 140A. However, in situations where data is conveyed to or from the first hashing chip 110 and/or the third hashing chip 130 over the backup connector(s) 140A, but the same data is not conveyed over the first connector(s) 115A and/or the second connector(s) 125A, the first hashing chip 110 and/or the third hashing chip 130 can interpret this situation to mean that the second hashing chip 120 is experiencing an issue (e.g., is non-responsive and/or providing improper responses) and should be bypassed using the backup connector(s) 140A.

In some examples, the hashing management architecture 100A can include alternate or additional backup connector(s) (e.g., instead of or in addition to the backup connector(s) 140A) between any two other hashing chips of the hashing management architecture 100A that have at least one other hashing chip in between them. For instance, if the hashing management architecture 100A includes a fourth hashing chip after (to the right of) the third hashing chip 130, the hashing management architecture 100A can include backup connector(s) between the second hashing chip 120 and the fourth hashing chip (e.g., bypassing the third hashing chip 130) and/or can include backup connector(s) between the first hashing chip 110 and the fourth hashing chip (e.g., bypassing the second hashing chip 120 and the third hashing chip 130).

In some examples, the backup connector(s) 140A may include one or more components along the backup connector(s) 140A, represented visually by a resistor symbol along the backup connector(s) 140A in FIG. 1A. The one or more components can include, for instance, one or more resistor(s), capacitor(s), inductor(s), memristor(s), transistor(s), filter(s), amplifier(s), clock(s), delay(s), timer(s), bit shifter(s), level shifter(s), or combination(s) thereof. In some examples, these components may, for instance, delay communication of data so that data from the backup connector(s) 140A is received within a threshold amount of time of data from the main connectors (e.g., the first connector(s) 115A, the second connector(s) 125A). In some examples, these components may, for instance reduce potential issues caused by the increased length of the backup connector(s) 140A compared to the main connectors (e.g., the first connector(s) 115A, the second connector(s) 125A), for instance by filtering out noise and/or amplifying the signal. In some examples, the one or more components may be omitted from the backup connector(s) 140A.

Figure 1B:
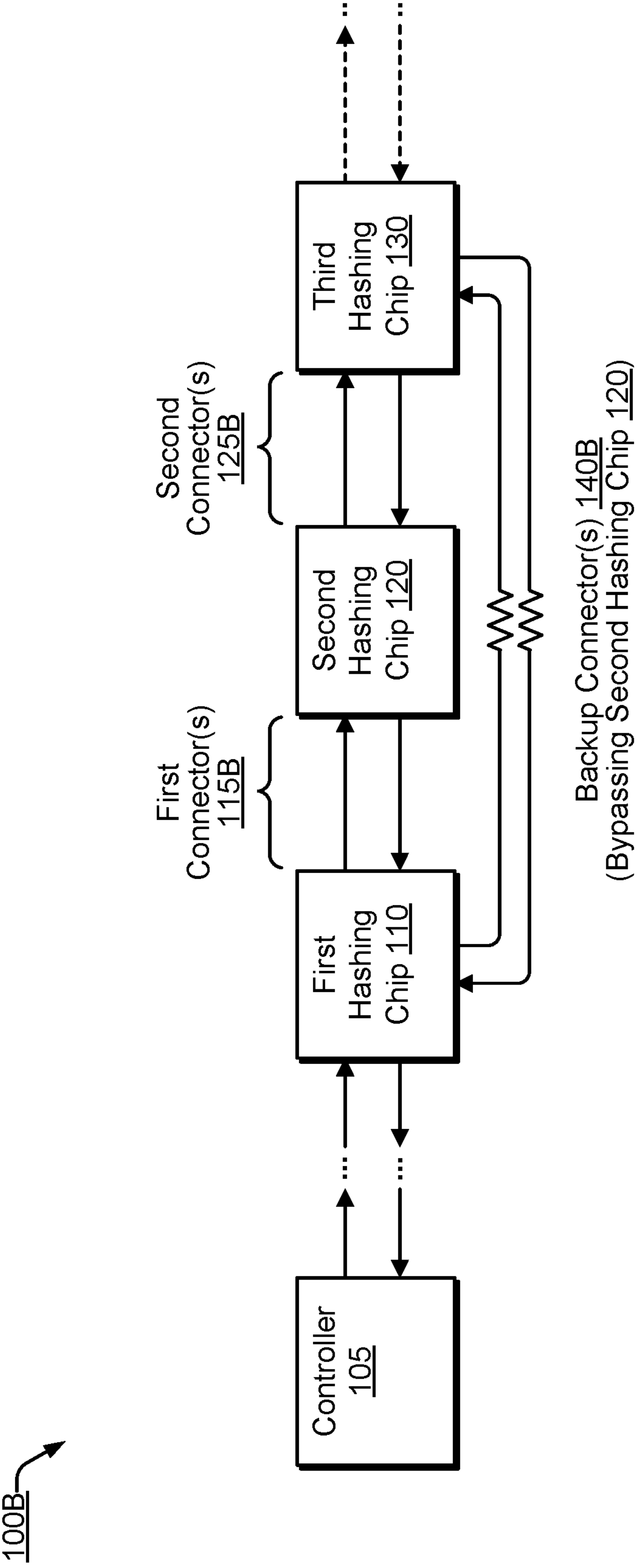
FIG. 1B is a block diagram illustrating a hashing management architecture that includes at least three hashing chips and backup connector(s) to bypass the second hashing chip, in accordance with some examples.

FIG. 1B is a block diagram illustrating a hashing management architecture 100B that includes at least three hashing chips and backup connector(s) 140B to bypass the second hashing chip 120. As in the hashing management architecture 100A of FIG. 1A, the at least three hashing chips of the hashing management architecture 100B of FIG. 1B include the first hashing chip 110, the second hashing chip 120, and the third hashing chip 130.

While the connectors of the hashing management architecture 100A of FIG. 1A (e.g., the first connector(s) 115A, the second connector(s) 125A) are illustrated single-lined double-sided arrows, the connectors of the hashing management architecture 100B of FIG. 1B (e.g., the first connector(s) 115B, the second connector(s) 125B) are instead illustrated as pairs of two single-line single-sided arrows that point in opposite directions. It should be understood that each of the arrows in FIGS. 1A-1B can represent one or more connectors (e.g., wires, plugs, ports, traces on a printed circuit board (PCB) or a flexible PCB, or combinations thereof). It should also be understood that the hashing management architecture 100B of FIG. 1B is an example of the hashing management architecture 100A of FIG. 1A.

In some examples, each pair of single-sided arrows in the hashing management architecture 100B of FIG. 1B (e.g., the first connector(s) 115B, the second connector(s) 125B) includes one or more connectors that convey data in a first direction as well as one or more connectors that convey data in a second direction. For instance, the first connector(s) 115B include one or more connectors that are configured to, and can, convey data from the first hashing chip 110 to the second hashing chip 120, represented by the arrow pointing from the first hashing chip 110 to the second hashing chip 120. The first connector(s) 115B include one or more connectors that are configured to, and can, convey data from the second hashing chip 120 to the first hashing chip 110, represented by the arrow pointing from the second hashing chip 120 to the first hashing chip 110. Similarly, the second connector(s) 125B include one or more connectors that are configured to, and can, convey data from the second hashing chip 120 to the third hashing chip 130, as well as one or more connectors that are configured to, and can, convey data from the third hashing chip 130 to the second hashing chip 120. Similarly, the backup connector(s) 140B include one or more connectors that are configured to, and can, convey data from the first hashing chip 110 to the third hashing chip 130, as well as one or more connectors that are configured to, and can, convey data from the third hashing chip 130 to the first hashing chip 110.

In some examples, each double-sided arrow in the hashing management architecture 100A of FIG. 1B (e.g., the first connector(s) 115B, the second connector(s) 125B) can include one or more single-directional connector(s) in either or both indicated directions (e.g., as in the connectors of the hashing management architecture 100B of FIG. 1B that are represented by the pairs of single-sided arrows), one or more dual-directional connector(s) (e.g., that can convey data in either or both indicated directions), or a combination thereof. For instance, the first connector(s) 115B can include one or more connectors that convey data from the first hashing chip 110 to the second hashing chip 120, one or more connectors that convey data from the second hashing chip 120 to the first hashing chip 110, one or more connectors that convey data bidirectionally between the first hashing chip 110 and the second hashing chip 120, or a combination thereof. Similarly, the second connector(s) 125B can include one or more connectors that convey data from the second hashing chip 120 to the third hashing chip 130, one or more connectors that convey data from the third hashing chip 130 to the second hashing chip 120, one or more connectors that convey data bidirectionally between the second hashing chip 120 and the third hashing chip 130, or a combination thereof. Similarly, the backup connector(s) 140B can include one or more connectors that convey data from the first hashing chip 110 to the third hashing chip 130, one or more connectors that convey data from the third hashing chip 130 to the first hashing chip 110, one or more connectors that convey data bidirectionally between the first hashing chip 110 and the third hashing chip 130, or a combination thereof.

In some examples, the backup connector(s) 140B may include one or more components along the backup connector(s) 140B, represented visually by a resistor symbol along the backup connector(s) 140B in FIG. 1B. The one or more components can include, for instance, one or more resistor(s), capacitor(s), inductor(s), memristor(s), transistor(s), filter(s), amplifier(s), clock(s), delay(s), timer(s), bit shifter(s), level shifter(s), or combination(s) thereof. In some examples, the one or more components may be omitted from the backup connector(s) 140B.

Figure 2A:
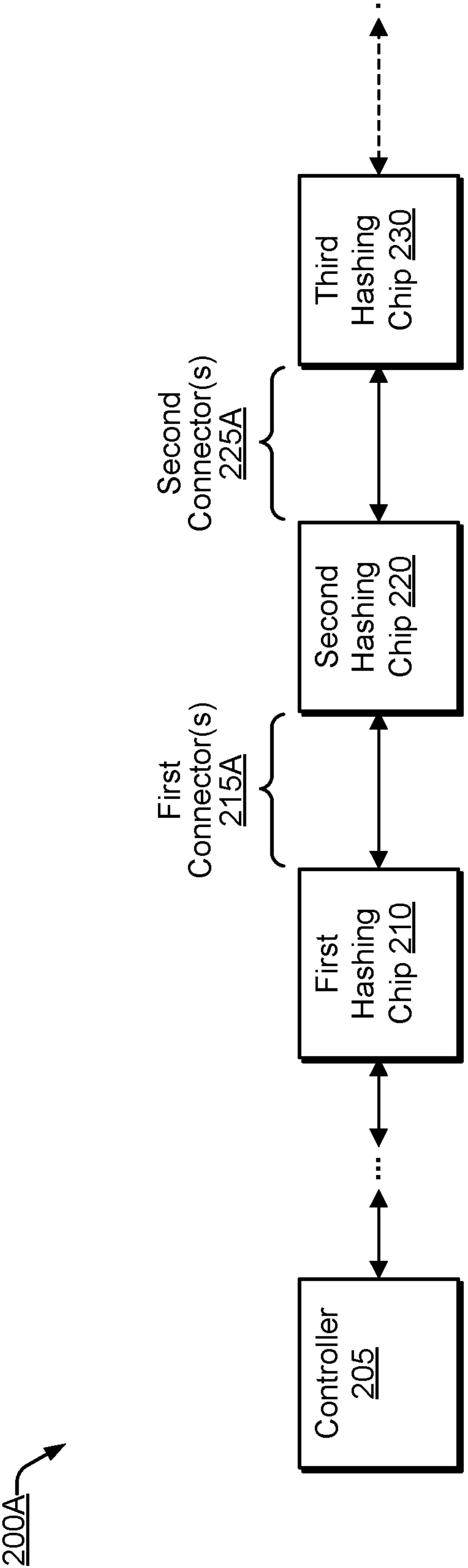
FIG. 2A is a block diagram illustrating a hashing management architecture that includes at least three hashing chips without backup connector(s) to bypass any of the hashing chips, in accordance with some examples.

FIG. 2A is a block diagram illustrating a hashing management architecture 200A that includes at least three hashing chips without backup connector(s) to bypass any of the hashing chips. The hashing management architecture 200A of FIG. 2A is similar to the hashing management architecture 100A of FIG. 1A, for instance including a controller 205, a first hashing chip 210, first connector(s) 215A, a second hashing chip 220, second connector(s) 225A, and a third hashing chip 230. The controller 205 may be an example of the controller 105, and vice versa. The first hashing chip 210 may be an example of the first hashing chip 110, and vice versa. The first connector(s) 215A may be example(s) of the first connector(s) 115A, and vice versa. The second hashing chip 220 may be an example of the second hashing chip 120, and vice versa. The second connector(s) 225A may be example(s) of the second connector(s) 125A, and vice versa. The third hashing chip 230 may be an example of the third hashing chip 130, and vice versa.

The lack of any backup connectors to bypass any of the hashing chips, such as backup connector(s) 140A that bypass the second hashing chip 120 in the hashing management architecture 100A of FIG. 1A, can cause issues with the hashing management architecture 200A of FIG. 2A. For instance, if any of the hashing chips becomes non-responsive or unresponsive (e.g., temporarily or permanently) and/or provides improper responses as discussed herein with respect to the second hashing chip 120, certain hashing chips in the hashing management architecture 200A of FIG. 2A can become effectively cut off from the controller 205 and/or other hashing chips, for instance becoming unable to receive instructions, provide results (e.g., calculated hash digest(s)), or otherwise communicate. Inclusion of backup connector(s)

to bypass certain hashing chips, such as backup connector(s) 140A that bypass the second hashing chip 120 in the hashing management architecture 100A of FIG. 1A, provides a technical solution to this problem.

Figure 2B:
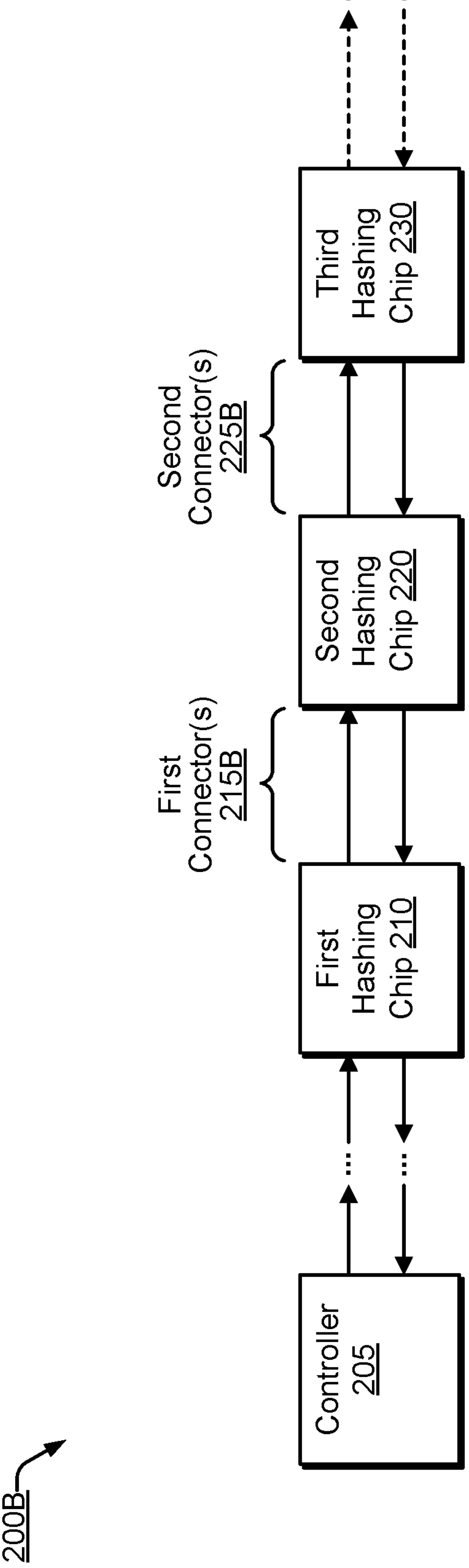
FIG. 2B is a block diagram illustrating a hashing management architecture that includes at least three hashing chips without backup connector(s) to bypass any of the hashing chips, in accordance with some examples.

FIG. 2B is a block diagram illustrating a hashing management architecture 200B that includes at least three hashing chips without backup connector(s) to bypass any of the hashing chips. The hashing management architecture 200B of FIG. 2B is similar to the hashing management architecture 100B of FIG. 1B, for instance including a controller 205, a first hashing chip 210, first connector(s) 215B, a second hashing chip 220, second connector(s) 225B, and a third hashing chip 230. The first connector(s) 215B may be example(s) of the first connector(s) 115B, and vice versa. The second connector(s) 225B may be example(s) of the second connector(s) 125B, and vice versa.

The lack of any backup connectors to bypass any of the hashing chips, such as backup connector(s) 140B that bypass the second hashing chip 120 in the hashing management architecture 100B of FIG. 1B, can cause issues with the hashing management architecture 200B of FIG. 2B. For instance, if any of the hashing chips becomes non-responsive or unresponsive (e.g., temporarily or permanently) and/or provides improper responses as discussed herein with respect to the second hashing chip 120, certain hashing chips in the hashing management architecture 200B of FIG. 2B can become effectively cut off from the controller 205 and/or other hashing chips, for instance becoming unable to receive instructions, provide results (e.g., calculated hash digest(s)), or otherwise communicate. Inclusion of backup connector(s) to bypass certain hashing chips, such as backup connector(s) 140B that bypass the second hashing chip 120 in the hashing management architecture 100B of FIG. 1B, provides a technical solution to this problem.

Figure 3A:
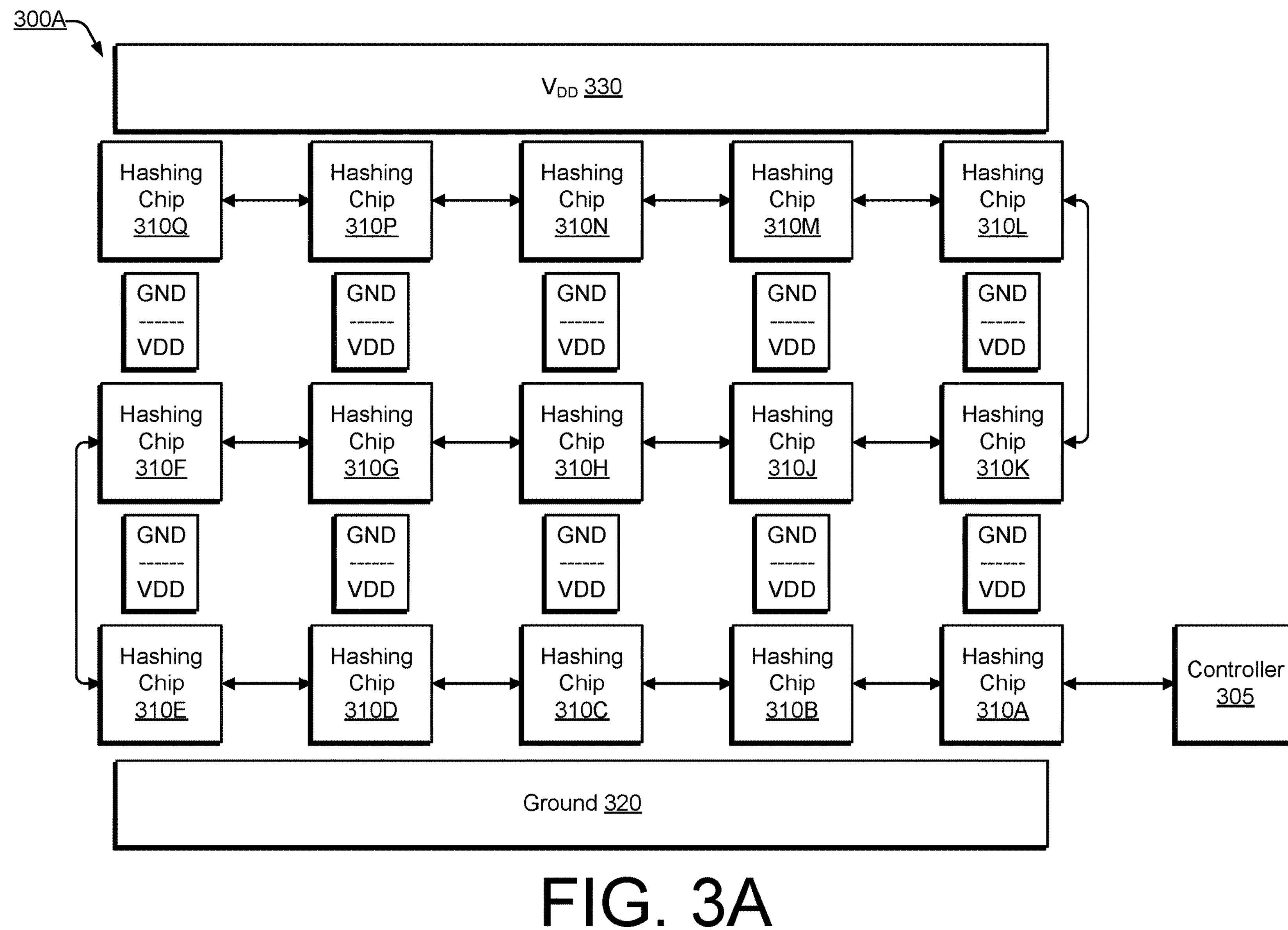
FIG. 3A is a block diagram illustrating a hashing management architecture that includes fifteen hashing chips, in accordance with some examples.
Figure 3B:
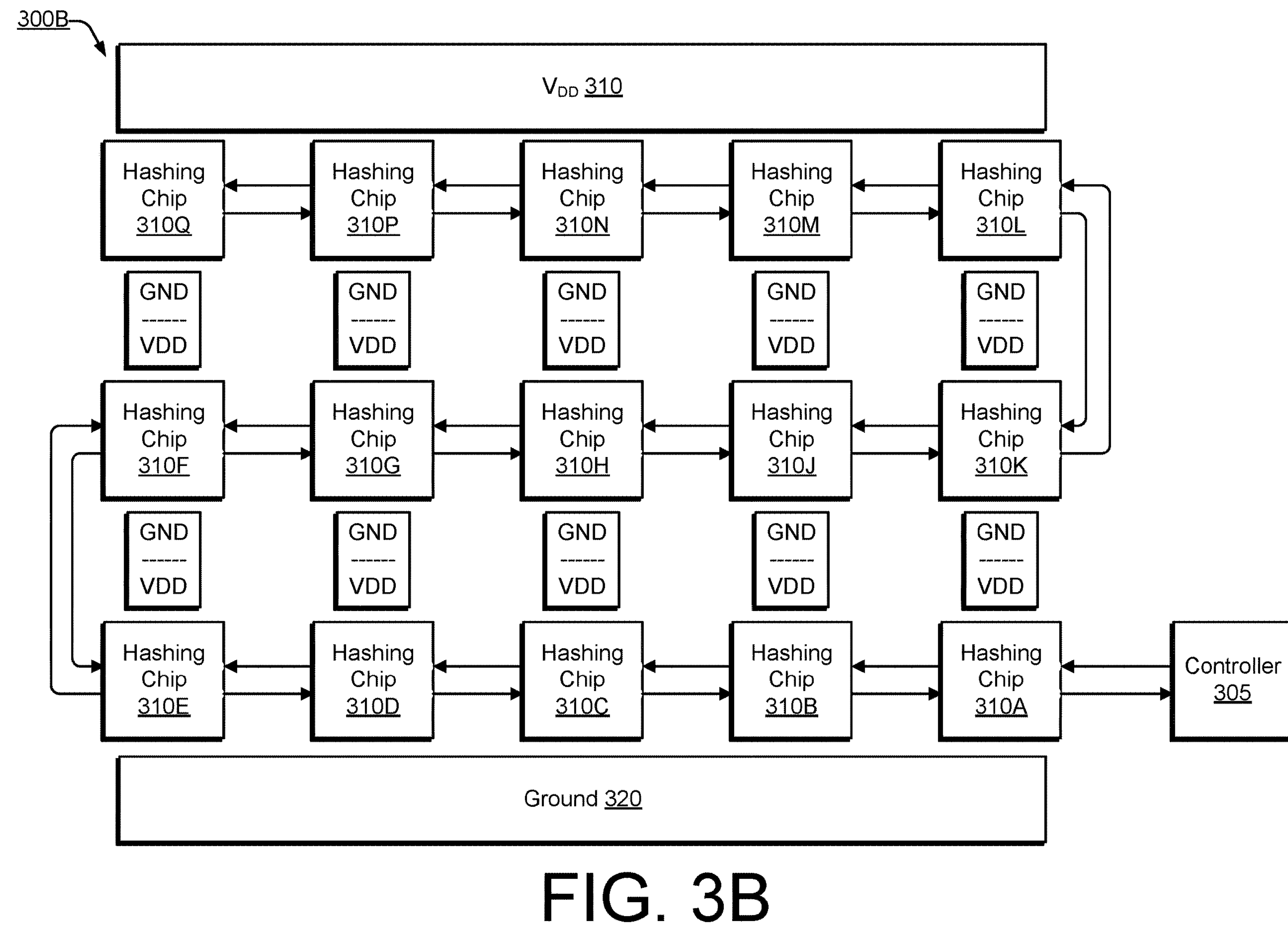
FIG. 3B is a block diagram illustrating a hashing management architecture that includes fifteen hashing chips, in accordance with some examples.

FIG. 3A is a block diagram illustrating a hashing management architecture 300A that includes fifteen hashing chips 310A-310Q. FIG. 3B is a block diagram illustrating a hashing management architecture 300B that includes fifteen hashing chips 310A-310Q. The hashing management architectures 300A-300B can be examples of the hashing management architectures 200A-200B, with more hashing chips illustrated and with power hardware illustrated. For instance, each of the hashing chips 310A-310Q can be examples of the hashing chips of FIGS. 1A-1B and/or FIGS. 2A-2B, or vice versa. The controller 305 can be an example of the controller 105 and/or the controller 205, or vice versa. In some examples, the hashing management architectures 300A-300B can be referred to as hashboards.

The hashing chips 310A-310Q are coupled to a voltage ($V_{DD}$) 330 and to ground (Gnd) 320, thus receiving power. The controller 305 can likewise be coupled to voltage ($V_{DD}$) 330 and ground (Gnd) 320, thus receiving power. The hashing chips 310A-310Q receive instructions from the controller 305, which may for instance instruct the hashing chips 310A-310Q to perform certain hashing operations, thus apportioning hashing calculations among the hashing chips 310A-310Q. The controller 305 can send the instructions through the daisy chain to reach each of the various hashing chips 310A-310Q. The hashing chips 310A-310Q send data (e.g., computed hash digest(s)) back to the controller 305, for instance through other hashing chips of the hashing chips 310A-310Q along the daisy chain. The controller 305 is coupled to the hashing chips 310A-310Q, which are coupled to one another in a daisy chain (e.g., daisy chain arrangement and/or daisy chain configuration). For instance, the controller 305 is coupled to the hashing chip 310A, the hashing chip 310A is coupled to the hashing chip 310B, the hashing chip 310B is coupled to the hashing chip 310C, and so forth, with the hashing chip 310P is coupled to the hashing chip 310Q at the end of the daisy chain.

In some examples, the hashing management architectures 300A-300B can include additional hashing chips beyond the fifteen hashing chips 310A-310Q illustrated in FIGS. 3A-3B. For instance, in some examples, additional hashing chips may be added between the controller 305 and the hashing chip 310A, after the hashing chip 310Q (e.g., in an additional row of hashing chips coupled to hashing chip 310Q similarly to how hashing chips 310E-310F are coupled), in between any two hashing chips of the hashing chips 310A-310Q, or a combination thereof. Likewise, one or more hashing chips of the hashing chips 310A-310Q can be omitted or removed from the hashing management architectures 300A-300B.

The hashing management architectures 300A-300B include one or more connectors between each pair of adjacent hashing chips (e.g., between hashing chips 310A-310B, between hashing chips 310B-310C, and so forth) and between the connector 305 and the hashing chip 310A. As in FIGS. 1B and 2B, the connectors of FIG. 3B are illustrated as pairs of single-sided arrows facing opposite directions, with each single-sided arrow representing one or more single-directional connectors. As in FIGS. 1A and 2A, the connectors of FIG. 3A are illustrated as double-sided arrows, with each double-sided arrow representing, one or more two-directional connectors, one or more single-directional connectors, or combinations thereof.

The hashing management architectures 300A-300B lack any backup connectors to bypass any of the hashing chips, such as backup connectors 140A-140B that bypass the second hashing chip 120 in the hashing management architectures 100A-100B of FIGS. 1A-1B. The lack of backup connectors in the hashing management architectures 300A-300B can cause issues with the hashing management architectures 300A-300B. For instance, if any of the hashing chips becomes non-responsive or unresponsive (e.g., temporarily or permanently) and/or provides improper responses as discussed herein with respect to the second hashing chip 120, certain hashing chips of the hashing chips 310A-310Q can become effectively cut off from the controller 305 and/or other hashing chips, for instance becoming unable to receive instructions, provide results (e.g., calculated hash digest(s)), or otherwise communicate. Inclusion of backup connector(s) to bypass certain hashing chips, such as backup connectors 140A-140B that bypass the second hashing chip 120 in the hashing management architectures 100A-100B of FIGS. 1A-1B, provides a technical solution to this problem.

Figure 3C:
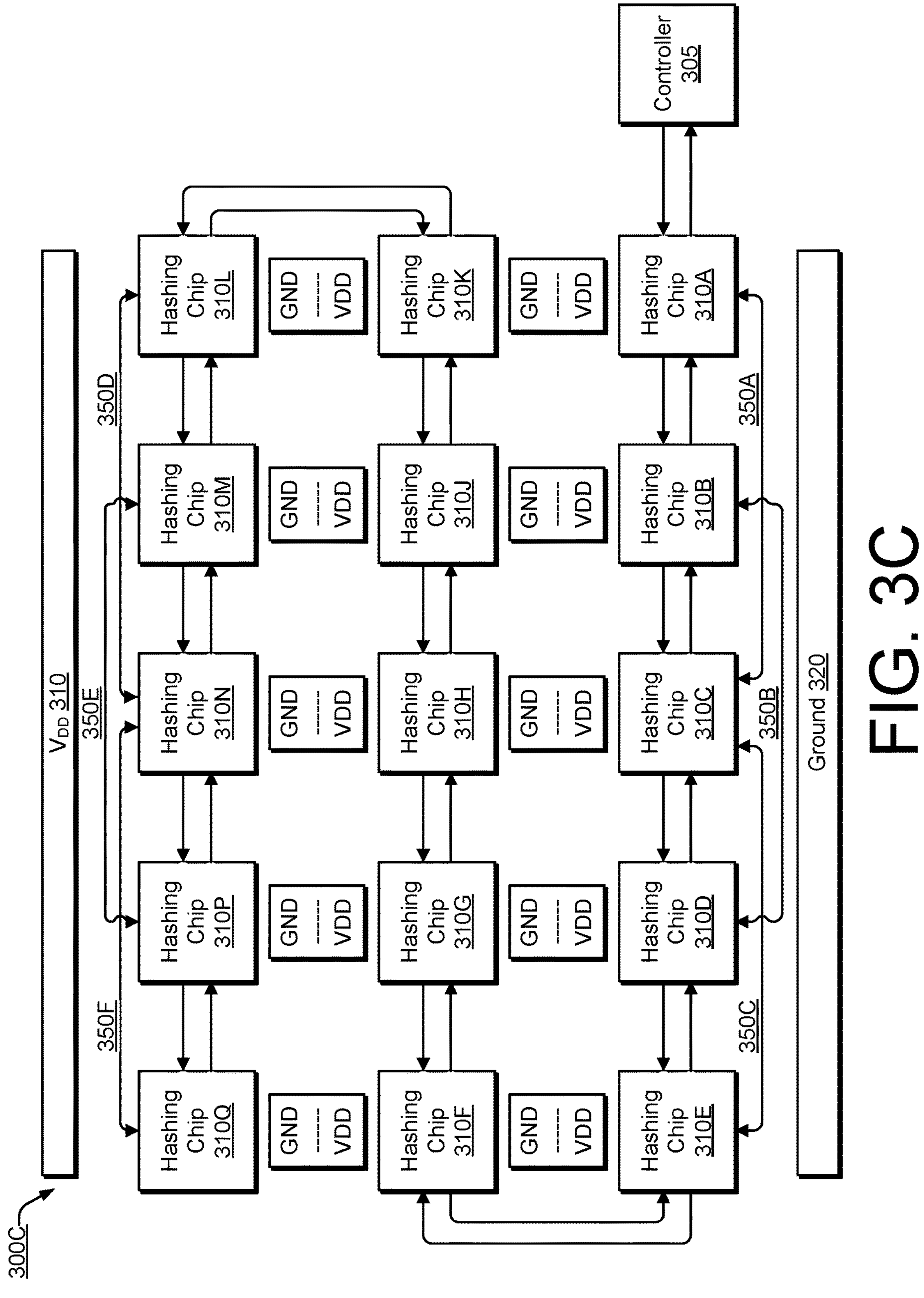
FIG. 3C is a block diagram illustrating a hashing management architecture that includes fifteen hashing chips and several backup connectors, in accordance with some examples.

FIG. 3C is a block diagram illustrating a hashing management architecture 300C that includes fifteen hashing chips 310A-310Q and several backup connectors 350A-350F. The backup connectors 350A-350F can be examples of the backup connectors 140A-140B, or vice versa. For instance, the backup connector 350A couples the hashing chip 310A to the hashing chip 310C, bypassing the hashing chip 310B and providing fault tolerance if the hashing chip 310B has issue(s) (e.g., becomes unresponsive, nonresponsive, and/or provides incorrect responses). The backup connector 350B couples the hashing chip 310B to the hashing chip 310D, bypassing the hashing chip 310C and providing fault tolerance if the hashing chip 310C has issue(s) (e.g., becomes unresponsive, nonresponsive, and/or provides incorrect responses). The backup connector 350C couples the hashing chip 310C to the hashing chip 310E, bypassing the hashing chip 310D and providing fault tolerance if the hashing chip 310D has issue(s) (e.g., becomes unresponsive, nonresponsive, and/or provides incorrect responses).

The backup connector 350D couples the hashing chip 310L to the hashing chip 310N, bypassing the hashing chip 310M and providing fault tolerance if the hashing chip 310M has issue(s) (e.g., becomes unresponsive, nonresponsive, and/or provides incorrect responses). The backup connector 350E couples the hashing chip 310M to the hashing chip 310P, bypassing the hashing chip 310N and providing fault tolerance if the hashing chip 310N has issue(s) (e.g., becomes unresponsive, nonresponsive, and/or provides incorrect responses). The backup connector 350F couples the hashing chip 310N to the hashing chip 310Q, bypassing the hashing chip 310P and providing fault tolerance if the hashing chip 310P has issue(s) (e.g., becomes unresponsive, nonresponsive, and/or provides incorrect responses).

While backup connectors 350A-350F are only illustrated for a subset of the hashing chips 310A-310Q of the hashing management architecture 300C, it should be understood that, in some examples, each hashing chip of the hashing chips 310A-310Q may be coupled to at least one backup connector that couples the hashing chip to another hashing chip, bypassing at least one hashing chip from the daisy chain in the process. For instance, in some examples, bypass connector(s) can exist that couple hashing chip 310D and hashing chip 310F together to bypass hashing chip 310E, that couple hashing chip 310E and hashing chip 310G together to bypass hashing chip 310F, that couple hashing chip 310F and hashing chip 310H together to bypass hashing chip 310G, that couple hashing chip 310G and hashing chip 310J together to bypass hashing chip 310H, that couple hashing chip 310H and hashing chip 310K together to bypass hashing chip 310J, that couple hashing chip 310J and hashing chip 310L together to bypass hashing chip 310K, that couple hashing chip 310K and hashing chip 310M together to bypass hashing chip 310L, or a combination thereof. In some examples, one or more backup connectors can be used to bypass more than one hashing chip, for instance by coupling hashing chip 310A to hashing chip 310E, bypassing hashing chips 310B-310D.

Figure 4:
FIG. 4 is a block diagram illustrating hashing chip architecture for two hashing chips with main signal inputs, main signal outputs, backup signal inputs, and backup signal outputs, in accordance with some examples.

FIG. 4 is a block diagram illustrating hashing chip architecture 400 for two hashing chips 410A-410B with main signal inputs 405A-405B, main signal outputs 435A-435B, backup signal inputs 415A-415B, and backup signal outputs 440A-440B. The hashing chips 410A-410B are examples of the hashing chips of the hashing management architectures 100A-100B (e.g., first hashing chip 110, second hashing chip 120, third hashing chip 130), hashing chips of the hashing management architecture architectures 200A-200B (e.g., first hashing chip 210, second hashing chip 220, third hashing chip 230), and/or the hashing chips 310A-310Q of the hashing management architectures 300A-300C, or a combination thereof, or vice versa.

The hashing chips 410A-410B can be part of a daisy chain of hashing chips, with each hashing chip coupled to the hashing chip(s) adjacent to it. The main connectors 445A-445C, main signal inputs 405A-405B, and main signal outputs 435A-435B represent this daisy chain. For instance, data (e.g., instructions from a controller, results from other hashing chip(s)) can be conveyed along the main connector 445A to the main signal input 405A of the hashing chip 410A. The data conveyed along the main connector 445A to the main signal input 405A can be from the controller and/or from a previous hashing chip (not pictured). A switch logic engine 425A of the hashing chip 410A can identify that the data from the main signal input 405A is received an appears to be correct (e.g., correctly formatted, correctly timed according to a clock, matching backup data 450A from a backup signal input 415A, or a combination thereof), and can instruct the multiplexer (mux) 420A to send the data from the main signal input 405A on to the logic 430A. The logic 430A can use at least portion(s) the data from the main signal input 405A, for instance by initiating hashing operation(s) based on instruction(s) from the controller that are directed to the hashing chip 410A. The logic 430A can send at least portion(s) the data from the main signal input 405A onward to the main signal output 435A, through the main connector 445B, and to the main signal input 405B of the hashing chip 410B. The logic 430A can also send at least portion(s) the data from the main signal input 405A onward to the backup signal output 440A, through the backup connector 455C as backup data 450C, and to a backup signal input of a later hashing chip (not pictured) after the hashing chip 410B, with the backup connector 455C bypassing the hashing chip 410B.

A switch logic engine 425B of the hashing chip 410B can identify that the data from the main signal input 405B is received and appears to be correct (e.g., correctly formatted, correctly timed according to a clock, matching backup data 450B from a backup signal input 415B, or a combination thereof), and can instruct the multiplexer (mux) 420B to send the data from the main signal input 405B on to the logic 430B. The logic 430B can use at least portion(s) the data from the main signal input 405B, for instance by initiating hashing operation(s) based on instruction(s) from the controller that are directed to the hashing chip 410B. The logic 430B can send at least portion(s) the data from the main signal input 405B onward to the main signal output 435B, through the main connector 445B, and to the main signal input of the next hashing chip (not pictured). The logic 430B can also send at least portion(s) the data from the main signal input 405B onward to the backup signal output 440B, through the backup connector 455D as backup data 450D, and to a backup signal input of a later hashing chip (not pictured) at least two hashing chips after the hashing chip 410B, with the backup connector 455D bypassing the next hashing chip (not pictured) that is immediately after the hashing chip 410B.

Backup data 450A may be conveyed through a backup connector 455A to the backup signal input 415A of the hashing chip 410A. In some examples, the backup connector 455A can bypass at least one previous hashing chip (not pictured), and can come from (e.g., be coupled and/or connected to) another hashing chip (not pictured) that is further back than the previous hashing chip (e.g., two or more hashing chips behind the hashing chip 410A). In some examples, if the switch logic engine 425A identifies that the main signal input 405A has not received data from the main connector 445A, but that the backup signal input 415A has received data from the backup connector 455A, the switch logic engine 425A can determine that the multiplexer 420A should send the data from the backup signal input 415A on to the logic 430A, the main signal output 435A, and/or the backup signal output 440A.

In some examples, the switch logic engine 425A can use a comparison between the data from the main signal input 405A and the data from the backup signal input 415A to decide which data to use for the logic 430A, the main signal output 435A, and/or the backup signal output 440A. For instance, if the switch logic engine 425A identifies that the main signal input 405A has received corrupted data (e.g., data with noise, errors, and/or improper formats) from the main connector 445A, but that the backup signal input 415A has received uncorrupted data from the backup connector 455A, the switch logic engine 425A can determine that the multiplexer 420A should send the data from the backup signal input 415A on to the logic 430A, the main signal output 435A, and/or the backup signal output 440A. If the switch logic engine 425A identifies that at least a subset of the data received at the main signal input 405A matches at least a subset of the data received at the backup signal input 415A, the switch logic engine 425A can determine that the multiplexer 420A should send the data from the main signal input 405A on to the logic 430A, the main signal output 435A, and/or the backup signal output 440A.

Backup data 450B may be conveyed through a backup connector 455B to the backup signal input 415B of the hashing chip 410B. In some examples, the backup connector 455B can bypass the hashing chip 410A, and can come from (e.g., be coupled and/or connected to) a previous hashing chip (not pictured) before the hashing chip 410A (e.g., two or more hashing chips behind the hashing chip 410B). In some examples, if the switch logic engine 425B identifies that the main signal input 405B has not received data from the main connector 445B, but that the backup signal input 415B has received data from the backup connector 455B, the switch logic engine 425B can determine that the multiplexer 420B should send the data from the backup signal input 415B on to the logic 430B, the main signal output 435B, and/or the backup signal output 440B.

In some examples, the switch logic engine 425B can use a comparison between the data from the main signal input 405B and the data from the backup signal input 415B to decide which data to use for the logic 430B, the main signal output 435B, and/or the backup signal output 440B. For instance, if the switch logic engine 425B identifies that the main signal input 405B has received corrupted data (e.g., data with noise, errors, and/or improper formats) from the main connector 445B, but that the backup signal input 415B has received uncorrupted data from the backup connector 455B, the switch logic engine 425B can determine that the multiplexer 420B should send the data from the backup signal input 415B on to the logic 430B, the main signal output 435B, and/or the backup signal output 440B. If the switch logic engine 425B identifies that at least a subset of the data received at the main signal input 405B matches at least a subset of the data received at the backup signal input 415B, the switch logic engine 425B can determine that the multiplexer 420B should send the data from the main signal input 405B on to the logic 430B, the main signal output 435B, and/or the backup signal output 440B.

In some examples, the backup connector(s) 455A-455D may include one or more components along the backup connector(s) 455A-455D, represented visually by a resistor symbol along the backup connector(s) 455B-455C in FIG. 4. The one or more components can include, for instance, one or more resistor(s), capacitor(s), inductor(s), memristor(s), transistor(s), filter(s), amplifier(s), clock(s), delay(s), timer(s), bit shifter(s), level shifter(s), or combination(s) thereof. In some examples, the one or more components may be omitted from the backup connector(s) 455A-455D.

In some examples, each of the arrows representing connectors (e.g., main connectors 445A-445C and/or backup connectors 455A-455D) can include one or more connectors. For instance, in some examples, each connector arrow can represent individual connectors conveying data (e.g., instructions and/or hash digest results), clock information, reference clock information, and the like. In some examples, the connectors, inputs, and/or outputs can use a variety of protocols and/or interfaces, including serial peripheral interface (SPI), universal asynchronous receiver/transmitter (UART), bi-directional UART, s-link, or a combination thereof. In some examples, the connectors can include unidirectional connectors that can only convey data in a single direction, such as the direction of the arrows illustrated in FIG. 4. In some examples, the connectors can include bidirectional connectors that can convey data in either or both directions, and the direction of the arrows illustrated in FIG. 4 can be understood to be an illustrative example of an exemplary route of a given piece of data. For instance, in some examples, instructions from the controller can follow the directions illustrated in the arrows of FIG. 4 (e.g., left to right), while results (e.g., hash digest(s)) conveyed back to the controller can follow the opposite directions (e.g., right to left) of the directions illustrated in the arrows of FIG. 4 (e.g., left to right).

Figure 5:
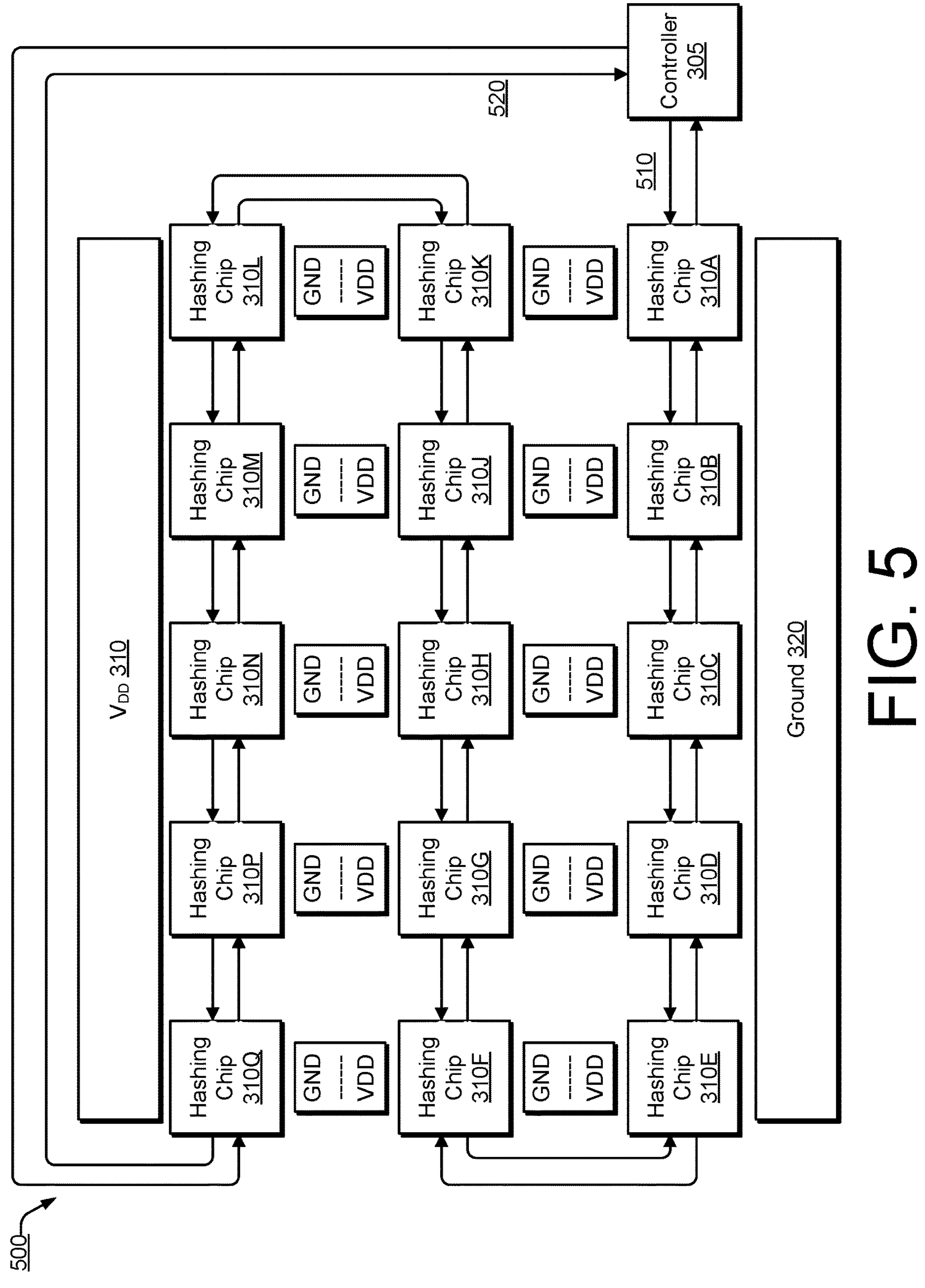
FIG. 5 is a block diagram illustrating a hashing management architecture that includes at least fifteen hashing chips that are coupled to a controller through dual loop paths, in accordance with some examples.

FIG. 5 is a block diagram illustrating a hashing management architecture 500 that includes at least fifteen hashing chips 310A-310Q that are coupled to a controller 305 through dual loop paths 510-520. The hashing management architecture 500 is a modification of the hashing management architecture 300B that adds the path 520. The path 510 couples the controller 505 to the hashing chip 310A, which couples to the hashing chip 310B, which couples to the hashing chip 310C, and so forth. The path 520 couples the controller 505 to the hashing chip 310Q, which couples to the hashing chip 310P, which couples to the hashing chip 310N, and so forth. The dual paths 510-520 provide additional fault tolerance to the hashing management architectures 300A-300B. For instance, if the hashing chip 310H fails (e.g., becomes unresponsive, nonresponsive, and/or provides incorrect responses) under the hashing management architectures 300A-300B, then the controller 305 of the hashing management architectures 300A-300B can lose control over hashing chips 310H-310Q. On the other hand, if the hashing chip 310H fails (e.g., becomes unresponsive, nonresponsive, and/or provides incorrect responses) under the hashing management architecture 500, then the controller 305 of the hashing management architecture 500, in the worst case scenario, only loses control over hashing chip 310H, still retaining control over the hashing chips 310J-310Q. In some examples, the hashing management architecture 500 can be implemented using a slight modification to the controller 305, a slight modification to the communication protocol (e.g., SPI, UART, and/or s-link), or a combination thereof.

However, the hashing management architecture 500 can still encounter issues in that it provides limited fault tolerance, and can still cause the controller 305 to lose control of a significant number of hashing chips if more than one hashing chip fails (e.g., becomes unresponsive, nonresponsive, and/or provides incorrect responses). For instance, if hashing chip 310B and hashing chip 310P both fail (e.g., become unresponsive, nonresponsive, and/or provide incorrect responses), the controller 305 can still lose control of hashing chips 310B-310P.

Figure 6:
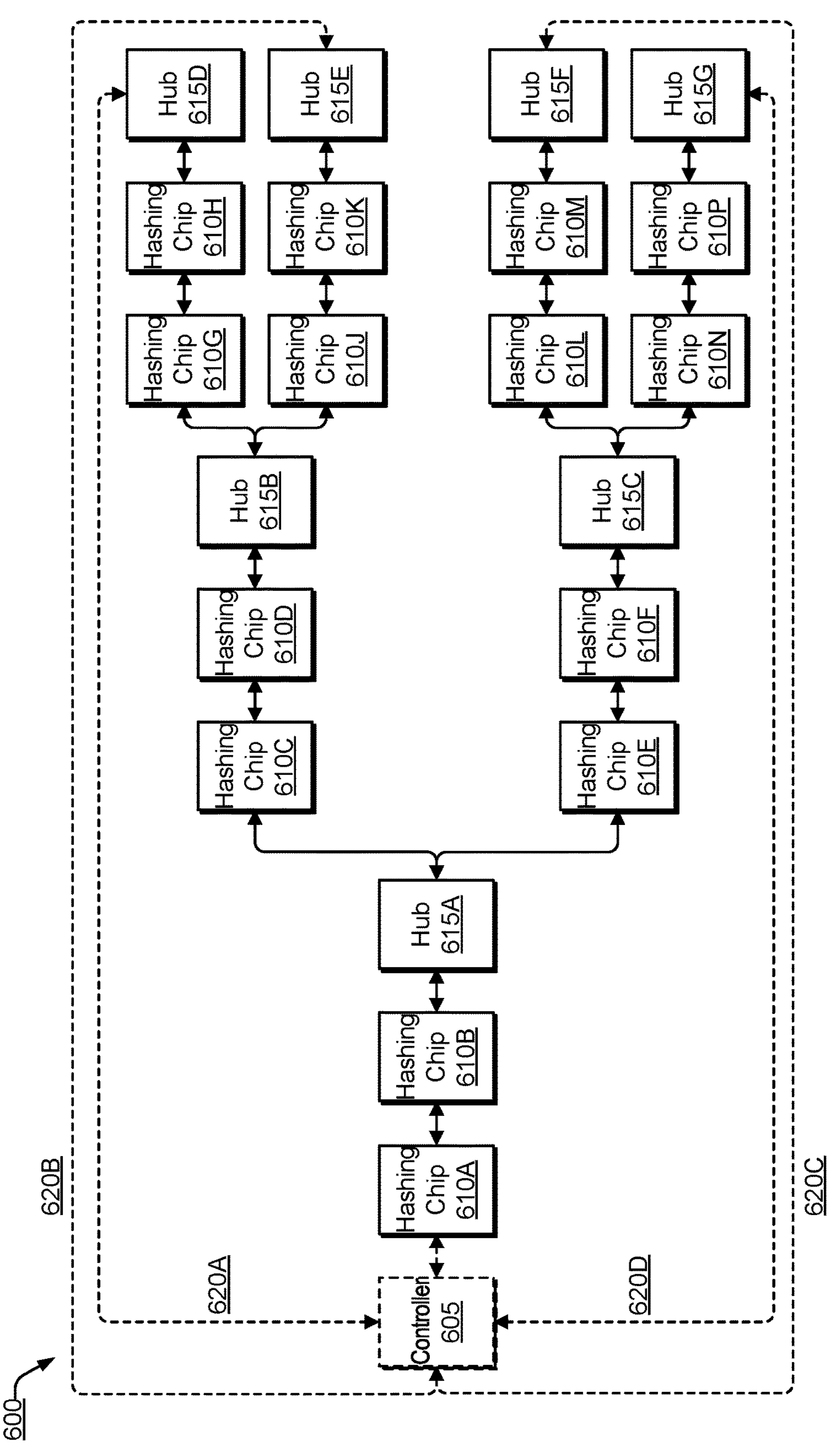
FIG. 6 is a block diagram illustrating a hashing management architecture that includes fourteen hashing chips that are coupled to hubs and/or a controller through a tree arrangement, in accordance with some examples.

FIG. 6 is a block diagram illustrating a hashing management architecture 600 that includes fourteen hashing chips 610A-610P that are coupled to hubs 615A-615G and/or a controller 605 through a tree arrangement. The tree arrangement may be referred to as a tree structure or tree configuration. The hashing chips 610A-610P can be examples of the hashing chips of FIGS. 1A-1B, the hashing chips of FIGS. 2A-2B, the hashing chips 310A-310Q, the hashing chips 410A-410B, a combination thereof, or vice versa. The controller 605 and/or the hubs 615A-615G can be examples of controllers (e.g., controller 105, controller 205, controller 305), and/or can function to direct data through the tree structure. In some examples, the hashing management architecture 600 can include a dual-loop configuration, for instance with the controller 605 coupled both to the hashing chip 610A but also to various leaves of the tree structure, for instance to the hub 615D through connector 620A, to the hub 615E through connector 620B, to the hub 615F through connector 620C, and/or to the hub 615G through connector 620D.

In some examples, the controller 605, the various hashing chips 610A-610P, and the various hubs 615A-615G of the tree arrangement of the hashing management architecture 600 can be referred to as nodes or elements of the tree arrangement of the hashing management architecture 600. In some examples, for a specific node, another node upstream of the specific node can be referred to as a parent node or a root node. In some examples, for a specific node, another node downstream of the specific node can be referred to as a child node or a leaf node. In some examples, the tree arrangement of the hashing management architecture 600 includes certain nodes that have a parent node and multiple child nodes. For instance, in some examples, the tree arrangement of the hashing management architecture 600 includes at least one hub that is configured to, and can, convey data from a parent node hashing chip to a set of child node hashing chips, and vice versa.

In a first illustrative example, the hub 615A may convey data (e.g., instructions from the controller 605) from the (parent node) hashing chip 610B to the (child node) hashing chip 610C and to the (child node) hashing chip 610E. Likewise, the hub 615A may convey data (e.g., computed hash digest(s)) from the (child node) hashing chip 610C and/or from the (child node) hashing chip 610E to the (parent node) hashing chip 610B (e.g., to send the data back to the controller 605). In a second illustrative example, the hub 615B may convey data (e.g., instructions from the controller 605) from the (parent node) hashing chip 610D to the (child node) hashing chip 610G and to the (child node) hashing chip 610J. Likewise, the hub 615B may convey data (e.g., computed hash digest(s)) from the (child node) hashing chip 610G and/or from the (child node) hashing chip 610J to the (parent node) hashing chip 610D (e.g., to send the data back to the controller 605). In a third illustrative example, the hub 615C may convey data (e.g., instructions from the controller 605) from the (parent node) hashing chip 610F to the (child node) hashing chip 610L and to the (child node) hashing chip 610N. Likewise, the hub 615C may convey data (e.g., computed hash digest(s)) from the (child node) hashing chip 610L and/or from the (child node) hashing chip 610N to the (parent node) hashing chip 610F (e.g., to send the data back to the controller 605).

Figure 7:
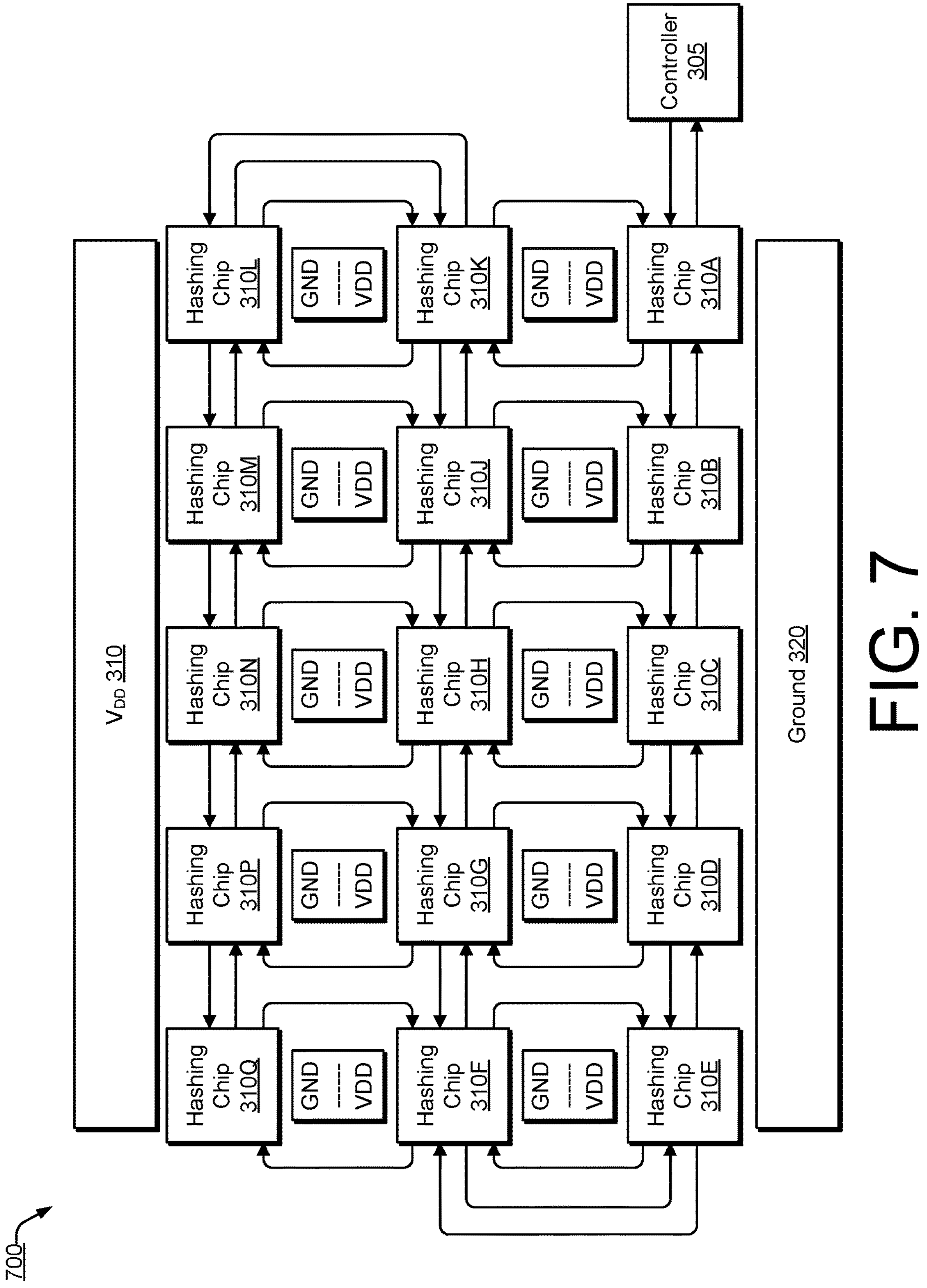
FIG. 7 is a block diagram illustrating a hashing management architecture that includes at least fifteen hashing chips that are coupled to a controller through a meshed structure, in accordance with some examples.

FIG. 7 is a block diagram illustrating a hashing management architecture 700 that includes at least fifteen hashing chips 310A-310Q that are coupled to a controller 305 through a meshed structure. The hashing management architecture 700 is a modification of the hashing management architecture 300B that adds the meshed structure. The meshed structure of hashing management architecture 700 adds backup connector(s) between the hashing chip 310A and the hashing chip 310K, backup connector(s) between the hashing chip 310B and the hashing chip 310J, backup connector(s) between the hashing chip 310C and the hashing chip 310H, backup connector(s) between the hashing chip 310D and the hashing chip 310G, backup connector(s) between the hashing chip 310E and the hashing chip 310F, backup connector(s) between the hashing chip 310F and the hashing chip 310Q, backup connector(s) between the hashing chip 310G and the hashing chip 310P, backup connector(s) between the hashing chip 310H and the hashing chip 310N, backup connector(s) between the hashing chip 310J and the hashing chip 310M, and/or backup connector(s) between the hashing chip 310K and the hashing chip 310L. The meshed structure, with its various backup connectors, makes the hashing management architecture 700 fully resistant to failure of any hashing chip(s) of the hashing chips 310A-310Q. For instance, if one or more of the hashing chips 310A-310Q fail (e.g., become unresponsive, nonresponsive, and/or provide incorrect responses), the controller 305 of the hashing management architecture 700 only loses control over those failed hashing chips, with all other hashing chips remaining functional and in control of the controller 705 of the hashing management architecture 700.

Figure 8:
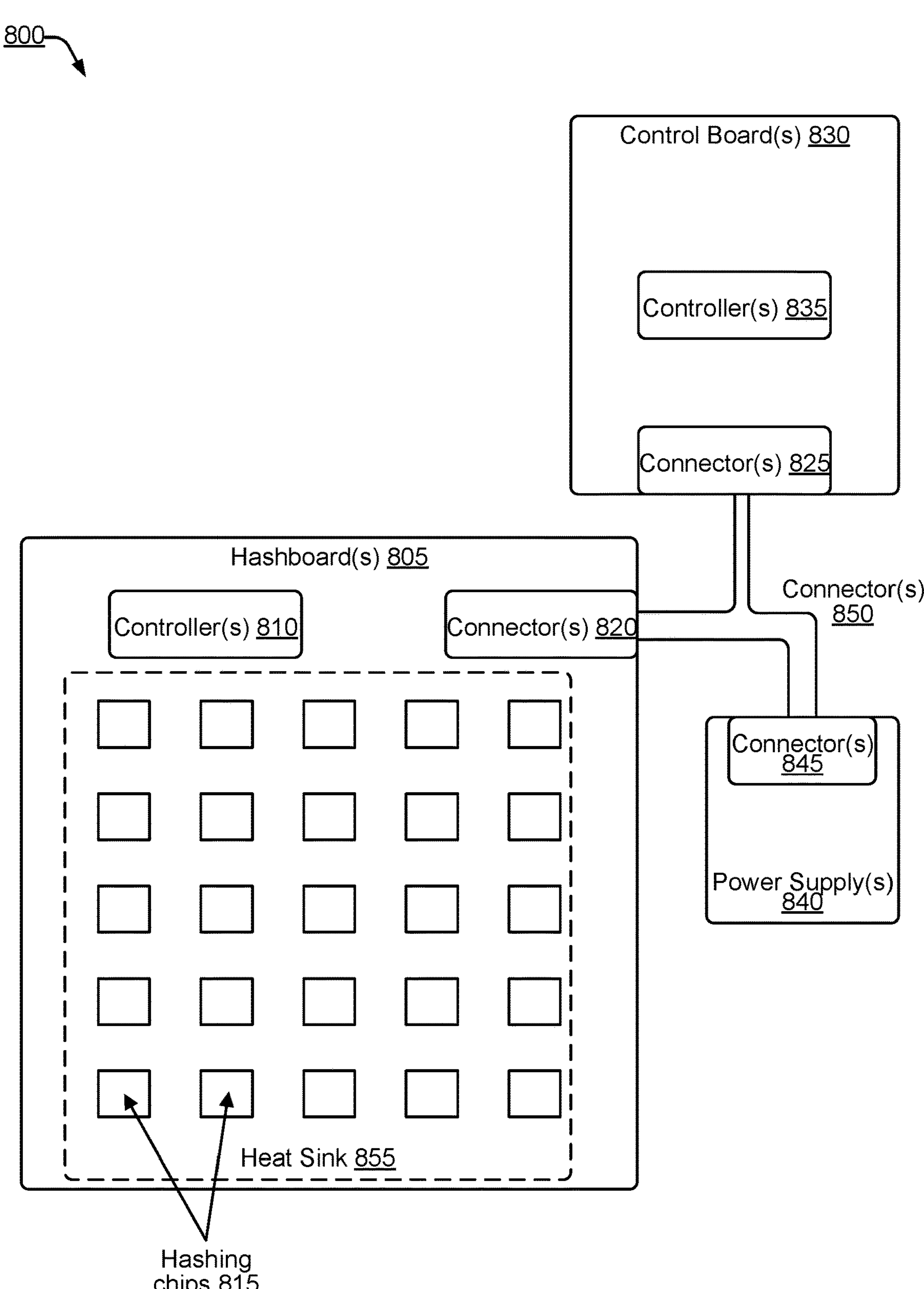
FIG. 8 is a block diagram illustrating an architecture of a hashing management system that includes one or more hashboards, one or more control boards, and one or more power supplies, in accordance with some examples.

FIG. 8 is a block diagram illustrating an architecture of a hashboard system 800 that includes one or more hashboards 805, one or more control boards 830, and one or more power supplies 840. Each of the hashboard(s) 805 can be, for instance, an example of the hashboard having a hashing management architecture 100A-100B, hashing management architecture 200A-200B, a hashing management architecture 300A-300C, a hashing management architecture 400, a hashing management architecture 500, a hashing management architecture 600, a hashing management architecture 700, or a combination thereof. The hashboard(s) 805 are illustrated as including a hashboard that includes a set of twenty-five (25) hashing chips (e.g., including two labeled hashing chips 815), illustrated as squares along the illustrated hashboard of the hashboard(s) 805. The illustrated hashboard of the hashboard(s) 805 includes one or more onboard controller(s) 810 that can control certain aspects of the hashing chips (e.g., hashing chips 815) of the hashboard(s) 805, for instance to apportion hashing calculations among the hashing chips (e.g., hashing chips 815).

Examples of the hashing chips (e.g., hashing chips 815) include the first hashing chip 110, the second hashing chip 120, the third hashing chip 130, the first hashing chip 210, the second hashing chip 220, the third hashing chip 230, the hashing chips 310A-310Q, the hashing chips 410A-410B, the hashing chips 610A-610P, or a combination thereof. Examples of the controller(s) 810 can include the controller 105, the controller 205, the controller 305, the controller 605, the hubs 615A-615G, or a combination thereof. The illustrated hashboard of the hashboard(s) 805 includes a heatsink 855 coupled to the hashing chips (e.g., hashing chips 815), illustrated as a rectangle with a dashed line overlaid over the hashing chips (e.g., hashing chips 815). The illustrated hashboard of the hashboard(s) 805 includes one or more connector(s) 820, which may allow the hashboard(s) 805 to couple to (e.g., connect to) other hashboard(s) of the hashboard(s) 805, the control board(s) 830, and/or the power supply(s) 840.

The hashboard system 800 includes control board(s) 830. Each of the control board(s) 830 includes one or more controller(s) 835. Examples of the controller(s) 835 can include the controller 105, the controller 205, the controller 305, the controller 605, the hubs 615A-615G, or a combination thereof. In some examples, hashing management control (e.g., apportioning of hashing calculations, sending of associated hashing instructions, and/or receiving of hash digests from the hashing chips) can be performed at least in part by the controller(s) 835 of the control board(s) 830, performed at least in part by the controller(s) 810 of the hashboard(s) 805, or a combination thereof. The control board(s) 830 can include connector(s) 825, which may allow the control board(s) 830 to couple to (e.g., connect to) the hashboard(s) 805 and/or the power supply(s) 840.

The hashboard system 800 includes power supply(s) 840. Each of the power supply(s) 840 provides power to the hashboard(s) 805 and/or the control board(s) 830 through connector(s) 845. In some examples, the power supply(s) 840 include, and provide power from, one or more batteries, capacitors, generators, solar panels, and/or connection(s) to an electrical grid, or a combination thereof.

The hashboard system 800 includes connector(s) 850, which can include wires, cables, flexible conductors, and the like. In some examples, the connector(s) 820 of the hashboard(s) 805 are coupled to the connector(s) 825 of the control board(s) 830 using the connector(s) 850, for instance allowing the controller(s) 835 to provide instructions to the hashing chips (e.g., hashing chips 815) of the hashboard(s) 805 (e.g., in some cases through the controller(s) 810) and/or to receive calculation results (e.g., hash digests) from the hashing chips (e.g., hashing chips 815) of the hashboard(s) 805 (e.g., in some cases through the controller(s) 810). In some examples, the connector(s) 820 of the hashboard(s) 805 are coupled to the connector(s) 845 of the power supply(s) 840 using the connector(s) 850, for instance to provide power from the power supply(s) 840 to the hashboard(s) 805 to power operation of the hashboard(s) 805. In some examples, the connector(s) 825 of the control board(s) 830 are coupled to the connector(s) 845 of the power supply(s) 840 using the connector(s) 850, for instance to provide power from the power supply(s) 840 to the control board(s) 830 to power operation of the control board(s) 830.

In some examples, the controller(s) 810 can control certain aspects (e.g., certain tasks) of the hashing chips (e.g., hashing chips 815) of the hashboard(s) 805. In some examples, the controller(s) 835 can control certain aspects (e.g., certain tasks) of the hashing chips (e.g., hashing chips 815) of the hashboard(s) 805. In some examples, the controller(s) 810 control a first set of aspects (e.g., a first set of tasks) of the hashing chips (e.g., hashing chips 815) of the hashboard(s) 805, while the controller(s) 835 control a second set of aspects (e.g., a second set of tasks) of the hashing chips (e.g., hashing chips 815) of the hashboard(s) 805. The aspects and/or tasks controlled by the controller(s) 810 and/or the controller(s) 835 can include, for instance, running mining application(s), apportioning mining and/or hashing operations across the hashing chips, providing a user interface for the mining application, providing internet connectivity, monitoring characteristics (e.g., temperature) of the hashing chips, adjusting operation of hashing chips based on the monitored characteristics of the hashing chips, running application programming interface(s) (API(s)), or combinations thereof. In an illustrative example, the controller(s) 810 can perform ASIC balancing of tasks across the hashing chips (e.g., the hashing chips 815), while higher level control functions (e.g., providing a user interface for a mining program) can be controlled by the controller(s) 835.

In some examples, a hashing management system may have a combination of elements from the hashing management architecture(s) 100A-100B, the hashing management architecture(s) 200A-200B, the hashing management architecture(s) 300A-300B, the hashing management architecture 400, the hashing management architecture 500, the hashing management architecture 600, the hashing management architecture 700, and/or the hashboard system 800. For instance, in some examples, a hashing management system can include aspects of the backup connectors of the hashing management architecture 300C, the various inputs and outputs of the hashing management architecture 400, the dual loop pathways 510-520 of the hashing management architecture 500, the tree arrangement of the hashing management architecture 600, the mesh structure and/or backup connectors of the hashing management architecture 700, the hashboard(s) 805 and/or control board(s) 830 and/or power supply(s) 840 of the hashboard system 800, or a combination thereof.

Figure 9:
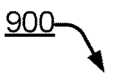
FIG. 9 is a flow diagram illustrating a process for hashing management, in accordance with some examples.
Figure 9:
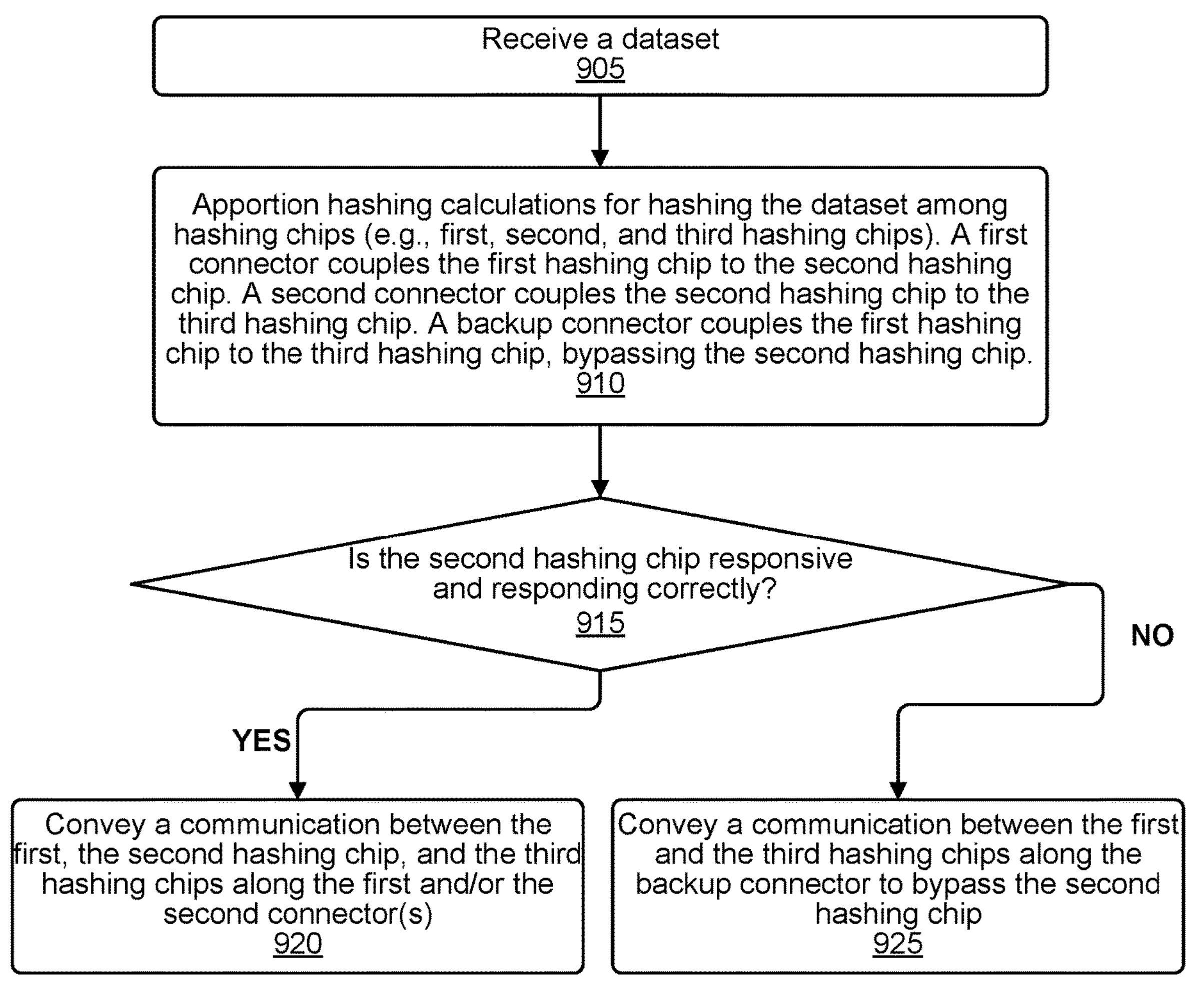

FIG. 9 is a flow diagram illustrating a process 900 for hashing management. The process 900 can be performed by, and/or using, a hashing management system. The hashing management system can include, for instance, the hashing management architecture 100A-100B, the controller 105, first hashing chip 110, the second hashing chip 120, the third hashing chip 130, the hashing management architecture 200A-200B, the controller 205, the first hashing chip 210, the second hashing chip 220, the third hashing chip 230, the hashing management architecture 300A-300C, the controller 305, the hashing chips 310A-310Q, the hashing management architecture 400, the hashing chips 410A-410B, the hashing management architecture 500, the hashing management architecture 600, the controller 605, the hashing chips 610A-610P, the hubs 615A-615G, the hashing management architecture 700, the hashboard system 800, the hashboard(s) 805, the controller(s) 810, the hashing chips 815, the control board(s) 830, the controller(s) 835, the power supply(s) 840, another hashing management architecture or hashing management system discussed herein, another hashboard discussed herein, another controller discussed herein, another hashing chip discussed herein, another computing system discussed herein, another computer discussed herein, another processor discussed herein, the environment 1000 for application interface customization, the environment 1100, the system 1200, a system, a processor that performs instructions stored in a non-transitory computer-readable storage medium, any subsystems or components of any of the above-listed systems, any other computing systems discussed herein, or a combination thereof.

At operation 905, the hashing management system (or a subsystem thereof) is configured to, and can, receive at least one dataset. In some examples, the dataset includes data that is to be hashed, for instance as part of distributed ledger calculation(s), consensus mechanism calculation(s), consensus algorithm calculation(s), cryptocurrency mining calculation(s), cryptocurrency calculation(s), mining calculation(s), or a combination thereof.

At operation 910, the hashing management system (or a subsystem thereof) is configured to, and can, apportion hashing calculations for hashing the at least one dataset among a plurality of hashing chips. The plurality of hashing chips includes at least a first hashing chip (e.g., the first hashing chip 110, the first hashing chip 210), a second hashing chip (e.g., the second hashing chip 120, the second hashing chip 220), and a third hashing chip (e.g., the third hashing chip 130, the third hashing chip 230). The first hashing chip is coupled to the second hashing chip using at least a first connector (e.g., the first connector(s) 115A-115B, the first connector(s) 215A-215B). The second hashing chip is coupled to the third hashing chip using at least a second connector (e.g., the second connector(s) 125A-125B, the second connector(s) 225A-225B). The first hashing chip is coupled to the third hashing chip using at least a backup connector that bypasses the second hashing chip (e.g., the backup connector(s) 140A-140B, the backup connector(s) 350A-350F, the backup connector(s) of the meshed structure of the hashing management architecture 700).

Examples of the hashing chips of operation 910 include the first hashing chip 110, the second hashing chip 120, the third hashing chip 130, the first hashing chip 210, the second hashing chip 220, the third hashing chip 230, the hashing chips 310A-310Q, the hashing chips 410A-410B, the hashing chips 610A-610P, the hashing chips 815, or a combination thereof. In some examples, the apportioning of hashing management system is performed by one or more controllers, for instance including the controller 105, the controller 205, the controller 305, the controller 605, the hubs 615A-615G, the controller(s) 810, the control board(s) 830, the controller(s) 835, or a combination thereof. In some examples, the hashing chips can be arranged and/or coupled to controllers as illustrated in the hashing management architecture 100A-100B, the hashing management architecture 200A-200B, the hashing management architecture 300A-300C, the hashing management architecture 400, the hashing management architecture 500, the hashing management architecture 600, the hashing management architecture 700, the hashboard system 800, or a combination thereof.

In some examples, the first hashing chip is connected to (e.g., directly connected to) the second hashing chip using the first connector. In some examples, the second hashing chip is connected to (e.g., directly connected to) the third hashing chip using the second connector. In some examples, the first hashing chip is connected to (e.g., directly connected to) the third hashing chip using the backup connector that bypasses the second hashing chip.

In some examples, the first hashing chip is connected to the second hashing chip using at least the first connector as part of a daisy chain, and the second hashing chip is connected to the third hashing chip using at least the second connector as part of the daisy chain. In some examples, the backup connector bypasses a portion of the daisy chain that includes at least the second hashing chip, the first connector, and the second connector.

In some examples, each hashing chip of the plurality of hashing chips is connected as part of the daisy chain. In some examples, each hashing chip of the plurality of hashing chips is connected to one of a plurality of backup connectors, with each of the plurality of backup connectors bypassing at least one of the plurality of hashing chips in the daisy chain. In such examples, the plurality of backup connectors includes the backup connector that bypasses the second hashing chip. For instance, the backup connectors 350A-350F of the hashing management architecture 300C, and the and the backup connectors of the mesh structure of the hashing management architecture 700, can be examples of the plurality of backup connectors.

In some examples, each hashing chip of the plurality of hashing chips includes a first input contact (e.g., main signal inputs 405A-405B) and a second input contact (e.g., backup signal inputs 415A-415B). The first input contact is coupled to at least a portion of the daisy chain (e.g., main connectors 445A-445C). The second input contact is coupled to one of a plurality of backup connectors (e.g., backup connectors 455A-455D) that bypasses one of the plurality of hashing chips in the daisy chain. In such examples, the plurality of backup connectors includes the backup connector that bypasses the second hashing chip.

At operation 915, the hashing management system (or a subsystem thereof) is configured to, and can, determine whether the second hashing chip is responsive and responding correctly. If, at operation 915, the hashing management system determines that the second hashing chip is responsive and responding correctly, the operation 915 can be followed by the operation 920. If, at operation 915, the hashing management system determines that the second hashing chip is not responsive and/or not responding correctly, the operation 915 can be followed by the operation 925.

At operation 920, the hashing management system (or a subsystem thereof) is configured to, and can, convey a communication between the first hashing chip, the second hashing chip, and the third hashing chip along the first connector and/or the second connector At operation 925, the hashing management system (or a subsystem thereof) is configured to, and can, convey a communication between the first hashing chip and the third hashing chip along the backup connector to bypass the second hashing chip in response to the determining that the second hashing chip is nonresponsive.

In some examples, a controller of the hashing management system instructs the first hashing chip to send the communication to the third hashing chip along the backup connector that bypasses the second hashing chip in response to the determination that the second hashing chip is nonresponsive. In some examples, the determination that the second hashing chip is nonresponsive is made at least in part by the controller.

In some examples, the determination that the second hashing chip is nonresponsive is made at least in part by the first hashing chip and/or by the third hashing chip, for instance based on receiving data at a backup signal input (e.g., backup signal inputs 415A-415B) without receiving data at a main signal input (e.g., main signal inputs 405A-405B), or based on detecting a mismatch in data received from a backup signal input (e.g., backup signal inputs 415A-415B) compared to data received at a main signal input (e.g., main signal inputs 405A-405B).

In some examples, at least a subset of the plurality of hashing chips are coupled to one another unidirectionally. In some examples, at least a subset of the plurality of hashing chips are coupled to one another bidirectionally.

In some examples, a controller of the hashing management system directly connects to one hashing chip of the plurality of hashing chips, and communicates with the plurality of hashing chips through the one hashing chip. In some examples, the controller directly connects to at least two hashing chips of the plurality of hashing chips (e.g., as in the dual loop paths 510-520 and/or the paths 620A-620D), and the controller communicates with the plurality of hashing chips through the at least one of the at least two hashing chips.

In some examples, the communication includes an instruction from the controller and instructs how the hashing calculations are to be apportioned across the plurality of hashing chips. In some examples, the communication includes a hash digest that is generated by one of the plurality of hashing chips via one of the hashing calculations.

In some examples, at least a portion of the plurality of hashing chips are organized in a tree arrangement of the plurality of hashing chips, such as the tree arrangement of the hashing management architecture 600. In some examples, the tree arrangement includes a hub (e.g., 615A-615G) configured to convey data from a parent node hashing chip to a set of child node hashing chips, wherein plurality of hashing chips includes the parent node hashing chip and the set of child node hashing chips. In an illustrative example, the hub 615A may convey data (e.g., instructions from the controller 605) from the (parent node) hashing chip 610B to the (child node) hashing chip 610C and to the (child node) hashing chip 610E. Likewise, the hub 615A may convey data (e.g., computed hash digest(s)) from the (child node) hashing chip 610C and/or from the (child node) hashing chip 610E to the (parent node) hashing chip 610B (e.g., to send the data back to the controller 605).

In some examples, the hashing management system includes, or is a part of, one or more hashboard(s) 805, one or more control board(s) 830, one or more power supply(s) 840, or a combination thereof.

Figure 10:
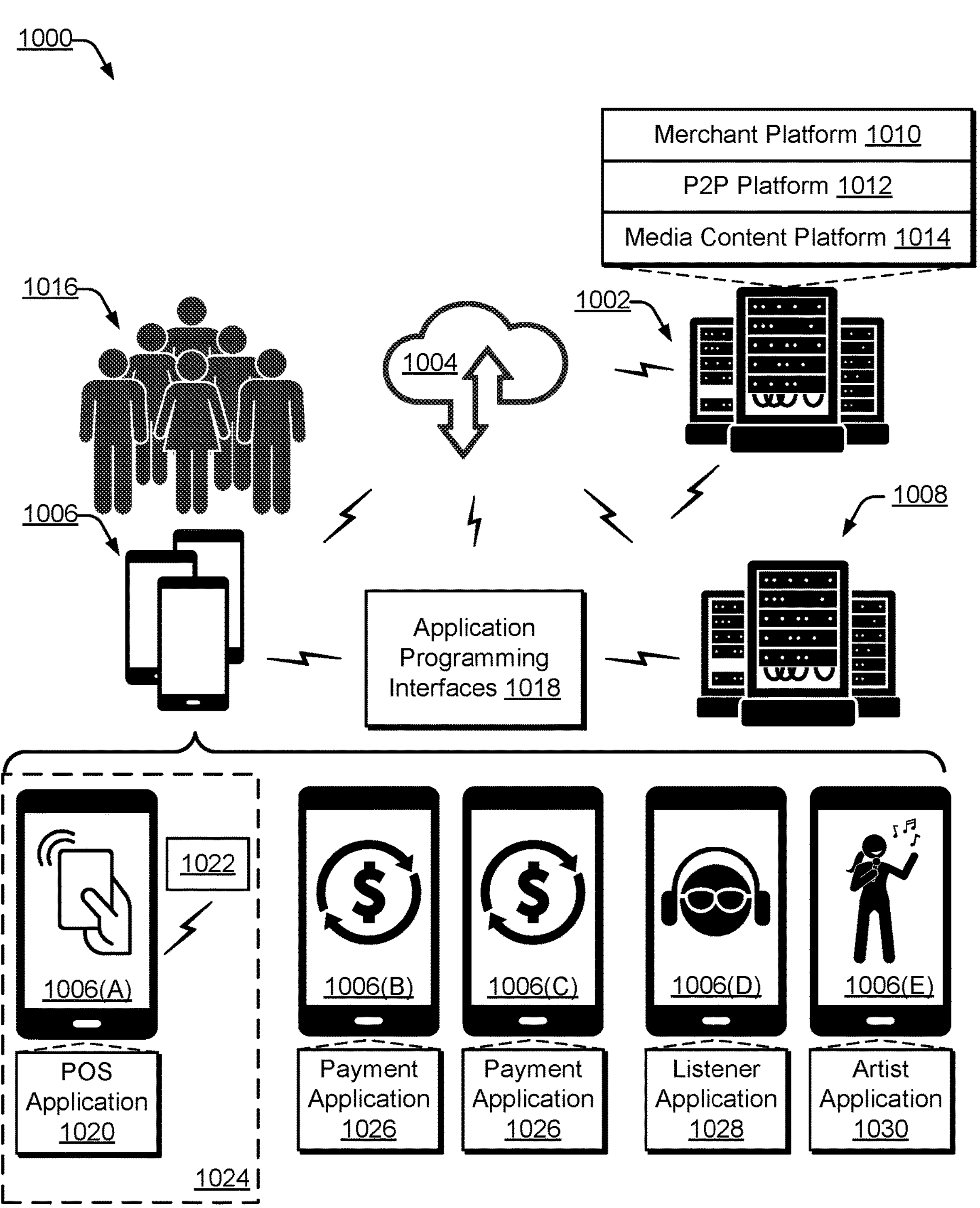
FIG. 10 is a block diagram illustrating an example environment for providing an application and/or for customizing the application for different platforms, in accordance with some examples.

FIG. 10 illustrates an example environment 1000 for application interface customization. The environment 1000 includes server(s) 1002 that can communicate over a network 1004 with end user devices 1006 and/or server(s) 1008 associated with third-party service provider(s). In various examples, the end user devices 1006 may comprise one or more merchant devices 1006(A), one or more user devices 1006(B) and/or 1006(C) in a peer network, one or more content consumption devices 1006(D), one or more artist user devices 1006(E), combinations of these examples, or other categories of user devices. The server(s) 1002 can be associated with one or more service providers that can provide one or more services for the benefit of users 1016, as described below. For example, the server(s) 1002 may enable services of service providers such as in association with a merchant platform 1010 (which may further include a buyer platform), a peer-to-peer (P2P) payment platform 1012, a media content platform 1014, a combination of these platforms, or other platforms associated with other service providers. While services and features are referenced throughout in connection with a particular one of the merchant platform 1010, the P2P payment platform 1012, or the media content platform 1014, it should be understood that any of these platforms may perform the functionality described in relation to any of the other platforms. Actions attributed to the service provider(s) can be performed by the server(s) 1002.

In some examples, the end user devices 1006, merchant platform 1010, P2P platform 1012, and/or media content platform 1014 can be examples of the hashing management architecture 100A-100B, the controller 105, first hashing chip 110, the second hashing chip 120, the third hashing chip 130, the hashing management architecture 200A-200B, the controller 205, the first hashing chip 210, the second hashing chip 220, the third hashing chip 230, the hashing management architecture 300A-300C, the controller 305, the hashing chips 310A-310Q, the hashing management architecture 400, the hashing chips 410A-410B, the hashing management architecture 500, the hashing management architecture 600, the controller 605, the hashing chips 610A-610P, the hubs 615A-615G, the hashing management architecture 700, the hashboard system 800, the hashboard(s) 805, the controller(s) 810, the hashing chips 815, the control board(s) 830, the controller(s) 835, or a combination thereof.

In some examples, individual ones of the end user devices 1006 can be operable by users 1016. The users 1016 (individually referred to herein as "user 1016") can be referred to as miners, customers, buyers, merchants, sellers, borrowers, employees, employers, payors, payees, couriers, artists, musicians, listeners, fans, supervisors, hosts, audience members, and so on. The users 1016 can interact with the end user devices 1006 via user interfaces presented via the end user devices 1006. In at least one example, a user interface can be presented via a web browser, or the like. Alternatively or additionally, a user interface can be presented via an application, such as a mobile application or desktop application, which can be provided by the merchant platform 1010, the P2P payment platform 1012, and/or the media content platform 1014, or which can be an otherwise dedicated application. In some examples, individual end user devices 1006 can have an instance or versioned instance of an application, which can be downloaded from an application store, for example, which can present the user interface(s) described herein.

In at least one example, the users 1016 can include merchants that can operate the seller device(s) 1006(A) that are configured for use by merchants. For the purpose of this discussion, a "merchant" can be any entity that offers items (e.g., goods or services) for purchase or other means of acquisition (e.g., rent, borrow, barter, etc.). The merchants can offer items for purchase or other means of acquisition via brick-and-mortar stores, mobile stores (e.g., pop-up shops, food trucks, etc.), online stores, event venues, combinations of the foregoing, and so forth. In some examples, at least some of the merchants can be associated with the same entity but can have different merchant locations and/or can have franchise/franchisee relationships.

In additional or alternative examples, the merchants can be different merchants. For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN) s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

The seller device 1006(A) can have an instance of a point of sale ("POS") application 1020 stored thereon. The POS application 1020 can configure the seller device 1006(A) as a POS terminal, which enables the merchant to interact with one or more customers. In at least one example, interactions between the customers and the merchants that involve the exchange of funds (from the customers) for items or services (from the merchants) can be referred to as "transactions." In at least one example, the POS application 1020 can determine transaction data associated with the POS transactions. Transaction data can include payment information, which can be obtained from a reader device 1022 associated with the seller device 1006(A), user authentication data, purchase amount information, point-of-purchase information (e.g., item(s) purchased, date of purchase, time of purchase, subscription type, etc.), etc. The POS application 1020 can send transaction data to the server(s) 1002 such that the server(s) 1002 can track transactions of the customers, merchants, and/or the users 1016 over time. Furthermore, the POS application 1020 can present a UI to enable the merchant to interact with the POS application 1020 and/or the merchant platform 1010 via the POS application 1020.

In at least one example, the seller device 1006(A) can be a special-purpose computing device configured as a POS terminal (via the execution of the POS application 1020). In at least one example, the POS terminal may be connected to a reader device 1022, which is capable of accepting a variety of payment instruments, such as credit cards, debit cards, gift cards, short-range communication based payment instruments, and the like, as described below. In at least one example, the reader device 1022 can plug in to a port in the seller device 1006(A), such as a microphone port, a headphone port, an audio-jack, a data port, or other suitable port. In additional or alternative examples, the reader device 1022 can be coupled to the seller device 1006(A) via another wired or wireless connection, such as via Bluetooth®, BLE, and so on. In some examples, the reader device 1022 can be a software solution executing on the POS terminal, e.g., a mobile phone. In some examples, the reader device 1022 can read information from alternative payment instruments including, but not limited to, wristbands and the like.

In some examples, the reader device 1022 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards, hardware wallets, fobs, or devices configured for tapping). The POS terminal may provide a rich user interface, communicate with the reader device 1022, and communicate with the merchant platform 1010, which can provide, among other services, a payment processing service. The server(s) 1002 associated with the merchant platform 1010 can communicate with server(s) 1008, as described below. In this manner, the POS terminal and reader device 1022 may collectively process transaction(s) between the merchants and customers. In some examples, multiple POS terminal(s) may be connected to a number of other devices, such as "secondary" terminals, e.g., back-of-the-house systems, printers, line-buster devices, reader devices, speakers, and the like, to allow for information from the secondary terminal to be shared between the primary POS terminal(s) and secondary terminal(s), for example via short-range communication technology. This kind of arrangement may continue operation in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1022 of the POS system 1024 are shown as separate devices, in additional or alternative examples, the POS terminal and the reader device 1022 can be part of a single device. In some examples, the reader device 1022 can have a display integrated therein for presenting information to customers of a merchant. In additional or alternative examples, the POS terminal can have a display integrated therein for presenting information to the customers of the merchant. POS systems, such as the POS system 1024, may be mobile, such that POS terminals and reader devices may process transactions in disparate locations across the world. POS systems can be used for processing card-present transactions and card-not-present (CNP) transactions.

A card-present transaction is a transaction where both a customer and the customer's payment instrument are physically present at the time of the transaction. Card-present transactions may be contact or contactless transactions processed by swipes (e.g., by sliding a magnetic strip through a reader device), dips (e.g., by inserting an embedded microchip into a reader device), taps (e.g., by wirelessly, through Bluetooth, NFC or other short range technology hover or tap a payment instrument into a reader device), or any other interaction between a physical payment instrument (e.g., a card), or otherwise present payment instrument, and a reader device 1022, whereby the reader device 1022 is able to obtain payment data from the payment instrument.

A CNP transaction is a transaction where a card, or other payment instrument, is not physically present at the POS such that payment data is manually keyed in (e.g., by a merchant, customer, etc.), or payment data is required to be recalled from a card-on-file data store, to complete the transaction.

The POS system 1024, the server(s) 1002, and/or the server(s) 1008 may exchange payment information and transaction data to determine whether transactions are authorized. For example, the POS system 1024 may provide encrypted payment data, user authentication data, purchase amount information, point-of-purchase information, etc. (collectively, transaction data) to server(s) 1002 over the network(s) 1004. The server(s) 1002 may send the transaction data to the server(s) 1008.

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. In at least one example, the service provider can serve as an acquirer and connect directly with the card payment network.

The card payment network (e.g., the server(s) 1008 associated therewith) can forward the fund transfer request to an issuing bank (e.g., "issuer"). The issuer is a bank or financial institution that offers a financial account (e.g., credit or debit card account) to a user. The issuer (e.g., the server(s) 1008 associated therewith) can make a determination as to whether the customer has the capacity to absorb the relevant charge associated with the payment transaction. In at least one example, the merchant platform 1010 can serve as an issuer and/or can partner with an issuer. The transaction is either approved or rejected by the issuer and/or the card payment network (e.g., the server(s) 1008 associated therewith), and a payment authorization message is communicated from the issuer to the POS device via a path opposite of that described above, or via an alternate path.

The server(s) 1008 may send an authorization notification over the network(s) 1004 to the server(s) 1002, which may send the authorization notification to the POS system 1024 over the network(s) 1004 to indicate whether the transaction is authorized. The server(s) 1002 may also transmit additional information such as transaction identifiers to the POS system 1024. In one example, the server(s) 1002 may include a merchant application and/or other functional components for communicating with the POS system 1024 and/or the server(s) 1008 to authorize or decline transactions (e.g., the API 1018). In examples, the merchant platform 1010 can enable the merchants to receive cash payments, payment card payments, and/or electronic payments from customers for POS transactions and the service provider can process transactions on behalf of the merchants.

Based on the authentication notification that is received by the POS system 1024 from server(s) 1002, the merchant may indicate to the customer whether the transaction has been approved. In some examples, approval may be indicated at the POS system 1024, for example, at a display of the POS system 1024. In some cases, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

The merchant platform 1010 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, media content (e.g., music, videos, etc.) management and/or subscription services, and so on. In some examples, the end user devices 1006 can access all of the services. In some cases, the end user devices 1006 can have gradated access to the services, which can be based on risk tolerance, IDV outputs, subscriptions, and so on. In at least one example, access to such services can be availed to the merchants via the POS application 1020. In additional or alternative examples, each service can be associated with its own access point (e.g., application, web browser, etc.).

As the merchant platform 1010 processes transactions on behalf of the merchants, the merchant platform 1010 can maintain accounts or balances for the merchants in one or more ledgers. For example, the merchant platform 1010 can analyze transaction data received for a transaction to determine an amount of funds owed to a merchant for the transaction and deposit funds into an account of the merchant. The account can have a stored balance, which can be managed by the merchant platform 1010. The account can be different from a conventional bank account at least because the stored balance is managed by a ledger of the merchant platform 1010 and the associated funds are accessible via various withdrawal channels including, but not limited to, scheduled deposit, same-day deposit, instant deposit, and a linked payment instrument.

A scheduled deposit can occur when the merchant platform 1010 transfers funds associated with a stored balance of the merchant to a bank account of the merchant that is held at a bank or other financial institution (e.g., associated with the server(s) 1008). Scheduled deposits can occur at a prearranged time after a POS transaction is funded, which can be a business day after the POS transaction occurred, or sooner or later. In some examples, the merchant can access funds prior to a scheduled deposit (e.g., same-day deposits and/or real-time deposits). Further, in at least one example, the merchant can have a payment instrument that is linked to the stored balance that enables the merchant to access the funds without first transferring the funds from the account managed by the merchant platform 1010 to the bank account of the merchant.

In at least one example, the merchant platform 1010 may provide inventory management services. That is, the merchant platform 1010 may provide inventory tracking and reporting. Inventory management services may enable the merchant to access and manage a database storing data associated with a quantity of each item that the merchant has available (i.e., an inventory). Furthermore, in at least one example, the merchant platform 1010 can provide catalog management services to enable the merchant to maintain a catalog, which can be a database storing data associated with items that the merchant has available for acquisition (i.e., catalog management services). The merchant platform 1010 can offer recommendations related to pricing of the items, placement of items on the catalog, and multi-party fulfillment of the inventory, to name a few examples.

In at least one example, the merchant platform 1010 can provide business banking services, which allow the merchant to track deposits (from payment processing and/or other sources of funds) into an account of the merchant, payroll payments from the account (e.g., payments to employees of the merchant), payments to other merchants (e.g., business-to-business) directly from the account or from a linked debit card, withdrawals made via scheduled deposit and/or real-time deposit, configure allocations among multiple balances or accounts (e.g., spending, saving, taxes, etc.), etc. Furthermore, the business banking services can enable the merchant to obtain a customized payment instrument (e.g., credit card), check how much money the merchant is earning (e.g., via presentation of available earned balance), understand where the money of the merchant is going (e.g., via deposit reports (which can include a breakdown of fees), spend reports, etc.), access/use earned money (e.g., via scheduled deposit, real-time deposit, linked payment instrument, etc.), have improved control of the money of the merchant (e.g., via management of deposit schedule, deposit speed, linked instruments, etc.), etc. Moreover, the business banking services can enable the merchants to visualize their cash flow to track their financial health, set aside money for upcoming obligations (e.g., savings), organize money around goals, etc.

In at least one example, the merchant platform 1010 can provide financing services and products, such as via business loans, consumer loans, fixed term loans, flexible term loans, and the like. In at least one example, the service provider can utilize one or more risk signals to determine whether to extend financing offers and/or terms associated with such financing offers. Such risk signals can be particular to an individual platform or service, as described herein, or can be based on aggregated data associated with multiple of the platforms or services. In at least one example, the merchant platform 1010 can provide financing services for offering and/or lending a loan to a borrower that is to be used for, in some instances, financing the borrower's short-term operational needs (e.g., a capital loan). Additionally or alternatively, the merchant platform 1010 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant. The merchant platform 1010 can generate the loan based at least in part on determining that the borrower purchased or intends to purchase the item from the merchant. Advances, loans, or other funds provided to a merchant or other user can be repaid via a variety of mechanisms. In some examples, loans can be repaid in installments (e.g., multiple payments over time), at a particular date, from a portion of incoming funds (e.g., payments processed for the merchant, tax refunds, direct deposits, etc.), or the like.

The merchant platform 1010 can provide web-development services, which enable users 1016 who are unfamiliar with HTML, XML, Javascript, CSS, or other web design tools to create and maintain functional websites. Further, in addition to websites, the web-development services can create and maintain other online omni-channel presences, such as social media posts for example. In some examples, the resulting web page(s) and/or other content items can be used for offering item(s) for sale via an online/e-commerce platform. In at least one example, the merchant platform 1010 can recommend and/or generate content items to supplement omni-channel presences of the merchants.

Furthermore, the merchant platform 1010 can provide payroll services to enable employers to pay employees for work performed on behalf of employers. In at least one example, the merchant platform 1010 can receive data that includes time worked by an employee (e.g., through imported timecards and/or POS interactions), sales made by the employee, gratuities received by the employee, and so forth. Based on such data, the merchant platform 1010 can make payroll payments to employee(s) on behalf of an employer via the payroll service. For instance, the merchant platform 1010 can facilitate the transfer of a total amount to be paid out for the payroll of an employee from the bank of the employer to the bank of the merchant platform 1010 to be used to make payroll payments. In at least one example, when the funds have been received at the bank of the merchant platform 1010, the merchant platform 1010 can pay the employee, such as by check or direct deposit.

Moreover, in at least one example, the merchant platform 1010 can provide employee management services for managing schedules of employees. Further, the merchant platform 1010 can provide appointment services for enabling users 1016 to set schedules for scheduling appointments and/or users 1016 to schedule appointments.

In some examples, the merchant platform 1010 can provide restaurant management services to enable users 1016 to make and/or manage reservations, to monitor front-of-house and/or back-of-house operations, and so on. In such examples, the seller device(s) 1006(A) and/or server(s) 1002 can be configured to communicate with one or more other computing devices, which can be located in the front-of-house (e.g., POS device(s)) and/or back-of-house (e.g., kitchen display system(s) (KDS)). In at least one example, the merchant platform 1010 can provide order management services and/or fulfillment services to enable restaurants (or other merchant types) to manage open tickets, split tickets, and so on and/or manage fulfillment services.

In some examples, the merchant platform 1010 can provide omni-channel fulfillment services. A fulfillment service includes item ordering and delivery services, such as via a courier. In some examples, the courier can be an unmanned aerial vehicle (e.g., a drone), an autonomous vehicle, or any other type of vehicle capable of receiving instructions for traveling between locations. For instance, if a customer places an order with a merchant and the merchant cannot fulfill the order because one or more items are out of stock or otherwise unavailable, the merchant platform 1010 can leverage other merchants and/or sales channels that are part of the merchant platform 1010 to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the merchant platform 1010 can enable conversational commerce via conversational commerce services, which can use one or more machine learning mechanisms to analyze messages exchanged between two or more users 1016, voice inputs into a virtual assistant or the like, to determine intents of user(s) 1016. In some examples, the merchant platform 1010 can utilize determined intents to automate customer service, offer promotions, provide recommendations, or otherwise interact with customers in real-time. In at least one example, the merchant platform 1010 can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1016 may be new to the merchant platform 1010 such that the user 1016 that has not registered (e.g., subscribed to receive access to one or more services offered by the merchant platform 1010) with the merchant platform 1010. The merchant platform 1010 can offer onboarding services for registering a potential user 1016 with the merchant platform 1010. In some examples, onboarding can involve presenting various questions, prompts, and the like to a potential user 1016 to obtain information that can be used to generate a profile for the potential user 1016. In at least one example, the merchant platform 1010 can provide limited or short-term access to its services prior to, or during, onboarding (e.g., a user of a peer-to-peer payment service can transfer and/or receive funds prior to being fully onboarded, a merchant can process payments prior to being fully onboarded, a user of a music streaming service can listen to music having advertisement breaks prior to being fully onboarded, etc.). In response to full or partial completion of onboarding, any limited or short-term access to services of the merchant platform 1010 can be transitioned to more permissive (e.g., less limited) or longer-term access to such services.

The merchant platform 1010 can be associated with IDV services, which can be used by the merchant platform 1010 for compliance purposes and/or can be offered as a service, for instance to third-party service providers (e.g., associated with the server(s) 1008). That is, the merchant platform 1010 can offer IDV services to verify the identity of users 1016 seeking to use or using their services. Identity verification may involve requesting a customer (or potential customer) to provide information that is used by compliance departments to prove that the information is associated with an identity of a real person or entity (e.g., an artist). In at least one example, the merchant platform 1010 can perform services for determining whether identifying information provided by a user 1016 accurately identifies the customer (or potential customer).

Techniques described herein can be configured to operate in both real-time/online and offline modes. "Online" modes refer to modes when devices are capable of communicating with the merchant platform 1010 while offline mode refers to modes when devices are unable to communicate with the server(s) 1008 due to network connectivity issue, for example. In such examples, devices may operate in "offline" mode where at least some payment data is stored (e.g., on the seller device(s) 1006(A)) and/or the server(s) 1002 until connectivity is restored and the payment data can be transmitted to the server(s) 1002 and/or the server(s) 1008 for processing.

In at least one example, the merchant platform 1010 can be associated with a hub, such as an order hub, an inventory hub, a fulfillment hub and so on, which can enable integration with one or more additional service providers (e.g., associated with the additional server(s) 1008). In some examples, such additional service providers can offer additional or alternative services and the service provider can provide an interface or other computer-readable instructions to integrate functionality of the service provider into the one or more additional service providers.

Turning now to the P2P functionality provided by the environment 1000, the P2P platform 1012 can provide a peer-to-peer payment service that enables peer-to-peer payments between two or more of the users 1016. Two or more of the users 1016 may be considered "peers" in a peer-topeer interaction, such as a payment. In at least one example, the P2P platform 1012 can communicate with instances of a payment application 1026 (or other access point) installed on end user devices 1006 configured for operation by the users 1016. In an example, an instance of the payment application 1026 executing on a first user device 1006(B) operated by a payor (e.g., one of the users 1016) can send a request to the P2P platform 1012 to transfer an asset (e.g., fiat currency, non-fiat currency, digital assets such as non-fungible tokens (NFTs), cryptocurrency, securities, gift cards, and/or related assets) from the payor to a payee (e.g., a different one of the users 1016) via a peer-to-peer payment. In some examples, assets associated with an account of the payor are transferred to an account of the payee. In some examples, assets can be held at least temporarily in an account of the P2P platform 1012 prior to transferring the assets to the account of the payee.

In some examples, the P2P platform 1012 can utilize a ledger system to track transfers of assets between users 1016. FIG. 11, below, provides additional details associated with such a ledger system. The ledger system can enable users 1016 to own fractional shares of assets that are not conventionally available. For instance, a user can own a fraction of a Bitcoin, an NFT, or a stock. Additional details are described herein.

In at least one example, the P2P platform 1012 can facilitate transfers and can send notifications related thereto to instances of the payment application 1026 executing on user device(s) of payee(s). As an example, the P2P platform 1012 can transfer assets from an account of a first user to an account of a second user and can send a notification to the user device 1006(B) of the second user for presentation via a user interface. The notification can indicate that a transfer is in process, a transfer is complete, or the like. In some examples, the P2P platform 1012 can send additional or alternative information to the instances of the payment application 1026 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the P2P platform 1012 funds the request to payee on behalf of the payor, to speed up the transfer process and compensate for lags that may be attributed to the payor's financial network.

In some examples, the P2P platform 1012 can trigger the peer-to-peer payment process through identification of a "payment proxy" having a particular syntax. The payment proxy is useable in lieu of payment data. That is, payment data and a payment proxy can be linked to, or otherwise associated with, a user account of a user and either can be used for making payments. In an example, the syntax can include a monetary currency indicator prefixing one or more alphanumeric characters (e.g., $Cash). The currency indicator operates as the tagging mechanism that indicates to the server(s) 1002 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol or other symbol could equally be used. In some examples, additional or alternative identifiers can be used to trigger the peer-to-peer payment process. For instance, email, telephone number, social media handles, artist or band names, and/or the like can be used to trigger and/or identify users of a peer-to-peer payment process.

In some examples, the peer-to-peer payment process can be initiated through instances of the payment application 1026 executing on the end user devices 1006. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can be a uniform resource locator (URL), which can include a payment proxy discussed above. The P2P platform 1012 can generate the landing page to enable the recipient to conveniently receive one or more payments from one or more senders.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through streaming of content, comments, posts, messages on electronic bulletin boards, messages on a social networking platform, and/or any other types of messages. In some examples, the content provider can be the service provider as described with reference to FIG. 10 or a third-party service provider associated with the server(s) 1008. In examples where the content provider is a third-party service provider, the server(s) 1008 can be accessible via one or more APIs 1018 or other integrations. In some examples, "forum" may also refer to an application or webpage of an e-commerce or retail organization that offers products and/or services. Such websites can provide an online "form" to complete before or after the products or services are added to a virtual cart. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be internal to the P2P platform 1012 (e.g., the P2P platform 1012 offers a chat or messaging service that is within the payment application or accessible via the payment application). In some examples, the messaging application can be external to the P2P platform 1012. (e.g., the messaging application is hosted by a third-party service provider associated with the server(s) 1008, which can be accessible via one or more of the APIs 1018 or other integrations). The messaging application can include, for example, a text messaging application for communication between phones (e.g., conventional mobile telephones or smartphones), or a cross-platform instant messaging application for smartphones and phones that use the Internet for communication.

Funds received from payments can be stored in stored balances that are linked to, or otherwise associated with, user accounts. In some examples, the P2P platform 1012 can enable users 1016 to perform banking transactions via instances of the payment application 1026. For example, users can configure direct deposits, recurring deposits, or other deposits (e.g., tax refunds, loans, etc.) for adding assets to their various ledgers/balances. In some examples, users can deposit physical cash via ATMs or other deposit sources, which can include merchants, such as those merchants that utilize the payment processing system described above. In some examples, the P2P platform 1012 can enable users to allocate funds between different accounts, sub-accounts, or balances (e.g., spending, saving, different assets, different currencies), etc. Further, users 1016 can configure bill pay, recurring payments, and/or the like using assets associated with their accounts. In some examples, the P2P platform 1012, with consent of the user, can track individual transactions made using the payment application and can utilize such transaction data to make personalized or customized recommendations, determine creditworthiness, generate tax documentation, and/or the like.

In addition to sending and/or receiving assets via peer-to-peer transactions, the P2P platform 1012 enables users to buy and/or sell assets via asset networks such as cryptocurrency networks, securities networks, and/or the like. In some examples, acquisition of such assets can be in whole or fractional shares. The ledger system described below with reference to FIG. 11 can enable such assets to be acquired in fractional shares and/or in real-time or near real-time (by delaying or omitting the need to buy/sell assets via asset networks or exchanges). In some examples, users can "gift" assets to other users, for example, by transferring cryptocurrency, stocks, or the like to one another.

In some examples, the P2P platform 1012 can enable users to link payment instruments to their user accounts. As a result, users can use their linked payment instruments to access funds in their accounts or balances. In some examples, the payment instrument can be a credit card, debit card, card linked to multiple accounts or balances via software or hardware, a fob or other object having payment data stored thereon, or the like. In some examples, the payment instrument can be a virtual payment instrument or a physical payment instrument. In some examples, the virtual payment instrument can be issued in real-time or for temporary usage. In some examples, the virtual payment instrument can have the same or different payment data as a corresponding physical payment instrument. Payment instruments can be customizable using a design user interface of the payment application. Such customization can enable users to select colors, stamps, images, text, or the like for surface(s) of their payment instruments. In some examples, users can draw or otherwise interact with the design user interface to personalize surface(s) of their payment instruments.

In some examples, users can associate incentives with their payment instruments. Incentives can be recommended to users based on user preferences (inferred or explicitly identified), geolocation, propensity to redeem, value, and/or the like. In some examples, incentives can be particular to individual merchants, types of merchants, types of transactions, and/or the like. In at least one example, when a user uses their payment instrument at a merchant or type of merchant associated with an incentive, or for a transaction type associated with an incentive, the P2P platform 1012 can automatically apply the incentive to the transaction. In some examples, users can gift other users "gift cards" that can be associated with payment instruments. That is, a user can transfer an amount of funds to another user and such funds can be associated with a condition (e.g., merchant, merchant type, transaction type, location, etc.) that, upon satisfaction, enables the amount of funds, or a portion thereof, to be applied to a transaction. In at least one example, when a user uses their payment instrument for a transaction that satisfies the condition, the P2P platform 1012 can automatically apply the amount of funds associated with the gift card to the transaction.

In some examples, users can configure their account such that when they use their payment instruments, the P2P platform 1012 can deposit an amount of funds into a savings account, investing account, bitcoin account, or the like.

In some examples, users can search for or browse other users, merchants, items, or the like via the payment application. In some examples, search results can be personalized and/or customized for the user (e.g., based on user data collected with consent of the user). In some examples, users can shop or otherwise purchase items from other users, merchants, or the like from within the payment application or via a deep link to a merchant application or website.

The P2P platform 1012 can offer primary and secondary accounts, wherein a primary account is a sponsor or other delegate of one or more secondary accounts. Such accounts can be useful for families, wherein a parent or other guardian is a sponsor or delegate to one or more child accounts, or where a child is a sponsor or delegate of an elderly parent's account. In some examples, primary accounts can establish limits on secondary accounts, such as spending limits, or the like. In some examples, the primary account owner is the user legally responsible for the account and their identity may be verifiable for secondary user accounts to perform certain transactions, such as buying/selling cryptocurrency or stocks. In some examples, one or more primary accounts and one or more secondary accounts can form a "group" with shared goals, such as saving, investing, or the like.

The P2P platform 1012 can present activity data via an activity user interface of the payment application. In some examples, activity can be presented by merchant, date, time, amount, or the like. In some examples, interactions between entities can be represented in conversational communications such that each interaction or transaction is represented as a message. In some examples, users can interact with individual messages and/or send/request funds from within such a conversational communication. In some examples, such conversational communications can represent conversations of a group of two or more users. Groups can be used to pool funds, obtain group discounts or incentives, or enable multiple users to participate in financial transactions together (e.g., group investing, group savings, etc.).

The P2P platform 1012 can offer a variety of financial training or learning opportunities. In some examples, such training or learning can be personalized for individual users, for example, based on user data and/or transaction data of the user that is obtained with consent of the user. In some examples, such user data and/or transaction data can be analyzed to make actionable recommendations with respect to optimizing financial health of users of the P2P platform 1012.

In some examples, components of the environment 1000 may be integrated to enable payments at the point-of-sale using assets associated with user accounts of the P2P platform 1012. As illustrated in the environment 1000, the components can communicate with one another via the network 1004, where one or more APIs 1018 or other functional components can be used to facilitate such communication.

In at least one example, an integration can enable a customer to participate in a transaction via their own computing device (e.g., user device 1006(B)) instead of interacting with a merchant device of a merchant, such as the seller device 1006(A). In such an example, the POS application 1020, associated with a payment processing platform and executable by the seller device 1006(A) of the merchant, can present a Quick Response (QR) code, or other code that can be used to identify a transaction (e.g., a transaction code), in association with a transaction between the customer and the merchant. The QR code, or other transaction code, can be provided to the POS application 1020 via an API 1018 associated with the peer-to-peer payment platform. In an example, the customer can utilize their own computing device, such as the user device 1006(B), to capture the QR code, or the other transaction code, and to provide an indication of the captured QR code, or other transaction code, to server(s) 1002.

Based at least in part on the integration of the peer-to-peer payment platform and the payment processing platform (e.g., via the API 1018), the server(s) 1002 of the merchant platform 1010 can exchange communications with a payment application 1026 associated with the P2P platform 1012 and/or the POS application 1020 to process payment for the transaction using a peer-to-peer payment where the customer is a first "peer" and the merchant is a second "peer."

Based at least in part on receiving an indication of which payment method a user (e.g., customer or merchant) intends to use for a transaction, techniques described herein utilize an integration between the P2P platform 1012 and merchant platform 1010 (which can be a first- or third-party integration) such that a QR code, or other transaction code, specific to the transaction can be used for providing transaction details, location details, customer details, or the like to a computing device of the customer, such as the user device 1006(B), to enable a contactless (peer-to-peer) payment for the transaction, and transferring funds from an account of the customer to an account of the merchant.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1006(B), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1020 and the payment application 1026, as described herein, can process a payment transaction by routing information input via the merchant application to the payment application for completing a "frictionless" payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. A customer computing device, such as the user device 1006(B), can be specially configured as a buyer-facing device having functionality similar to the functionality described above in the brick-and-mortar example.

In some examples, based at least in part on capturing the QR code, or other transaction code, the merchant platform 1010 can provide transaction data to the P2P platform 1012 for presentation via the payment application 1026 on the computing device of the customer, such as the user device 1006(B), to enable the customer to complete the transaction via their own computing device. In some examples, in response to receiving an indication that the QR code, or other transaction code, has been captured or otherwise interacted with via the customer computing device, the P2P platform 1012 can determine that the customer authorizes payment of the transaction using funds associated with a stored balance of the customer that is managed and/or maintained by the P2P platform 1012. Such authorization can be implicit such that the interaction with the transaction code can imply authorization of the customer. Alternatively or additionally, the P2P platform 1012 can request express authorization to process payment for the transaction using the funds associated with the stored balance and the customer can interact with the payment application to expressly authorize the settlement of the transaction. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the P2P platform 1012 can transfer funds from the stored balance of the customer to the merchant platform 1010. In at least one example, the merchant platform 1010 can deposit the funds, or a portion thereof, into a stored balance of the merchant that is managed and/or maintained by the merchant platform 1010. In such an example, the merchant platform 1010 can be a "peer" to the customer in a peer-to-peer transaction.

In some examples, techniques described herein can enable the customer to interact with the transaction after payment for the transaction has been settled. For example, in at least one example, the merchant platform 1010 can cause a total amount of a transaction to be presented via a user interface associated with the payment application 1026 such that the customer can provide gratuity, feedback, loyalty information, or the like, via an interaction with the user interface. In another example, the merchant platform 1010 can adjust a total amount of a transaction based on events during a shopping experience, such as adding or removing a charge to the total amount based on whether a media content item requested by the customer to be played during a shopping experience was in fact played. In some examples, because the customer has already authorized payment via the P2P platform 1012, if the customer inputs a tip and/or an event affecting the total amount of the transaction is triggered, the P2P platform 1012 can transfer additional funds, associated with the tip or event, to the merchant platform 1010. This pre-authorization (or maintained authorization) of sorts can enable faster, more efficient payment processing when the tip is received and/or the event initiates the trigger. Further, the customer can provide feedback and/or loyalty information via the user interface presented by the payment application, which can be associated with the transaction. Using the pre-authorization techniques described herein results in fewer data transmissions and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1026 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. In some examples, the payment instrument can be associated with the P2P platform 1012 as described herein (e.g., a debit card linked to a stored balance of a customer) such that when the payment instrument is caused to interact with a payment reader, the merchant platform 1010 can exchange communications with the P2P platform 1012 to authorize payment for a transaction and/or provision associated transaction data to a computing device of the customer associated with the transaction.

Turning now to media content functionality provided by the environment 1000, the media content platform 1014 can provide digital media to a content consumption device 1006(D) where playback may occur using "streaming." In examples, "streaming" media content involves encoding the media content and transmitting the encoded media content over the network 1004 to a media player or a media application executing on a device (e.g., via a speaker). The device then decodes and plays the media content while data is being received. In some cases, a buffer queues some of the data of the media content (e.g., audio data, video data, etc.) ahead of the media being played. During moments of network congestion, which leads to lower available bandwidth, less media content data is added to the buffer, which drains down as media content is being dequeued during streaming playback. However, during moments of high network bandwidth, the buffer is replenished, adding media content data to the buffer.

In at least one example, the media content platform 1014 can provide a digital media streaming service (e.g., subscription-based, non-subscription-based) that enables a content consumption device 1006(D) to stream and/or download digital media content via a listener application 1028 installed on the content consumption device 1006(D). For instance, the media content platform 1014 may comprise a digital audio streaming service (e.g., for music, podcasts, audiobooks, etc.), a digital video streaming service, and/or a streaming service that provides streaming of various different types of digital media content or multimedia. In such cases where digital media content items are downloaded and stored locally on the content consumption devices 1006(D), the listener application 1028 may verify access rights to the digital media content items at time intervals, for instance intermittently (e.g., when the content consumption device 1006(D) has a network connection with the media content platform 1014 via the network(s) 1004), and/or at regular intervals (e.g., daily, weekly, monthly, etc.). In examples, access rights to the digital media content items may be provided when a subscription to the media content platform 1014 is active, while access rights to the digital media content items may be withheld when the subscription to the media content platform 1014 is terminated. Enabling storage on the end user devices 1006 and subsequent access to digital media content items via the listener application 1028 provides the users 1016 with the ability to access the digital media content items "offline" such as when a connection to the media content platform 1014 via the network(s) 1004 is unavailable or unreliable.

In some examples, the media content platform 1014 may additionally or alternatively provide an artist management service that enables the users 1016 to manage aspects of artist business via an artist application 1030 installed on the artist device 1006(E), such as data analytics and management (e.g., listener data, consumer data, etc.), marketing, regulatory obligations, cash flow management, publishing, customer relationship management (CRM), social media, event coordination, industry communications, digital media content ingestion and storage, and so forth. In some cases, the users 1016 can have graduated access to the services, which can be based on a user type (e.g., artist, group member, personal manager, business manager, attorney, agent, etc.), risk tolerance, artist verification status, listener and/or viewer analytics (e.g., number of streams in a month), and so on. In some cases, multiple users 1016 may have access to a single user account via respective end user devices 1006, with the various users having different access privileges to services provided by the artist management service. In various scenarios, an artist can designate functions provided by the artist management service to different members of the team associated with the artist, thus granting the respective team members access to services suited to the skills of the individual team members.

In some cases, the artist application 1030 and the listener application 1028 may be distinct applications having differing user experiences and verification processes for access, such as illustrated in the environment 1000. For instance, the media content platform 1014 may request additional verification, such as a link to an artist website, a sample of an artist's work, a verified credential supplied by a third party, etc. to grant access to the artist application 1030 in addition to information requested to access the listener application 1028. Further, the artist application 1030 may provide the artist management services described herein, without the subscription-based digital media streaming services described herein, and vice versa. However, examples are also considered in which functionality provided by the artist application 1030 and the listener application 1028 partially or fully overlap, and/or where verification processes for access are substantially similar.

In at least some examples, the media content platform 1014 enables interaction between the users 1016 utilizing the listener application 1028 installed on the content consumption devices 1006(D), and the users 1016 utilizing the artist application 1030 installed on the artist end user devices 1006(E). For example, the media content platform 1014 may provide interconnectivity between the subscription-based digital media streaming service and the artist management service. Functionality provided by the media content platform 1014 in such instances may include a communication channel between one or more of the users 1016 (e.g., a listener, fan, music supervisor, publisher, etc.) utilizing the listener application 1028 and another user (e.g., an artist) of the users 1016 utilizing the artist application 1030. The communication channel may include, for instance, a messaging platform (also referred to as a "messaging application" herein), a live streaming platform, a videoconferencing or teleconferencing platform, and/or a combination of these.

Additionally, in some cases, the media content platform 1014 may facilitate a resource transfer between the listener application 1028 and the artist application 1030. In an example, the media content platform 1014 may direct a resource, such as a portion of a subscription fee paid by one of the users 1016 designated as a listener, to one or more of the users 1016 designated as artists based on a number of instances that the listening user consumed (e.g., streamed, downloaded, etc.) content created by respective ones of the artist users. Alternatively or additionally, the media content platform 1014 may direct a resource, such as funds, from an account associated with a listening user to an account associated with an artist user (or vice versa), in accordance with transfers between accounts as described herein. The media content platform 1014 may facilitate resource transfers in examples such as merchandise purchases, event ticket purchases, "tipping" an artist, payments for royalties or other fees, and so forth.

In some examples, the media content platform 1014 enables interaction between individual ones of the users 1016 with one another via the listener application 1028 installed on the content consumption device 1006(D) and other of the content consumption devices 1006(D) via a communication channel as described above. In an example, the listener application 1028 may provide functionality via a communication channel for a user to stream an individual digital media item, a playlist, or the like to an audience comprising other ones of the content consumption devices 1006(D). Alternatively or additionally, the communication channel may facilitate sharing of individual digital media items, playlists, user and/or artist profiles, and the like between the users 1016 via messages, uniform resource locators (URLs), quick response (QR) codes, and so forth.

In some cases, the media content platform 1014 enables interaction between individual ones of the users 1016 with one another via the artist application 1030 installed on the artist device 1006(E) and other of the artist end user devices 1006 via a communication channel as described above. In some instances, the media content platform 1014 may provide recommendations for a particular user indicating which of the other users 1016 to communicate with. Such a recommendation may be based on a similarity (or dissimilarity) of content created by two or more of the users 1016, an overlap (or lack thereof) of audience members of the users 1016, a geographic location of the users 1016, a coinciding event location of the users 1016, and so forth. In some examples, a user may input parameters for a desired connection via the artist application 1030, and the media content platform 1014 may filter which of the users 1016 to surface for recommendations to the user based on the input parameters. Alternatively or additionally, the media content platform 1014 may implement one or more machine learning models to filter which of the users 1016 to surface for recommendations to the user. The recommendations provided by the media content platform 1014 may be data driven and thus increase relevance of communications presented to the users 1016 and reduce unsolicited communications that may be received by the users 1016.

The media content platform 1014 may interact with the server(s) 1008 associated with the third-party service providers to, for instance, ingest digital media items, report digital media consumption data, pay royalties, and the like. In some examples, the server(s) 1008 may be accessible by the media content platform 1014 via one or more APIs 1018 or other integrations. In some cases, the third-party service provider may be a digital media content provider (e.g., a record label, a performance rights organization (PRO), an independent artist, etc.). In such cases, the media content platform 1014 may receive digital media content items from the server(s) 1008, along with metadata associated with the digital media content items. The metadata, in some instances, may indicate individual contributors to a digital media content item such as an artist or artists, a songwriter (e.g., a composer, lyricist, author, etc.), a producer (which may further include a co-producer, a mastering engineer, a mixing engineer, a recording engineer, an arranger, a programmer, etc.), a musician (e.g., instrumentalist, vocalist, etc.), a visual artist, and so forth, with an indication of the role of the individual contributor. Alternatively or additionally, the metadata may indicate information such as release date, track title, track duration, clean or explicit version, jurisdiction information, and the like. The media content platform 1014 may use the metadata to associate the digital media content item as being created by a particular user, to provide search results to the users 1016, to generate playlists, and so forth. Further, the media content platform 1014 may provide payments (e.g., royalties) to the third-party service provider based on a number of streams and/or downloads of individual digital media content items by the users 1016 via the listener application 1028.

Techniques described herein are directed to services provided via a distributed system of end user devices 1006 that are in communication with server(s) 1002 of the service provider. That is, techniques described herein are directed to a specific implementation—or, a practical application—of utilizing a distributed system of end user devices 1006 that are in communication with server(s) 1002 of the merchant platform 1010, the P2P platform 1012, and/or the media content platform 1014 to perform a variety of services, as described above. The unconventional configuration of the distributed system described herein enables the server(s) 1002 that are remotely-located from end-users (e.g., users 1016) to intelligently offer services based on aggregated data associated with the end-users, such as the users 1016 (e.g., data associated with multiple, different merchants and/or multiple, different buyers; data associated with multiple different listeners and/or multiple different artists, etc.), in some examples, in near-real time. Accordingly, techniques described herein are directed to a particular arrangement of elements that offer technical improvements over conventional techniques for performing payment processing services, P2P payment services, media content services, and the like. For small business owners and artists in particular, the business environment is typically fragmented and relies on unrelated tools and programs, making it difficult for an owner or an artist to manually consolidate and view such data. The techniques described herein constantly or periodically monitor disparate and distinct user accounts, e.g., accounts within the control of the merchant platform 1010, the P2P platform 1012, and/or the media content platform 1014, and those outside of the control of these service providers, to track the standing (payables, receivables, payroll, invoices, appointments, capital, balances, collaborations, etc.) of the users 1016. The techniques herein provide a consolidated view of a user's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services, P2P payment services, media content services, and/or additional or alternative services described herein. In some implementations, the distributed system is capable of applying the intelligence derived from an existing user base to a new user, thereby making the onboarding experience for the new user personalized and frictionless when compared to traditional onboarding methods. Further, models or algorithms that are used to implement techniques described herein may be retrained over time to improve outcomes for subsequent scenarios based on outcomes of previous scenarios. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1016 and end user devices 1006. Furthermore, such features are changed dynamically based on the profiles of the users involved interacting with the GUIs. As such, techniques described herein are directed to improvements to computing systems.

The merchant platform 1010, the P2P platform 1012, and/or the media content platform 1014 are capable of providing additional or alternative services, and the services described above are offered as a sampling of services. In at least one example, the merchant platform 1010, the P2P platform 1012, and/or the media content platform 1014 can exchange data with the server(s) 1008 associated with third-party service providers. Such third-party service providers can provide information that enables the merchant platform 1010, the P2P platform 1012, and/or the media content platform 1014 to provide services, such as those described above. In additional or alternative examples, such third-party service providers can access services of the merchant platform 1010, the P2P platform 1012, and/or the media content platform 1014. That is, in some examples, the third-party service providers can be subscribers, or otherwise access, services of the merchant platform 1010, the P2P platform 1012, and/or the media content platform 1014.

FIG. 11 illustrates an example environment 1100 including a service provider system 1102 which may be associated with the server(s) 1002 of FIG. 10. The environment 1100 may also include a user device 1104, which may correspond to any of the end user devices 1006 described in relation to FIG. 10. In examples, the service provider system 1102 may include one or a combination of the merchant platform 1010, the P2P platform 1012, or the media content platform 1014, as well as one or more data store(s) 1106 that can store assets in an asset storage 1108, as well as data in user account(s) 1110. In some examples, the environment 1100 may also include a public blockchain 1114, one or more nodes 1116, and/or a hardware wallet 1118. The service provider system 1102, the user device 1104, public blockchain 1114, the node(s) 1116, and the hardware wallet 1118 may be connected and able to communicate via one or more networks 1120, which may have the same or similar functionality described in relation to the network 1004 of FIG. 10.

In some examples, user account(s) 1110 can include merchant account(s), customer account(s), media content subscriber account(s), artist account(s), and so forth. In at least one example, the asset storage 1108 can be used to record whether individual assets are registered to a user account 1110. For example, the asset storage 1108 can include asset wallet(s) 1122 for storing records of assets owned by the service provider system 1102, such as cryptocurrency, securities, NFTs, or the like, and communicating with one or more asset networks, such as cryptocurrency networks, NFT networks, securities networks, or the like. In some examples, the asset network can be a first-party network or a third-party network, such as a cryptocurrency exchange or the stock market. In examples where the asset network is a third-party network, the server(s) 1008 of FIG. 10 can be associated therewith.

The asset wallet 1122 can be associated with one or more addresses and can vary addresses used to acquire assets (e.g., from the asset network(s)) so that its holdings are represented under a variety of addresses on the asset network. In examples where the service provider system 1102 has holdings of cryptocurrency (e.g., in the asset wallet 1122), a user can acquire cryptocurrency directly from the service provider system 1102. In some examples, the service provider system 1102 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In some scenarios, the buying and selling of cryptocurrency, and therefore the associated updating of the public ledger of an asset network can be separate from a customer-merchant transaction or a peer-to-peer transaction, and therefore not necessarily time-sensitive. This can enable batching transactions to reduce computational resources and/or costs. The service provider system 1102 can provide the same or similar functionality for securities or other assets.

The asset storage 1108 may contain ledgers that store records of assignments of assets to users 1016. Specifically, the asset storage 1108 may include asset ledger 1124, fiat currency ledger 1126, and/or other ledger(s) 1128, which can be used to record transfers of assets between users 1016 and/or one or more third-parties (e.g., merchant network(s), payment card network(s), ACH network(s), equities network(s), the asset network, securities networks, etc.). In doing so, the asset storage 1108 can maintain a running balance of assets managed by the service provider system 1102. The ledger(s) of the asset storage 1108 can further indicate some of the running balance for individual ledger(s) stored in the asset storage 1108 are assigned or registered to one or more user account(s) 1110.

In at least one example, the asset storage 1108 can include transaction logs 1130, which can include, as transaction data, records of past transactions involving the service provider system 1102 and/or the user account 1110. In some examples, the data store(s) 1106 can store a private blockchain 1132. A private blockchain 1132 can function to record sender addresses, recipient addresses, public keys, values of cryptocurrency transferred, and/or can be used to verify ownership of cryptocurrency tokens to be transferred. In some examples, the service provider system 1102 can record transactions involving cryptocurrency until the number of transactions has exceeded a determined limit (e.g., number of transactions, storage space allocation, etc.). Based at least in part on determining that the limit has been reached, the service provider system 1102 can publish the transactions in the private blockchain 1132 to the public blockchain 1114 (e.g., associated with the asset network), where miners can verify the transactions and record the transactions to blocks on the public blockchain 1114. In at least one example, the service provider system 1102 can participate as miner(s) at least for transactions to which the respective platform is a party to, to be posted to the public blockchain 1114.

In some cases, the data store(s) 1106 can store and/or manage multiple user accounts, an example of which is described in relation to the user account 1110. In at least one example, the user account 1110 can include user account data 1134, which can include, but is not limited to, data associated with user identifying information (e.g., name, phone number, address, artist or band name, verified credentials, etc.), user identifier(s) (e.g., alphanumeric identifiers, etc.), user preferences (e.g., learned or user-specified), purchase history data (e.g., identifying one or more items purchased (and respective item information), subscription tier information, etc.), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1134 can include account activity 1136 and user wallet key(s) 1138. In some examples, the user wallet key(s) 1138 can include a public-private key-pair and a respective address associated with the asset network or other asset networks. In some examples, the user wallet key(s) 1138 may include one or more key pairs, which can be unique to the asset network or other asset networks.

In addition to the user account data 1134, the user account 1110 can include ledger(s) for account(s) managed by the service provider system 1102, for the user. For example, the user account 1110 may include an asset ledger 1124, a fiat currency ledger 1126, and/or one or more other ledgers 1128. The ledger(s) can indicate that a corresponding user utilizes the service provider system 1102 to manage corresponding accounts (e.g., a cryptocurrency account, a securities account, a fiat currency account, an artist account, etc.). It should be noted that in some examples, the ledger(s) can be logical ledger(s) and the data can be represented in a single database. In some examples, individual ones of the ledger(s), or portions thereof, can be maintained by the service provider system 1102.

In some examples, the asset ledger 1124 can store a balance for each of one or more cryptocurrencies (e.g., Bitcoin, Ethereum, Litecoin, etc.) registered to the user account 1110. In at least one example, the asset ledger 1124 can further record transactions of cryptocurrency assets associated with the user account 1110. For example, the user account 1110 can receive cryptocurrency from the asset network using the user wallet key(s) 1138. In some examples, the user wallet key(s) 1138 may be generated for the user upon request. User wallet key(s) 1138 can be requested by the user in order to send, exchange, or otherwise control the balance of cryptocurrency held by the service provider system 1102 (e.g., in the asset wallet 1122) and registered to the user. In some examples, the user wallet key(s) 1138 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider system 1102 and the value is credited as a balance in asset ledger 1124), by purchasing currency in the form associated with the account using currency in a different form (e.g., buying a value of cryptocurrency from the service provider system 1102 using a value of fiat currency reflected in fiat currency ledger 11281126, and crediting the value of cryptocurrency in asset ledger 1124), or by conducting a transaction with another user (customer or merchant) of the service provider system 1102 wherein the account receives incoming currency (which can be in the form associated with the account or a different form, in which the incoming currency may be converted to the form associated with the account).

With specific reference to funding a cryptocurrency account, a user may have a balance of cryptocurrency stored in another cryptocurrency wallet. In some examples, the other cryptocurrency wallet can be associated with a third-party unrelated to the service provider system 1102 (i.e., an external account). Such a transaction can request that the user to transfer an amount of the cryptocurrency in a message signed by user's private key to an address provided by the service provider system 1102. In at least one example, the transaction can be sent to miners to bundle the transaction into a block of transactions and to verify the authenticity of the transactions in the block. Once a miner has verified the block, the block is written to the public blockchain 1114 where the service provider system 1102 can then verify that the transaction has been confirmed and can credit the user's asset ledger 1124 with the transferred amount. When an account is funded by transferring cryptocurrency from a third-party cryptocurrency wallet, an update can be made to the public blockchain 1114. In some cases, this update of the public blockchain 1114 need not take place at a time-critical moment, such as when a transaction is being processed by a merchant in store or online.

In some examples, a user can purchase cryptocurrency to fund their cryptocurrency account. In some examples, the user can purchase cryptocurrency through services offered by the service provider system 1102. As described above, in some examples, the service provider system 1102 can acquire cryptocurrency from a third-party source. In examples where the service provider system 1102 has its own cryptocurrency assets, cryptocurrency transferred in a transaction (e.g., data with address provided for receipt of transaction and a balance of cryptocurrency transferred in the transaction) can be stored in an asset wallet 1122 associated with the service provider system 1102. In at least one example, the service provider system 1102 can credit the asset ledger 1124 of the user. Additionally, while the service provider system 1102 recognizes that the user retains the value of the transferred cryptocurrency through crediting the asset ledger 1124, an inspection of the blockchain will show the cryptocurrency as having been transferred to the service provider system 1102. In some examples, the asset wallet 1122 can be associated with many different addresses. In such examples, an inspection of the blockchain may not necessarily associate all cryptocurrency stored in asset wallet 1122 as belonging to the same entity. The presence of a private ledger used for real-time transactions and maintained by the service provider system 1102, combined with updates to the public ledger at other times, allows for extremely fast transactions using cryptocurrency to be achieved. In some examples, the "private ledger" can refer to the asset ledger 1124, which in some examples, can utilize the private blockchain 1132, as described herein. The "public ledger" can correspond to the public blockchain 1114 associated with the asset network.

In at least one example, an asset ledger 1124, fiat currency ledger 1126, or the like associated with the user account 1110 can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1124. In some examples, a user can receive fiat currency or another currency in the form of payment for a transaction with another user. In at least one example, at least a portion of such funds can be converted into cryptocurrency by the service provider system 1102 and used to fund the asset ledger 1124 of the user.

In examples, a user can also have an account in U.S. dollars, which can be tracked, for example, via the fiat currency ledger 1126. Such an account can be funded by transferring money from a bank account at a third-party bank to an account maintained by the service provider system 1102 as is conventionally known. In some examples, a user can receive fiat currency in the form of payment for a transaction with another user. In such examples, at least a portion of such funds can be used to fund the fiat currency ledger 1126.

In some examples, a user can have one or more internal payment cards registered with the service provider system 1102. Internal payment cards can be linked to one or more of the accounts associated with the user account 1110. In some embodiments, options with respect to internal payment cards can be adjusted and managed using an application (e.g., the payment application 1026, a wallet application 1112, etc.).

In at least one example, the user account 1110 can be associated with the asset wallet accessible via a wallet application 1112 of the user device 1104, or a stored balance for use in payment transactions, peer-to-peer transactions, payroll payments, etc. In at least one example, the asset wallet 1122 can store data indicating an address provided for receipt of a cryptocurrency transaction. In at least one example, the balance of the asset wallet 1122 can be based at least in part on a balance of the asset ledger 1124. In at least one example, funds availed via the asset wallet 1122 can be stored in the asset wallet 1122. Funds availed via the asset wallet 1122 can be tracked via the asset ledger 1124. The asset wallet 1122, however, can be associated with additional cryptocurrency funds.

In at least one example, when the service provider system 1102 includes a private blockchain 1132 for recording and validating cryptocurrency transactions, the asset wallet 1122 can be used instead of, or in addition to, the asset ledger 1124. For example, a merchant can provide the address of the asset wallet 1122 for receiving payments. In an example where a customer is paying in cryptocurrency and the customer has their own cryptocurrency wallet account associated with the service provider system 1102, the customer can send a message signed by its private key including its wallet address (i.e., of the customer) and identifying the cryptocurrency and value to be transferred to the merchant's asset wallet 1122. The service provider system 1102 can complete the transaction by reducing the cryptocurrency balance in the customer's cryptocurrency wallet and increasing the cryptocurrency balance in the merchant's asset wallet 1122. In addition to recording the transaction in the respective cryptocurrency wallets, the transaction can be recorded in the private blockchain 1132 and the transaction can be confirmed. A user can perform a similar transaction with cryptocurrency in a peer-to-peer transaction as described above.

While the asset ledger 1124 and/or asset wallet 1122 are each described above with reference to cryptocurrency, the asset ledger 1124 and/or asset wallet 1122 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider system 1102 is an aspect of the technology disclosed that enables technical advantages of increased processing speed and improved security.

The description of the environment 1100 above generally relates to a centralized service provider system 1102 that at least partially facilitates storing and managing assets in the data store 1106. However, the environment 1100 may also facilitate decentralized storage and management of assets alternatively or in addition to centralized storage and management as described above. For instance, the environment 1100 may include a decentralized platform implemented using a plurality of nodes (e.g., web nodes), an example of which is illustrated as node 1116. The node 1116 is representative of a computer or other device tasked with validating transactions and/or maintaining a copy of a blockchain ledger, such as a ledger associated with the public blockchain 1114. The decentralized platform may be implemented via the environment 1100 through use of decentralized identifiers and verifiable credentials that are stored and managed by user devices 1104. A decentralized identifier is configured as a self-owned identifier that supports decentralized authentication and routing. A self-owned identifier in a blockchain network is a unique identifier that is owned and controlled by an individual entity on the blockchain, as contrasted with an entity controlled by a centralized authority (e.g., the service provider system 1102). The decentralized identity referenced by a decentralized identifier gives an entity control over what data can be accessed, stored, modified, and so forth by other entities, such as the service provider system 1102.

The node 1116, as representative of one of a plurality of decentralized nodes (e.g., decentralized web nodes), supports data storage and relays that allows entities, service provider systems, individuals, organizations and so forth to send, store, and receive encrypted or public messages and data. The node 1116 is universally addressable and is "crawlable" using data addressing in relation to the decentralized identifiers. The node 1116 is also configured to support decentralized replication of data across the nodes that is consistent across multiple nodes over time through continued data communication between the nodes in the decentralized platform. The node 1116 is configurable to support secure encryption through use of a cryptographic key associated with an individual's decentralized identifier and support semantic discovery to discover different forms of published data.

Verifiable credentials are an open standard for digital credentials, and employ a data format for cryptographic presentation and verification of claims. A verifiable credential represents an indication of trust of a piece of information related to an entity. For example, a verifiable credential indicates that the issuer of the verifiable credential trusts the holder of the verifiable credential; the holder trusts a verifier of the verifiable credential; and that the verifier trusts the issuer. Verifiable credentials may be issued by anyone, about anything, and can be presented to and verified by everyone granted access to the verifiable credential. Accordingly, a user of the user device 1104 may be an issuer, a holder, and/or a verifier, as can the service provider system 1102.

In some examples, the user device 1104 may implement a wallet application 1112 configured to manage decentralized identifiers and/or verifiable credentials. For instance, the wallet application 1112 may provide a user interface for implementation of access controls to various data associated with the decentralized identifier by the service provider system 1102, to other user devices, and so forth. Additionally, the wallet application 1112 may be configured to provide functionality for resource transfers (e.g., cryptocurrency, fiat currency, etc.) with the service provider system 1102, other user devices, and the like, based on techniques described herein.

In some examples, the hardware wallet 1118 may store cryptocurrency assets in combination with the wallet application 1112 and the service provider system 1102. For instance, the hardware wallet 1118, the wallet application 1112, and the service provider system 1102 may each store a respective, different private key, where a transaction with the cryptocurrency assets is signed by at least two of the three private keys. The user interface provided by the wallet application 1112 may allow a user to request a transaction. The wallet application 1112 may then sign the transaction with the private key of the wallet application 1112, have either the hardware wallet 1118 or the service provider system 1102 use a second of the three private keys to sign the transaction, and then provide the transaction with two signatures to the public blockchain 1114 for processing.

Figure 12:
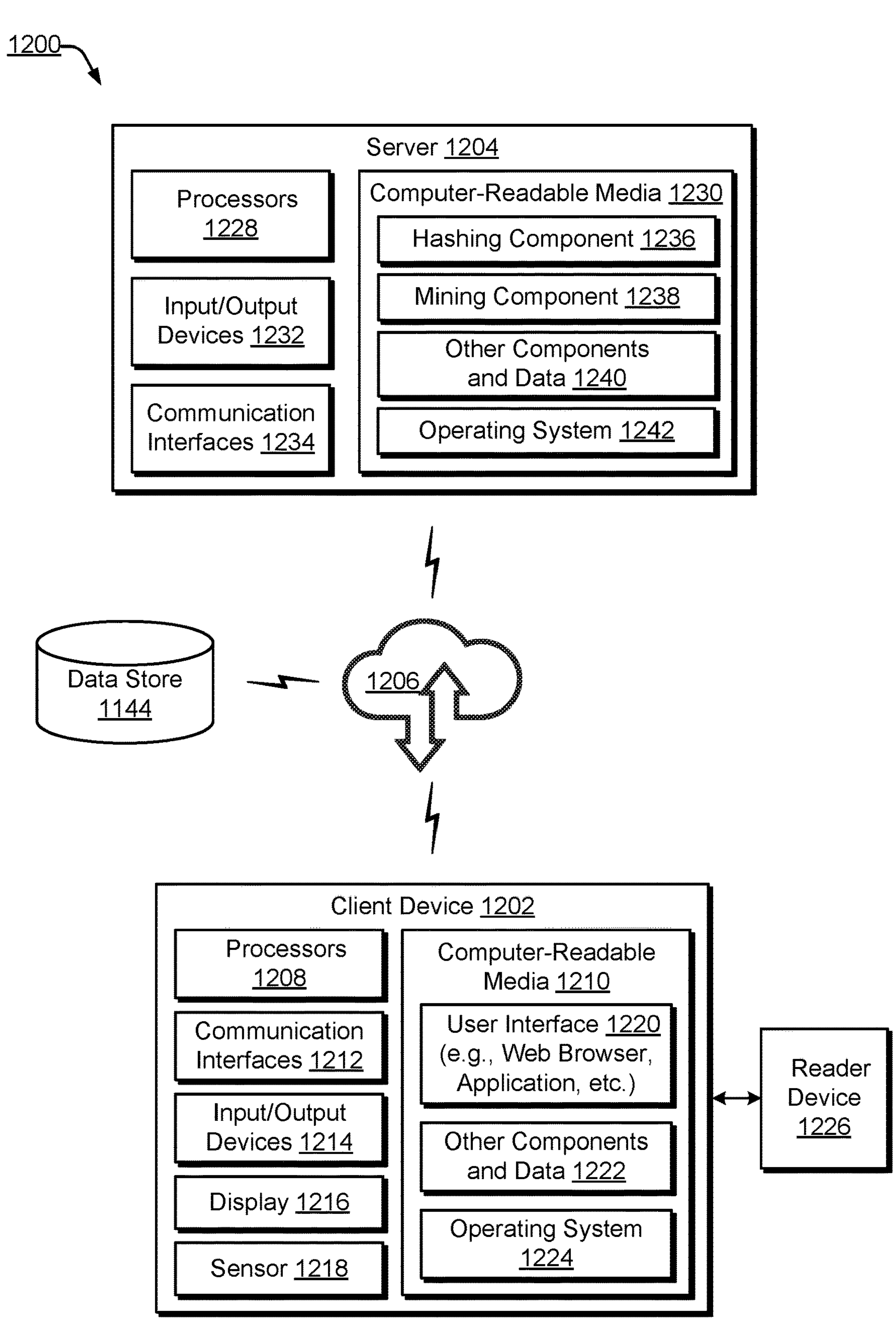
FIG. 12 is a block diagram illustrating a system for performing techniques described herein, in accordance with some examples.

FIG. 12 depicts an illustrative block diagram illustrating a system 1200 for performing techniques described herein. The system 1200 includes a user device 1202, that communicates with server computing device(s) (e.g., server(s) 1204) via network(s) 1206 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1202 is illustrated, in additional or alternate examples, the system 1200 can have multiple user devices, as described above with reference to FIG. 10.

In some examples, the client device 1202 and/or the server 1204 can be the hashing management architecture 100A-100B, the controller 105, first hashing chip 110, the second hashing chip 120, the third hashing chip 130, the hashing management architecture 200A-200B, the controller 205, the first hashing chip 210, the second hashing chip 220, the third hashing chip 230, the hashing management architecture 300A-300C, the controller 305, the hashing chips 310A-310Q, the hashing management architecture 400, the hashing chips 410A-410B, the hashing management architecture 500, the hashing management architecture 600, the controller 605, the hashing chips 610A-610P, the hubs 615A-615G, the hashing management architecture 700, the hashboard system 800, the hashboard(s) 805, the controller(s) 810, the hashing chips 815, the control board(s) 830, the controller(s) 835, or a combination thereof. The user interface 1220 can be associated with a user interface of a mining application and/or hashing application.

In at least one example, the user device 1202 can be any suitable type of computing device, e.g., portable, semi-portable, semi-stationary, or stationary. Some examples of the user device 1202 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, a speaker device, an automobile or other vehicle type, an Internet of Things (IoT) device, etc. That is, the user device 1202 can be any computing device capable of sending communications and performing the functions according to the techniques described herein. The user device 1202 can include devices, e.g., payment card readers, or components capable of accepting payments, as described below. The user device 1202 may be representative of, and provide functionality for, the user devices 1006 described in relation to FIG. 10.

In the illustrated example, the user device 1202 includes one or more processors 1208, one or more computer-readable media 1210, one or more communication interface(s) 1212, one or more input/output (I/O) devices 1214, a display 1216, sensor(s) 1218, one or more encoders 1246, and one or more decoders 1248.

In at least one example, each processor 1208 can itself comprise one or more processors or processing cores. For example, the processor(s) 1208 can be implemented as one or more microprocessors, microcomputers, microcontrollers, digital signal processors, central processing units, state machines, logic circuitries, and/or any devices that manipulate signals based on operational instructions. In some examples, the processor(s) 1208 can be one or more hardware processors and/or logic circuits of any suitable type specifically programmed or configured to execute the algorithms and processes described herein. The processor(s) 1208 can be configured to fetch and execute computer-readable processor-executable instructions stored in the computer-readable media 1210.

Depending on the configuration of the user device 1202, the computer-readable media 1210 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1210 can include, but is not limited to, RAM, ROM, EEPROM, flash memory, solid-state storage, magnetic disk storage, optical storage, and/or other computer-readable media technology. Further, in some examples, the user device 1202 can access external storage, such as RAID storage systems, storage arrays, network attached storage, storage area networks, cloud storage, or any other medium that can be used to store information and that can be accessed by the processor(s) 1208 directly or through another computing device or network. Accordingly, the computer-readable media 1210 can be computer storage media able to store instructions, components or components that can be executed by the processor(s) 1208. Further, when mentioned, non-transitory computer-readable media exclude media such as energy, carrier signals, electromagnetic waves, and signals per se.

The computer-readable media 1210 can be used to store and maintain any number of functional components that are executable by the processor(s) 1208. In some implementations, these functional components comprise instructions or programs that are executable by the processor(s) 1208 and that, when executed, implement operational logic for performing the actions and services attributed above to the user device 1202. Functional components stored in the computer-readable media 1210 can include a user interface 1220 to enable users to interact with the user device 1202, and thus the server(s) 1204 and/or other networked devices. In some examples, the user interface 1220 can include a UI associated with a mining application used to perform, control, and/or monitor the mining operations discussed herein, as performed using the mining ASIC(s) of the hashboard(s) discussed herein. In at least one example, a user can interact with the user interface via touch input, spoken input, gesture, or any other type of input. The word "input" is also used to describe "contextual" input that may not be directly provided by the user via the user interface 1220. For example, user's interactions with the user interface 1220 are analyzed using, e.g., natural language processing techniques, user movement tracking techniques, eye tracking techniques, etc. to determine context or intent of the user, which may be treated in a manner similar to "direct" user input.

Depending on the type of the user device 1202, the computer-readable media 1210 can also optionally include other functional components and data, such as other components and data 1222, which can include programs, drivers, etc., and the data used or generated by the functional components. In addition, the computer-readable media 1210 can also store data, data structures and the like, that are used by the functional components. Further, the user device 1202 can include many other logical, programmatic and physical components, of which those described are merely examples that are related to the discussion herein.

In at least one example, the computer-readable media 1210 can include additional functional components, such as an operating system 1224 for controlling and managing various functions of the user device 1202 and for enabling user interactions.

The communication interface(s) 1212 can include one or more interfaces and hardware components for enabling communication with various other devices, such as over the network(s) 1206 or directly. For example, communication interface(s) 1212 can enable communication through one or more network(s) 1206, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1206 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1202 can further include one or more input/output (I/O) devices 1214. The I/O devices 1214 can include speakers, a microphone, a camera, and various user controls (e.g., buttons, a joystick, a keyboard, a keypad, etc.), a haptic output device, and so forth. The I/O devices 1214 can also include attachments that leverage the accessories (audio-jack, USB-C, Bluetooth, etc.) to connect with the user device 1202.

In at least one example, user device 1202 can include a display 1216. Depending on the type of computing device(s) used as the user device 1202, the display 1216 can employ any suitable display technology. For example, the display 1216 can be a liquid crystal display, a plasma display, a light emitting diode display, an OLED (organic light-emitting diode) display, an electronic paper display, or any other suitable type of display able to present digital content thereon. In at least one example, the display 1216 can be an augmented reality display, a virtual reality display, or any other display able to present and/or project digital content. In some examples, the display 1216 can have a touch sensor associated with the display 1216 to provide a touchscreen display configured to receive touch inputs for enabling interaction with a graphic interface presented on the display 1216. Accordingly, implementations herein are not limited to any particular display technology. In some examples, the user device 1202 may not include the display 1216, and information can be presented by other means, such as aurally, haptically, etc.

In addition, the user device 1202 can include sensor(s) 1218. The sensor(s) 1218 can include a global positioning system ("GPS") device able to indicate location information. Further, the sensor(s) 1218 can include, but are not limited to, an accelerometer, gyroscope, compass, proximity sensor, camera, microphone, and/or a switch.

In some examples, the GPS device can be used to identify a location of a user. In at least one example, the location of the user can be used by the merchant platform 1010, the P2P platform 1012, and/or the media content platform 1014, described above, to provide one or more services. That is, in some examples, the service provider can implement geofencing to provide particular services to users by the merchant platform 1010, the P2P platform 1012, and/or the media content platform 1014.

In examples, the user device 1202 includes a codec system, which may comprise an encoder 1246 and/or a decoder 1248. The encoder 1246 is configured to encode a data stream or signal from an analog signal (e.g., an analog audio signal, an analog video signal, etc.) to a digital signal for transmission or storage. The decoder 1248 is configured to convert the digital signal back to an analog signal, such as for playback or editing. In some cases, the encoder 1246 may be configured to encode the data stream or analog signal in an encrypted format, and the decoder 1248 may accordingly be configured to decrypt the digital signal as part of the decoding process (e.g., using a cryptographic key). Additionally, in some examples, the encoder 1246 may compress data to reduce transmission bandwidth and/or storage space for the digital signal. One example of a compression codec system is a lossless codec, in which the digital data stream is a compressed format of the original data stream, but retains the information present in the original data stream. Another example of a compression codec system is a lossy codec which reduces the quality of the digital data stream but can increase the compression of the data stream relative to lossless codec systems. The codec system comprising the encoder 1246 and/or the decoder 1248 may be specialized to accomplish various different objectives, such as to preserve motion, preserve color, minimize latency, maintain fidelity, minimize bit-rate, optimize for different output device types, maintain synchronization of audio and video (e.g., using a metadata synchronization data stream), and so on. Although not explicitly illustrated in the example system 1200, the server 1204 may include an encoder 1246 and/or a decoder 1248 as well.

Additionally, the user device 1202 can include various other components that are not shown, examples of which include removable storage, a power source, such as a battery and power control unit, a barcode scanner, a printer, a cash drawer, and so forth.

In addition, as described in relation to FIG. 10, the user device 1202 can include, be connectable to, or otherwise be coupled to a reader device 1226, for reading payment instruments and/or identifiers associated with payment objects. The reader device 1226 can include a read head for reading a magnetic strip of a payment card, and further can include encryption technology for encrypting the information read from the magnetic strip. Additionally or alternatively, the reader device 1226 can be an EMV payment reader, which in some examples, can be embedded in the user device 1202. Moreover, numerous other types of readers can be employed with the user device 1202 herein, depending on the type and configuration of the user device 1202.

The reader device 1226 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data from various types of payment instruments. Accordingly, the reader device 1226 may include hardware implementation, such as slots, magnetic tracks, and rails with one or more sensors or electrical contacts to facilitate detection and acceptance of a payment instrument. That is, the reader device 1226 may include hardware implementations to enable the reader device 1226 to interact with a payment instrument via a swipe, a dip, or a tap to obtain payment data associated with a customer. Additionally or optionally, the reader device 1226 may also include a biometric sensor to receive and process biometric characteristics and process them as payment instruments, given that such biometric characteristics are registered with the payment service and connected to a financial account with a bank server. The reader device 1226 may include processing unit(s), computer-readable media, a reader chip, a transaction chip, a timer, a clock, a network interface, a power supply, and so on. That is, the reader device 1226 may include any of the computing components described herein with reference to the user device 1202 to implement the functionality provided by the reader device 1226.

In examples, the reader device 1226 includes a reader chip, which may perform functionality to control the power supply, among other functionality of the reader device 1226. The power supply may include one or more power supplies such as a physical connection to AC power or a battery. Power supply may include power conversion circuitry for converting AC power and generating a plurality of DC voltages for use by components of reader device 1226. When power supply includes a battery, the battery may be charged via a physical power connection, via inductive charging, or via any other suitable method.

The reader device 1226 may also include a transaction chip that may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. The transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1202, which can be a POS terminal, and the reader device 1226 are shown as separate devices, in additional or alternative examples, the user device 1202 and the reader device 1226 can be part of a single device, which may be a battery-operated device. In some examples, the reader device 1226 can have a display integrated therewith, which can be in addition to (or as an alternative of) the display 1216 associated with the user device 1202.

The server(s) 1204 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1204 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1204 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1204 can include one or more processors 1228, one or more computer-readable media 1230, one or more I/O devices 1232, and one or more communication interfaces 1234. Each processor 1228 can be a single processing unit or a number of processing units, and can include single or multiple computing units or multiple processing cores. The processor(s) 1228 can be implemented as one or more microprocessors, microcomputers, microcontrollers, digital signal processors, central processing units, state machines, logic circuitries, and/or any devices that manipulate signals based on operational instructions. For example, the processor(s) 1228 can be one or more hardware processors and/or logic circuits of any suitable type specifically programmed or configured to execute the algorithms and processes described herein. The processor(s) 1228 can be configured to fetch and execute computer-readable instructions stored in the computer-readable media 1230, which can program the processor(s) 1228 to perform the functions described herein.

The computer-readable media 1230 can include volatile and nonvolatile memory and/or removable and non-removable media implemented in any type of technology for storage of information, such as computer-readable instructions, data structures, program components, or other data. Such computer-readable media 1230 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1204, the computer-readable media 1230 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1230 can be used to store any number of functional components that are executable by the processor(s) 1228. In many implementations, these functional components comprise instructions or programs that are executable by the processors 1228 and that, when executed, specifically configure the one or more processors 1228 to perform the actions attributed above to the merchant platform 1010, the P2P platform 1012, and/or the media content platform 1014. Functional components stored in the computer-readable media 1230 can optionally include a hashing component 1236, a customization component 1238, and one or more other components and data 1240. The computer-readable media 1230 can additionally include an operating system 1242 for controlling and managing various functions of the server(s) 1204.

The hashing component 1236 can manage aspect(s) of hashing calculations across different hashing chips of one or more hashboards.

The mining component 1238 can manage aspect(s) of the overarching mining operations that the hashing calculations (managed by the hashing component 1236) support.

The payment component can be configured to receive transaction data from POS systems. The payment component can transmit requests (e.g., authorization, capture, settlement, etc.) to payment service server computing device(s) to facilitate POS transactions between merchants and customers. The payment component can communicate the successes or failures of the POS transactions to the POS systems.

The training component can be configured to train models using machine-learning mechanisms, as well as retrain the models to improve outputs provided by the models based on feedback received over time. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1202 and/or the server(s) 1204 for use at a time after the data models have been trained (e.g., at runtime).

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The communication interface(s) 1234 can include one or more interfaces and hardware components for enabling communication with various other devices, such as over the network(s) 1206 or directly. For example, communication interface(s) 1234 can enable communication through one or more network(s) 1206, which can include, but are not limited any type of network known in the art, as described herein.

The server(s) 1204 can further be equipped with various I/O devices 1232. Such I/O devices 1232 can include a display, various user interface controls (e.g., buttons, joystick, keyboard, mouse, touch screen, biometric or sensory input devices, etc.), audio speakers, connection ports and so forth.

In at least one example, the system 1200 can include a datastore 1244 that can be configured to store data that is accessible, manageable, and updatable. In some examples, the datastore 1244 can be integrated with the user device 1202 and/or the server(s) 1204. In other examples, as shown in FIG. 12, the datastore 1244 can be located remotely from the server(s) 1204 and can be accessible to the server(s) 1204. The datastore 1244 can comprise multiple databases and/or servers connected locally and/or remotely via the network(s) 1206. In at least one example, the datastore 1244 can store user profiles, which can include merchant profiles, customer profiles, artist profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, media content consumption data (e.g., number of streams of media content and by which artists, direct artist payouts, playlists generated or "favorited," durations of listening and/or watching individual media content items, actions performed while consuming media content (e.g., skips, repeats, volume changes, etc.), locations at which media content is consumed, devices used to consume media content, activities during which media content is consumed, etc.), etc.

Artist profiles can store data including, but not limited to, artist information (e.g., artist's performance or stage name, band name, artist's legal name, record label, phone number, address, social media handles, website address, banking information, etc.), artist preferences (e.g., learned or artist-specified), media content (and/or associated data) at least partially attributed to the artist (e.g., songs, videos, artists in a same genre or having shared listeners, etc.), event data (e.g., tour dates, appearance dates, appointments, etc.), financial data (e.g., advance data, recoupment data, royalty data, payouts data, etc.), payroll data (e.g., employees, contractors, venues, payroll frequency, etc.), listening data (e.g., number of streams on media content platform(s), listening trends, etc.), fan data (number of followers on media content platform(s), number of followers on social media platform(s), etc.), reservations data (e.g., venue reservations, studio recording reservations, previous reservations, upcoming (scheduled) reservations, reservation duration, interactions associated with such reservations, etc.), inventory data (e.g., merchandise inventory), customer service data, and so forth.

Furthermore, in at least one example, the datastore 1244 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1244 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described in the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

Example aspects of the disclosure include:

Aspect 1. A system for hashing management, the system comprising: A system for hashing management, the system comprising: a controller that receives at least one dataset; and a plurality of hashing chips that are coupled to one another and to the controller, wherein the controller apportions hashing calculations across the plurality of hashing chips to calculate at least one hash digest based on the at least one dataset, wherein the plurality of hashing chips includes at least a first hashing chip and a second hashing chip and a third hashing chip, wherein the first hashing chip is coupled to the second hashing chip using at least a first connector, wherein the second hashing chip is coupled to the third hashing chip using at least a second connector, and wherein the first hashing chip is coupled to the third hashing chip using at least a backup connector that bypasses the second hashing chip, wherein the first hashing chip sends a communication to the third hashing chip along the backup connector that bypasses the second hashing chip in response to a determination that the second hashing chip is nonresponsive.

Aspect 2. The system of Aspect 1, wherein the controller instructs the first hashing chip to send the communication to the third hashing chip along the backup connector that bypasses the second hashing chip in response to the determination that the second hashing chip is nonresponsive.

Aspect 3. The system of Aspect 1 or Aspect 2, wherein the first hashing chip is connected to the second hashing chip using at least the first connector as part of a daisy chain, wherein the second hashing chip is connected to the third hashing chip using at least the second connector as part of the daisy chain, and wherein the backup connector bypasses a portion of the daisy chain that includes at least the second hashing chip, the first connector, and the second connector.

Aspect 4. A system, the system comprising: a controller that receives at least one dataset; and a plurality of hashing chips that are coupled to one another and to the controller, wherein the controller apportions hashing calculations across the plurality of hashing chips to calculate at least one hash digest based on the at least one dataset, wherein the plurality of hashing chips includes at least a first hashing chip and a second hashing chip and a third hashing chip, wherein a communication is conveyed between the first hashing chip and the third hashing chip along a backup connector that bypasses the second hashing chip in response to a determination that the second hashing chip is nonresponsive.

Aspect 5. The system of Aspect 4, wherein the first hashing chip is coupled to the second hashing chip using at least a first connector, wherein the second hashing chip is coupled to the third hashing chip using at least a second connector, and wherein the first hashing chip is coupled to the third hashing chip using at least the backup connector that bypasses the second hashing chip.

Aspect 6. The system of Aspect 5, wherein the first hashing chip is connected to the second hashing chip using the first connector, wherein the second hashing chip is connected to the third hashing chip using the second connector, and wherein the first hashing chip is connected to the third hashing chip using the backup connector that bypasses the second hashing chip.

Aspect 7. The system of Aspect 5 or Aspect 6, wherein the first hashing chip is connected to the second hashing chip using at least the first connector as part of a daisy chain, wherein the second hashing chip is connected to the third hashing chip using at least the second connector as part of the daisy chain, and wherein the backup connector bypasses a portion of the daisy chain that includes at least the second hashing chip, the first connector, and the second connector.

Aspect 8. The system of Aspect 7, wherein each hashing chip of the plurality of hashing chips is connected as part of the daisy chain.

Aspect 9. The system of Aspect 7 or Aspect 8, wherein each hashing chip of the plurality of hashing chips is connected to one of a plurality of backup connectors, wherein each of the plurality of backup connectors bypasses at least one of the plurality of hashing chips in the daisy chain, and wherein the plurality of backup connectors includes the backup connector that bypasses the second hashing chip.

Aspect 10. The system of any of Aspects 7 to 9, wherein each hashing chip of the plurality of hashing chips includes a first input contact and a second input contact, wherein the first input contact is coupled to at least a portion of the daisy chain, wherein the second input contact is coupled to one of a plurality of backup connectors that bypasses one of the plurality of hashing chips in the daisy chain, and wherein the plurality of backup connectors includes the backup connector that bypasses the second hashing chip.

Aspect 11. The system of any of Aspects 4 to 10, wherein the controller instructs the first hashing chip to send the communication to the third hashing chip along the backup connector that bypasses the second hashing chip in response to the determination that the second hashing chip is nonresponsive.

Aspect 12. The system of any of Aspects 4 to 11, wherein the determination that the second hashing chip is nonresponsive is made at least in part by the controller.

Aspect 13. The system of any of Aspects 4 to 12, wherein the determination that the second hashing chip is nonresponsive is made at least in part by the first hashing chip.

Aspect 14. The system of any of Aspects 4 to 13, wherein the plurality of hashing chips are coupled to one another unidirectionally.

Aspect 15. The system of any of Aspects 4 to 14, wherein the plurality of hashing chips are coupled to one another bidirectionally.

Aspect 16. The system of any of Aspects 4 to 15, wherein the controller directly connects to one hashing chip of the plurality of hashing chips, and wherein the controller communicates with the plurality of hashing chips through the one hashing chip.

Aspect 17. The system of any of Aspects 4 to 16, wherein the controller directly connects to at least two hashing chips of the plurality of hashing chips, and wherein the controller communicates with the plurality of hashing chips through at least one of the at least two hashing chips.

Aspect 18. The system of any of Aspects 4 to 17, wherein at least a portion of the plurality of hashing chips are organized in a tree arrangement of the plurality of hashing chips, wherein the tree arrangement includes a hub configured to convey data from a parent node hashing chip to a set of child node hashing chips, wherein the plurality of hashing chips includes the parent node hashing chip and the set of child node hashing chips.

Aspect 19. The system of any of Aspects 4 to 18, wherein the communication includes at least one of an instruction or a hash digest, wherein the instruction is from the controller and instructs how the hashing calculations are to be apportioned across the plurality of hashing chips, wherein the hash digest is generated by one of the plurality of hashing chips via one of the hashing calculations.

Aspect 20. A method of hashing management, the method comprising: receive at least one dataset; apportion hashing calculations for hashing the at least one dataset among a plurality of hashing chips, wherein the plurality of hashing chips includes at least a first hashing chip and a second hashing chip and a third hashing chip, wherein the first hashing chip is coupled to the second hashing chip using at least a first connector, wherein the second hashing chip is coupled to the third hashing chip using at least a second connector, and wherein the first hashing chip is coupled to the third hashing chip using at least a backup connector that bypasses the second hashing chip; determining that the second hashing chip is nonresponsive; and conveying a communication between the first hashing chip and the third hashing chip along the backup connector to bypass the second hashing chip in response to the determining that the second hashing chip is nonresponsive.

Aspect 21. The method of Aspect 20, wherein the first hashing chip is coupled to the second hashing chip using at least a first connector, wherein the second hashing chip is coupled to the third hashing chip using at least a second connector, and wherein the first hashing chip is coupled to the third hashing chip using at least the backup connector that bypasses the second hashing chip.

Aspect 22. The method of Aspect 21, wherein the first hashing chip is connected to the second hashing chip using the first connector, wherein the second hashing chip is connected to the third hashing chip using the second connector, and wherein the first hashing chip is connected to the third hashing chip using the backup connector that bypasses the second hashing chip.

Aspect 23. The method of Aspect 21 or Aspect 22, wherein the first hashing chip is connected to the second hashing chip using at least the first connector as part of a daisy chain, wherein the second hashing chip is connected to the third hashing chip using at least the second connector as part of the daisy chain, and wherein the backup connector bypasses a portion of the daisy chain that includes at least the second hashing chip, the first connector, and the second connector.

Aspect 24. The method of Aspect 23, wherein each hashing chip of the plurality of hashing chips is connected as part of the daisy chain.

Aspect 25. The method of Aspect 23 or Aspect 24, wherein each hashing chip of the plurality of hashing chips is connected to one of a plurality of backup connectors, wherein each of the plurality of backup connectors bypasses at least one of the plurality of hashing chips in the daisy chain, and wherein the plurality of backup connectors includes the backup connector that bypasses the second hashing chip.

Aspect 26. The method of any of Aspects 23 to 25, wherein each hashing chip of the plurality of hashing chips includes a first input contact and a second input contact, wherein the first input contact is coupled to at least a portion of the daisy chain, wherein the second input contact is coupled to one of a plurality of backup connectors that bypasses one of the plurality of hashing chips in the daisy chain, and wherein the plurality of backup connectors includes the backup connector that bypasses the second hashing chip.

Aspect 27. The method of any of Aspects 20 to 26, further comprising:

instructing the first hashing chip to send the communication to the third hashing chip along the backup connector that bypasses the second hashing chip in response to the determination that the second hashing chip is nonresponsive.

Aspect 28. The method of any of Aspects 20 to 27, wherein the determination that the second hashing chip is nonresponsive is made at least in part by a controller.

Aspect 29. The method of any of Aspects 20 to 28, wherein the determination that the second hashing chip is nonresponsive is made at least in part by the first hashing chip.

Aspect 30. The method of any of Aspects 20 to 29, wherein the plurality of hashing chips are coupled to one another unidirectionally.

Aspect 31. The method of any of Aspects 20 to 30, wherein the plurality of hashing chips are coupled to one another bidirectionally.

Aspect 32. The method of any of Aspects 20 to 31, further comprising: communicating between a controller and the plurality of hashing chips through one hashing chip of the plurality of hashing chips, wherein the controller directly connects to the one hashing chip.

Aspect 33. The method of any of Aspects 20 to 32, further comprising: communicating between a controller and the plurality of hashing chips through at least one of at least two hashing chips of the plurality of hashing chips, wherein the controller directly connects to the at least two hashing chips.

Aspect 34. The method of any of Aspects 20 to 33, wherein at least a portion of the plurality of hashing chips are organized in a tree arrangement of the plurality of hashing chips, wherein the tree arrangement includes a hub configured to convey data from a parent node hashing chip to a set of child node hashing chips, wherein plurality of hashing chips includes the parent node hashing chip and the set of child node hashing chips.

Aspect 35. The method of any of Aspects 20 to 34, wherein the communication includes at least one of an instruction or a hash digest, wherein the instruction is from a controller and instructs how the hashing calculations are to be apportioned across the plurality of hashing chips, wherein the hash digest is generated by one of the plurality of hashing chips via one of the hashing calculations.

Aspect 36. A non-transitory computer-readable medium having stored thereon instructions that, when executed by one or more processors, cause the one or more processors to perform operations according to any of Aspects 1 to 35.

Aspect 37: An apparatus comprising means for performing operations according to any of Aspects 1 to 35.

What is claimed is:

1. A system for hashing management, the system comprising:

a circuit board;

a controller that receives at least one dataset;

a plurality of hashing chips on the circuit board, wherein the plurality of hashing chips are coupled to one another and to the controller using a plurality of connectors on the circuit board, wherein the controller sends a plurality of hashing communications to the plurality of hashing chips to apportion hashing calculations across the plurality of hashing chips and to calculate at least one hash digest based on the at least one dataset, wherein the plurality of hashing chips includes at least a first hashing chip and a second hashing chip and a third hashing chip; and the plurality of connectors, wherein the first hashing chip is coupled to the second hashing chip using at least a first connector of the plurality of connectors, wherein the second hashing chip is coupled to the third hashing chip using at least a second connector of the plurality of connectors, and wherein the first hashing chip is coupled to the third hashing chip using at least a backup connector of the plurality of connectors that bypasses the second hashing chip, wherein the backup connector is automatically activated and the first connector and the second connector are automatically deactivated in response to a determination that the second hashing chip is nonresponsive to a first hashing communication, the first hashing communication sent from the controller toward the second hashing chip through the first hashing chip and the first connector, wherein a second hashing communication is conveyed between the first hashing chip and the third hashing chip through the backup connector while the backup connector is activated, and wherein the plurality of hashing communications include the first hashing communication and the second hashing communication.

2. The system of claim 1, wherein the controller instructs the first hashing chip to send the first hashing communication along the first connector, and wherein the controller instructs the first hashing chip to send the second hashing communication along the backup connector.

3. The system of claim 1, wherein the first hashing chip is connected to the second hashing chip using at least the first connector as part of a daisy chain, wherein the second hashing chip is connected to the third hashing chip using at least the second connector as part of the daisy chain, and wherein the backup connector bypasses a portion of the daisy chain that includes at least the second hashing chip, the first connector, and the second connector.

4. A system, the system comprising:

a circuit board;

a controller that receives at least one dataset; and a plurality of hashing chips on the circuit board, wherein the plurality of hashing chips are coupled to one another and to the controller, wherein the controller sends a plurality of hashing communications to the plurality of hashing chips to apportion hashing calculations across the plurality of hashing chips to calculate at least one hash digest based on the at least one dataset, wherein the plurality of hashing chips includes at least a first hashing chip and a second hashing chip and a third hashing chip, wherein a backup connector is automatically activated and a first connector is automatically deactivated in response to a determination that the second hashing chip is nonresponsive to a first hashing communication, the first hashing communication sent from the controller toward the second hashing chip through the first hashing chip and the first connector, wherein a second hashing communication is conveyed between the first hashing chip and the third hashing chip through the backup connector while the backup connector is activated, and wherein the plurality of hashing communications include the first hashing communication and the second hashing communication.

5. The system of claim 4, wherein the first hashing chip is coupled to the second hashing chip using at least the first connector, wherein the second hashing chip is coupled to the third hashing chip using at least a second connector that is deactivated in response to the determination that the second hashing chip is nonresponsive to the first hashing communication, and wherein the first hashing chip is coupled to the third hashing chip using at least the backup connector that bypasses the second hashing chip.

6. The system of claim 4, wherein the first hashing chip is connected to the second hashing chip using the first connector, wherein the second hashing chip is connected to the third hashing chip using a second connector that is deactivated in response to the determination that the second hashing chip is nonresponsive to the first hashing communication, and wherein the first hashing chip is connected to the third hashing chip using the backup connector that bypasses the second hashing chip.

7. The system of claim 4, wherein the first hashing chip is connected to the second hashing chip using at least the first connector as part of a daisy chain, wherein the second hashing chip is connected to the third hashing chip using at least a second connector as part of the daisy chain, and wherein the backup connector bypasses a portion of the daisy chain that includes at least the second hashing chip, the first connector, and the second connector.

8. The system of claim 4, wherein each hashing chip of the plurality of hashing chips is connected as part of a daisy chain that includes the first connector and a second connector that couples the second hashing chip to the third hashing chip.

9. The system of claim 7, wherein each hashing chip of the plurality of hashing chips is connected to one of a plurality of backup connectors, wherein each of the plurality of backup connectors bypasses at least one of the plurality of hashing chips in the daisy chain, and wherein the plurality of backup connectors includes the backup connector that bypasses the second hashing chip.

10. The system of claim 7, wherein each hashing chip of the plurality of hashing chips includes a first input contact and a second input contact, wherein the first input contact is coupled to at least a portion of the daisy chain, wherein the second input contact is coupled to one of a plurality of backup connectors that bypasses one of the plurality of hashing chips in the daisy chain, and wherein the plurality of backup connectors includes the backup connector that bypasses the second hashing chip.

11. The system of claim 4, wherein the controller instructs the first hashing chip to send the first hashing communication along the first connector, and wherein the controller instructs the first hashing chip to send the second hashing communication to the third hashing chip along the backup connector.

12. The system of claim 4, wherein the determination that the second hashing chip is nonresponsive is made at least in part by the controller.

13. The system of claim 4, wherein the determination that the second hashing chip is nonresponsive is made at least in part by the first hashing chip.

14. The system of claim 4, wherein the plurality of hashing chips are coupled to one another using a plurality of unidirectional connectors.

15. The system of claim 4, wherein the plurality of hashing chips are coupled to one another using a plurality of bidirectional connectors.

16. The system of claim 4, wherein the controller directly connects to one hashing chip of the plurality of hashing chips, and wherein the controller communicates with the plurality of hashing chips through the one hashing chip.

17. The system of claim 4, wherein the controller directly connects to at least two hashing chips of the plurality of hashing chips, and wherein the controller communicates with the plurality of hashing chips through at least one of the at least two hashing chips.

18. The system of claim 4, wherein at least a portion of the plurality of hashing chips are organized in a tree arrangement of the plurality of hashing chips, wherein the tree arrangement includes a hub configured to convey data from a parent node hashing chip to a set of child node hashing chips, wherein the plurality of hashing chips includes the parent node hashing chip and the set of child node hashing chips.

19. The system of claim 4, wherein the second hashing communication includes at least one of an instruction or a hash digest, wherein the instruction is from the controller and instructs how at least a subset of the hashing calculations are to be apportioned across the plurality of hashing chips, wherein the hash digest is generated by one of the plurality of hashing chips via one of the hashing calculations.

20. A method of hashing management, the method comprising:

receive at least one dataset;

apportion hashing calculations for hashing the at least one dataset among a plurality of hashing chips on a circuit board via a plurality of hashing communications sent to the plurality of hashing chips, wherein the plurality of hashing chips includes at least a first hashing chip and a second hashing chip and a third hashing chip, wherein the first hashing chip is coupled to the second hashing chip using at least a first connector, wherein the second hashing chip is coupled to the third hashing chip using at least a second connector, and wherein the first hashing chip is coupled to the third hashing chip using at least a backup connector that bypasses the second hashing chip;

determining that the second hashing chip is nonresponsive to a first hashing communication of the plurality of hashing communications;

activating the backup connector, and deactivating the first connector and the second connector, in response to determining that the second hashing chip is nonresponsive; and conveying a second hashing communication of the plurality of hashing communications between the first hashing chip and the third hashing chip along the backup connector while the backup connector is activated, wherein the first connector, the second connector, and the backup connector are on the circuit board.

* * * * *